United States Patent
Takaki et al.

(10) Patent No.: US 12,404,814 B2
(45) Date of Patent: Sep. 2, 2025

(54) GAS TURBINE CONTROL DEVICE, GAS TURBINE CONTROL METHOD, AND PROGRAM

(71) Applicant: MITSUBISHI HEAVY INDUSTRIES, LTD., Tokyo (JP)

(72) Inventors: Kazushige Takaki, Tokyo (JP); Ryuji Takenaka, Tokyo (JP); Koshiro Fukumoto, Tokyo (JP); Shuhei Toda, Tokyo (JP); Nobuaki Hayashida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/833,102

(22) PCT Filed: Apr. 24, 2023

(86) PCT No.: PCT/JP2023/016133
§ 371 (c)(1),
(2) Date: Jul. 25, 2024

(87) PCT Pub. No.: WO2023/218930
PCT Pub. Date: Nov. 16, 2023

(65) Prior Publication Data
US 2025/0154907 A1    May 15, 2025

(30) Foreign Application Priority Data
May 9, 2022    (JP) .................. 2022-076848

(51) Int. Cl.
*F02C 9/50*    (2006.01)
*F01D 21/00*   (2006.01)
*F02C 9/28*    (2006.01)

(52) U.S. Cl.
CPC .............. *F02C 9/50* (2013.01); *F01D 21/003* (2013.01); *F02C 9/28* (2013.01);
(Continued)

(58) Field of Classification Search
CPC ...... F02C 9/00; F02C 9/16; F02C 9/28; F02C 9/50; F05D 2260/80; F05D 2260/81
See application file for complete search history.

(56) References Cited

U.S. PATENT DOCUMENTS 8,490,379 B2 * 7/2013 Nomura .................... F02C 9/18
                                                 60/39.23
10,208,678 B2 * 2/2019 Uyama ..................... F02C 7/04
(Continued)

FOREIGN PATENT DOCUMENTS

JP          6920456         8/2021

OTHER PUBLICATIONS

International Search Report issued Jul. 11, 2023 in International Application No. PCT/JP2023/016133, with English translation.
(Continued)

*Primary Examiner* — Alain Chau
(74) *Attorney, Agent, or Firm* — Wenderoth, Lind & Ponack, L.L.P.

(57) ABSTRACT

A gas turbine control device including: a fuel flow rate calculation unit that calculates a fuel flow rate indicating an amount of fuel entering a combustor; an air flow rate calculation unit that calculates an air flow rate; a turbine inlet temperature calculation unit that calculates a turbine inlet temperature, on the basis of the fuel flow rate, the air flow rate, and a physical model formula for thermal energy balance about the combustor; a heat balance computation unit that performs computation to satisfy the heat balance of the gas turbine; a state detection unit that detects the state of the gas turbine; and a correction processing unit that, on the (Continued)

basis of the computation result output by the heat balance computation unit, corrects one or both of the fuel flow rate and the air flow rate, and gives the corrected flow rate to the turbine inlet temperature calculation unit.

12 Claims, 16 Drawing Sheets

(52) U.S. Cl.
CPC .. *F05D 2260/821* (2013.01); *F05D 2270/303* (2013.01); *F05D 2270/306* (2013.01); *F05D 2270/71* (2013.01)

(56) References Cited

U.S. PATENT DOCUMENTS

| | | | | |
|---|---|---|---|---|
| 10,969,305 B2* | 4/2021 | Tanaka | ................ | F01D 21/003 |
| 11,248,537 B2* | 2/2022 | Takaki | ................ | F02C 9/28 |
| 11,333,082 B2* | 5/2022 | Thatcher | ................ | F23R 3/26 |
| 11,421,886 B2* | 8/2022 | Endo | ................ | F02C 7/228 |
| 11,566,983 B2* | 1/2023 | Aoyama | ................ | G01N 3/06 |
| 11,643,977 B2* | 5/2023 | Takaki | ................ | F02C 9/28 |
| | | | | 60/773 |
| 2007/0089395 A1* | 4/2007 | Fujii | ................ | F02C 9/28 |
| | | | | 60/39.281 |
| 2010/0198419 A1* | 8/2010 | Sonoda | ................ | F02C 9/28 |
| | | | | 60/773 |
| 2011/0056180 A1* | 3/2011 | Nomura | ................ | F01D 17/085 |
| | | | | 60/39.24 |
| 2017/0074175 A1* | 3/2017 | Uyama | ................ | F02C 9/28 |
| 2018/0223743 A1* | 8/2018 | Yamamoto | ................ | F02C 9/34 |
| 2018/0299131 A1* | 10/2018 | Endo | ................ | F23R 3/32 |
| 2018/0313720 A1* | 11/2018 | Tanaka | ................ | F02C 7/00 |
| 2019/0018380 A1* | 1/2019 | Tomita | ................ | F02C 6/00 |
| 2019/0063335 A1* | 2/2019 | Takaki | ................ | F02C 9/28 |
| 2019/0383222 A1* | 12/2019 | Takaki | ................ | F02C 9/28 |
| 2020/0217252 A1 | 7/2020 | Takaki et al. | | |
| 2021/0108999 A1* | 4/2021 | Aoyama | ................ | G01N 3/06 |

OTHER PUBLICATIONS

Written Opinion of the International Searching Authority issued Jul. 11, 2023 in International Application No. PCT/JP2023/016133, with English translation.

* cited by examiner

GAS TURBINE CONTROL DEVICE, GAS TURBINE CONTROL METHOD, AND PROGRAM

TECHNICAL FIELD

The present disclosure relates to a gas turbine control device, a gas turbine control method, and a program.

Priority is claimed on Japanese Patent Application No. 2022-076848, filed on May 9, 2022, the content of which is incorporated herein by reference.

BACKGROUND ART

In a gas turbine, for example, a fuel is injected to generate a combustion gas in a combustor that captures compressed air generated by a compressor. Power is generated in such a manner that the generated combustion gas drives the turbine. A fuel supply system that supplies the fuel to the combustor may be divided into a plurality of fuel supply systems from the viewpoint of combustion efficiency or combustion stability. A ratio for distributing the fuel to each of the plurality of fuel supply systems, that is, a fuel distribution ratio, can be calculated, based on a turbine inlet temperature.

However, there is no instrument can stably measure the turbine inlet temperature. Therefore, in general, the turbine inlet temperature is estimated, based on measurement data obtained by measurement of a sensor provided in the gas turbine, and the fuel distribution ratio is calculated by using the estimated turbine inlet temperature. Therefore, it is important to ensure accuracy of the estimated turbine inlet temperature. For example, PTL 1 discloses a technique as follows. According to the technique, the turbine inlet temperature after combustion is estimated from a fuel flow rate or an air flow rate flowing into the combustor. The estimated turbine inlet temperature is corrected by using a turbine exit temperature measured by a sensor, that is, by using an exhaust gas temperature. In this manner, accuracy of the turbine inlet temperature is improved.

CITATION LIST

Patent Literature

[PTL 1] Japanese Patent No. 6920456

SUMMARY OF INVENTION

Technical Problem

However, it is difficult to uniquely determine turbine efficiency which is a relationship between the turbine inlet temperature and the exhaust gas temperature. Therefore, the technique disclosed in PTL 1 has a problem as follows. Even when the turbine inlet temperature is corrected by using the exhaust gas temperature, in some cases, correction for improving the accuracy of the turbine inlet temperature may not be available. In addition, even when the turbine efficiency can be uniquely determined, since a gas turbine 10 is operated for a long period of time, performance of the gas turbine 10 is changed due to aged deterioration. Therefore, the uniquely determined turbine efficiency cannot be continuously used for a long period of time. Consequently, there is a problem in that the accuracy of the turbine inlet temperature is less likely to be stably maintained.

The present disclosure is made to solve the above-described problems, and aims to provide a gas turbine control device, a gas turbine control method, and a program that can maintain accuracy of a turbine inlet temperature for a long period of time without using turbine efficiency.

Solution to Problem

According to the present disclosure, in order to solve the above-described problems, there is provided a gas turbine control device including a fuel flow rate calculation unit that calculates a fuel flow rate indicating the amount of a fuel flowing into a combustor of a gas turbine, based on measurement data relating to a fuel supply system for supplying the fuel to the combustor; an air flow rate calculation unit that calculates an air flow rate indicating the amount of air suctioned by a compressor of the gas turbine, based on measurement data relating to the compressor; a turbine inlet temperature calculation unit that calculates a turbine inlet temperature, based on the fuel flow rate, the air flow rate, and a physical model equation relating to heat energy balance relating to the combustor; a heat balance computation unit that performs a computation for satisfying heat balance of the gas turbine, based on measurement data relating to energy balance of the gas turbine, and outputs a computation result; a state detection unit that detects a state of the gas turbine; and a correction process unit that corrects any one or both of the fuel flow rate and the air flow rate, based on the computation result output by the heat balance computation unit when the state of the gas turbine which is detected by the state detection unit is a static state, and provides the corrected flow rate to the turbine inlet temperature calculation unit.

According to the present disclosure, there is provided a gas turbine control method including a step of calculating a fuel flow rate indicating the amount of a fuel flowing into a combustor of a gas turbine, based on measurement data relating to a fuel supply system for supplying the fuel to the combustor; a step of calculating an air flow rate indicating the amount of air suctioned by a compressor of the gas turbine, based on measurement data relating to the compressor; a step of calculating a turbine inlet temperature, based on the fuel flow rate, the air flow rate, and a physical model equation relating to heat energy balance relating to the combustor; a step of performing a computation for satisfying heat balance of the gas turbine, based on measurement data relating to energy balance of the gas turbine, and outputting a computation result; a step of detecting a state of the gas turbine; and a step of correcting any one or both of the fuel flow rate and the air flow rate, based on the computation result output in the step of performing the computation for satisfying the heat balance when the state of the gas turbine which is detected in the step of detecting the state is a static state, and providing the corrected flow rate to the step of calculating the turbine inlet temperature.

According to the present disclosure, there is provided a program that causes a computer to function as fuel flow rate calculation means for calculating a fuel flow rate indicating the amount of a fuel flowing into a combustor of a gas turbine, based on measurement data relating to a fuel supply system for supplying the fuel to the combustor; air flow rate calculation means for calculating an air flow rate indicating the amount of air suctioned by a compressor of the gas turbine, based on measurement data relating to the compressor; turbine inlet temperature calculation means for calculating a turbine inlet temperature, based on the fuel flow rate, the air flow rate, and a physical model equation relating to heat energy balance relating to the combustor; heat balance computation means for performing a computation for satisfying heat balance of the gas turbine, based on measurement data relating to energy balance of the gas turbine, and outputting a computation result; state detection means for detecting a state of the gas turbine; and correction process means for correcting any one or both of the fuel flow rate and the air flow rate, based on the computation result output by the heat balance computation means when the state of the gas turbine which is detected by the state detection means is a static state, and providing the corrected flow rate to the turbine inlet temperature calculation means.

Advantageous Effects of Invention

According to a gas turbine control device, a gas turbine control method, and a program of the present disclosure, accuracy of a turbine inlet temperature can be maintained for a long period of time without using turbine efficiency.

DESCRIPTION OF EMBODIMENTS

Figure 1:
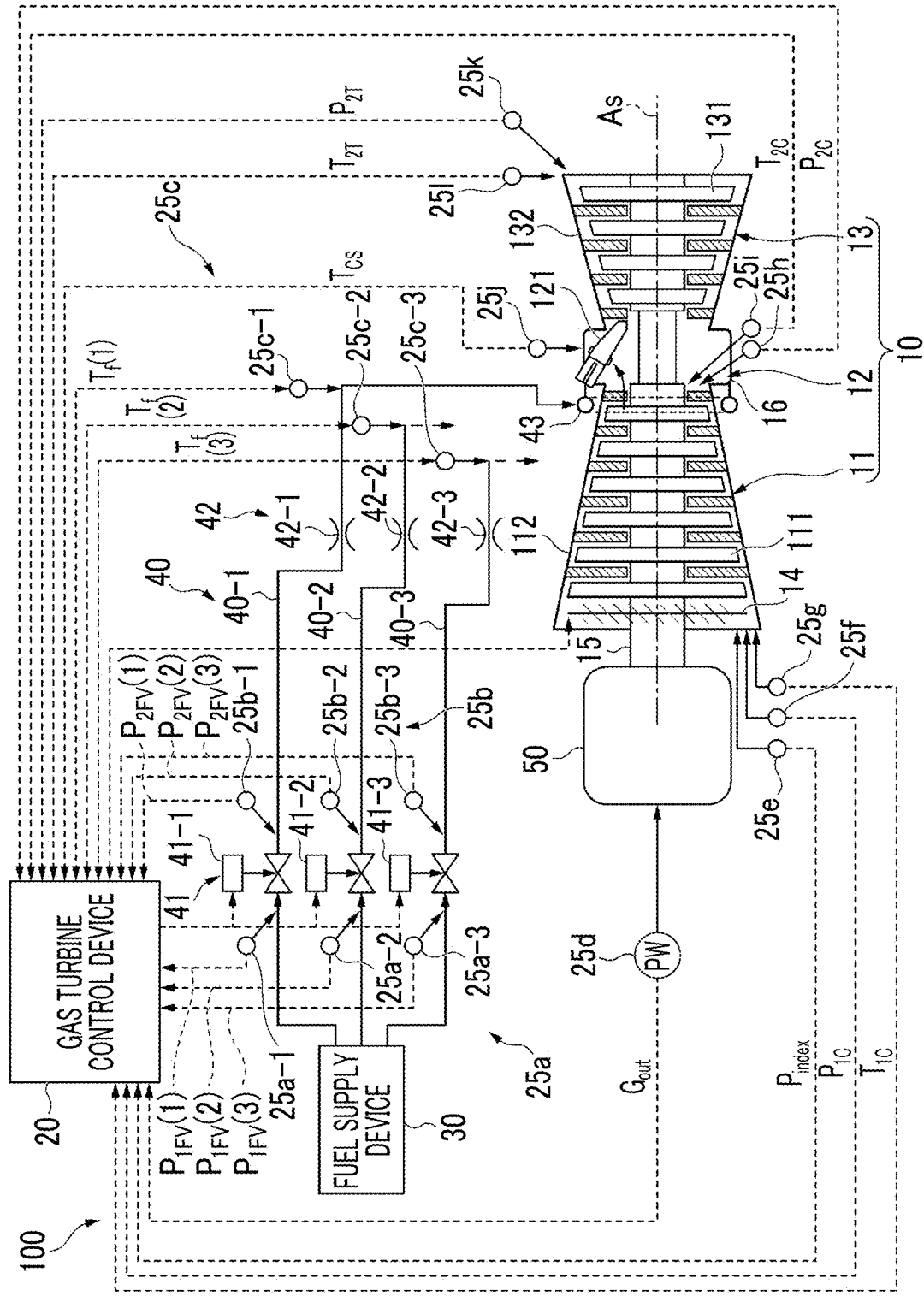
FIG. 1 is a schematic view illustrating a configuration example of a gas turbine power generation plant according to a first embodiment of the present disclosure.
Figure 2:
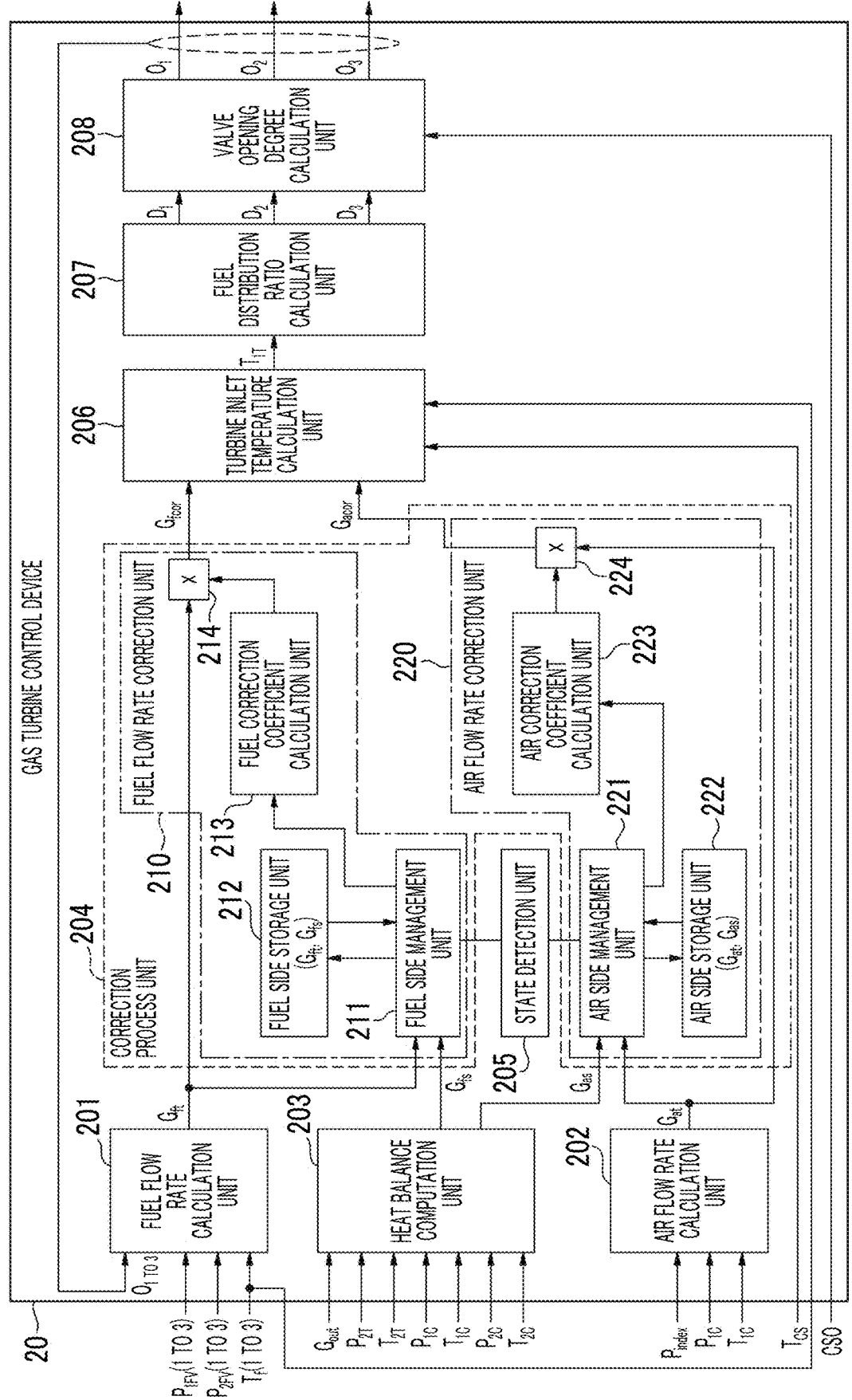
FIG. 2 is a block diagram illustrating a configuration example of a gas turbine control device according to the first embodiment of the present disclosure.
Figure 3:
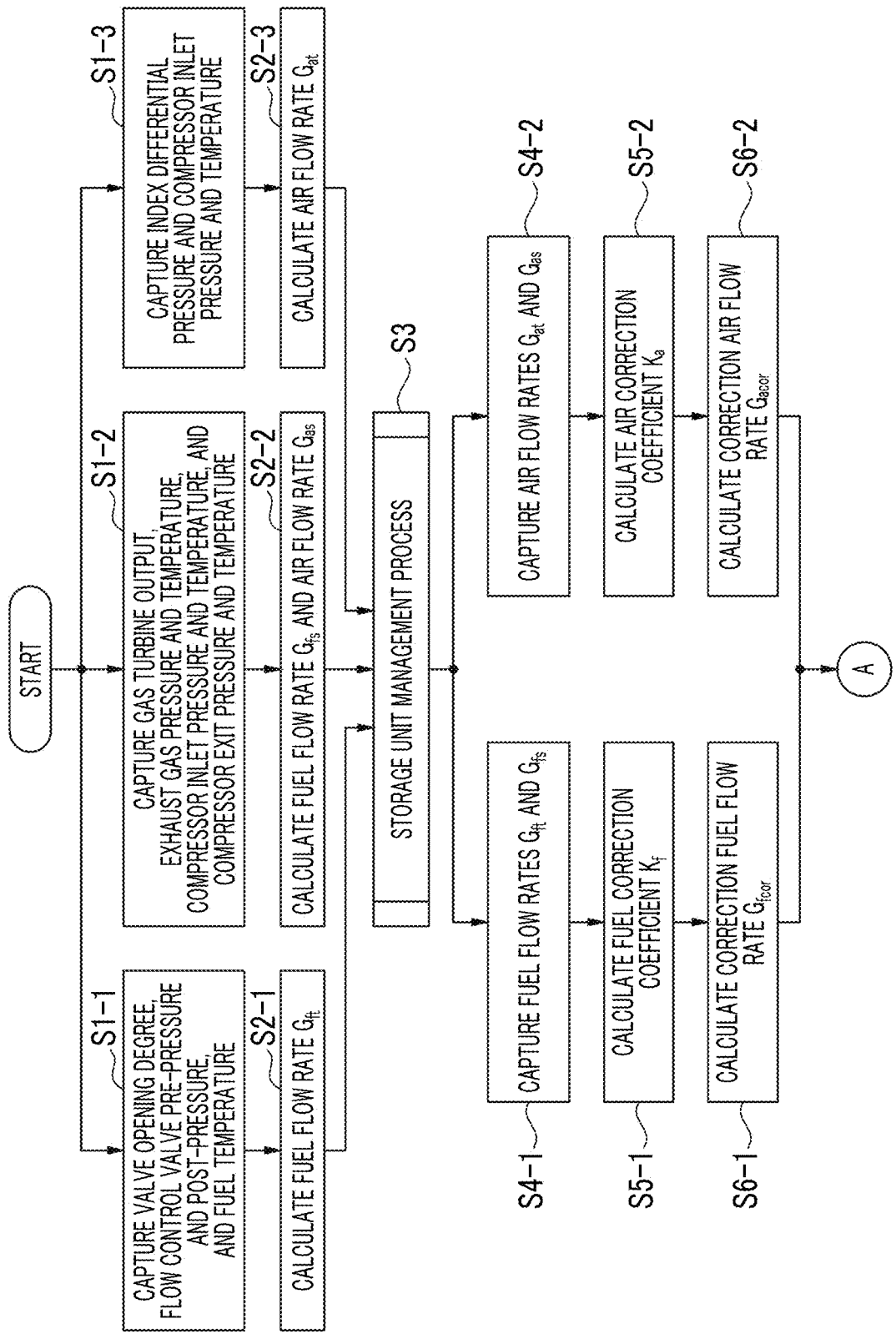
FIG. 3 is a flowchart (No. 1) illustrating an operation example of the gas turbine control device according to the first embodiment of the present disclosure.
Figure 4:
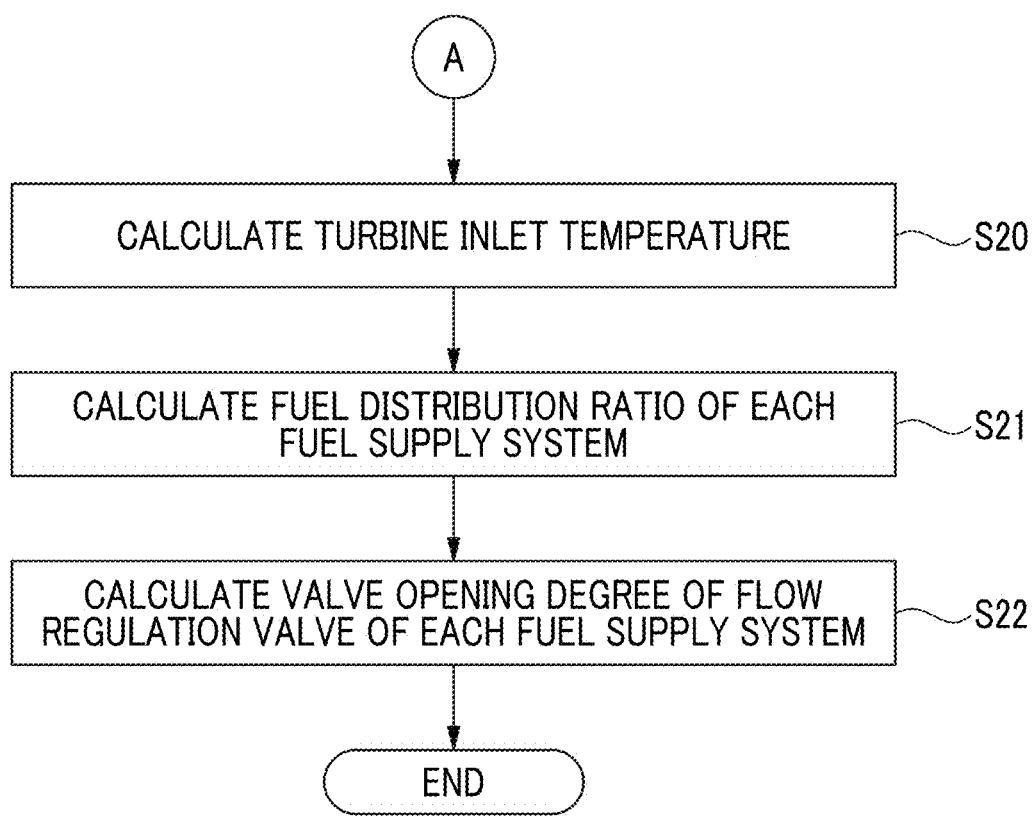
FIG. 4 is a flowchart (No. 2) illustrating an operation example of the gas turbine control device according to the first embodiment of the present disclosure.
Figure 5:
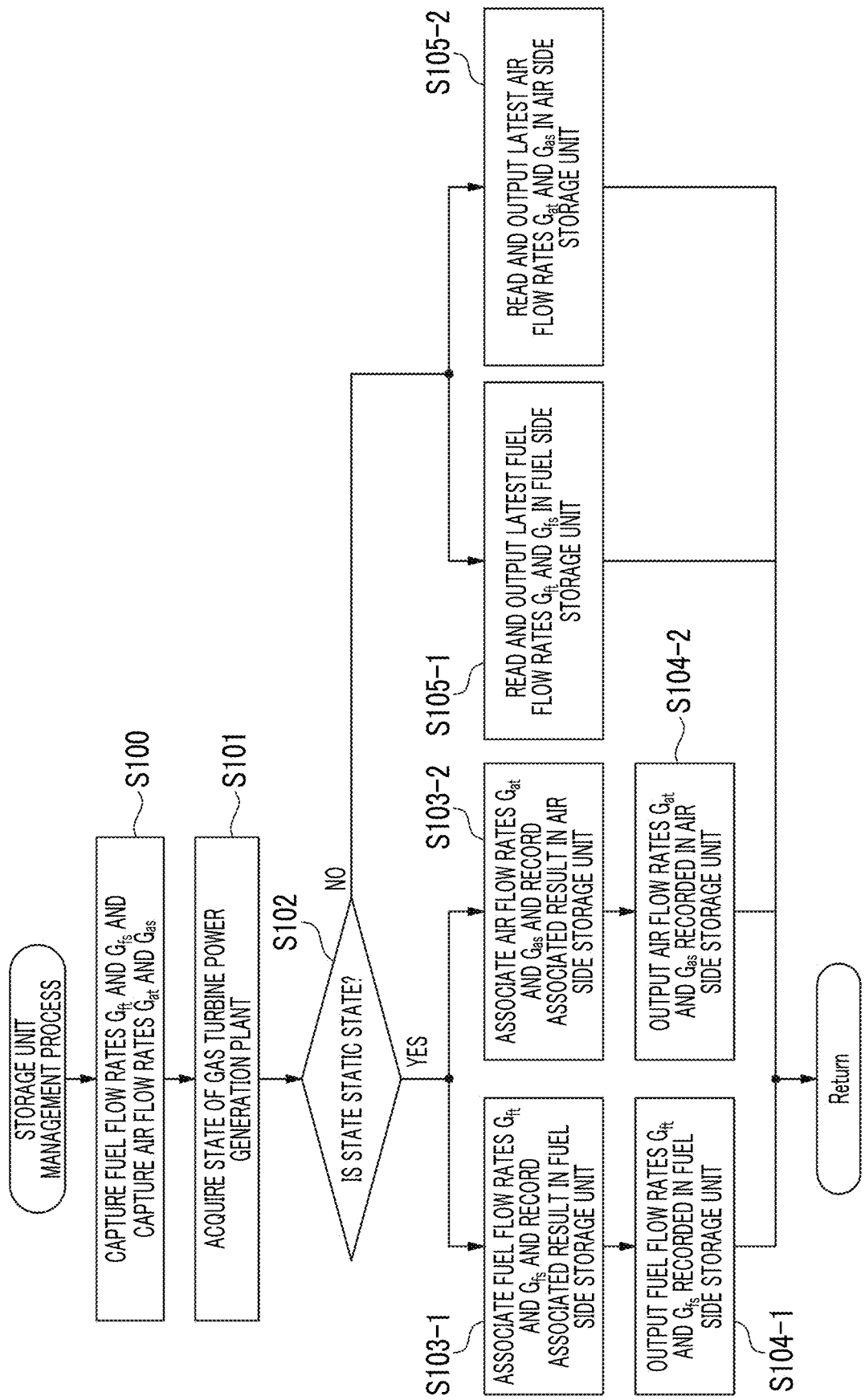
FIG. 5 is a flowchart (No. 3) illustrating an operation example of the gas turbine control device according to the first embodiment of the present disclosure.
Figure 6:
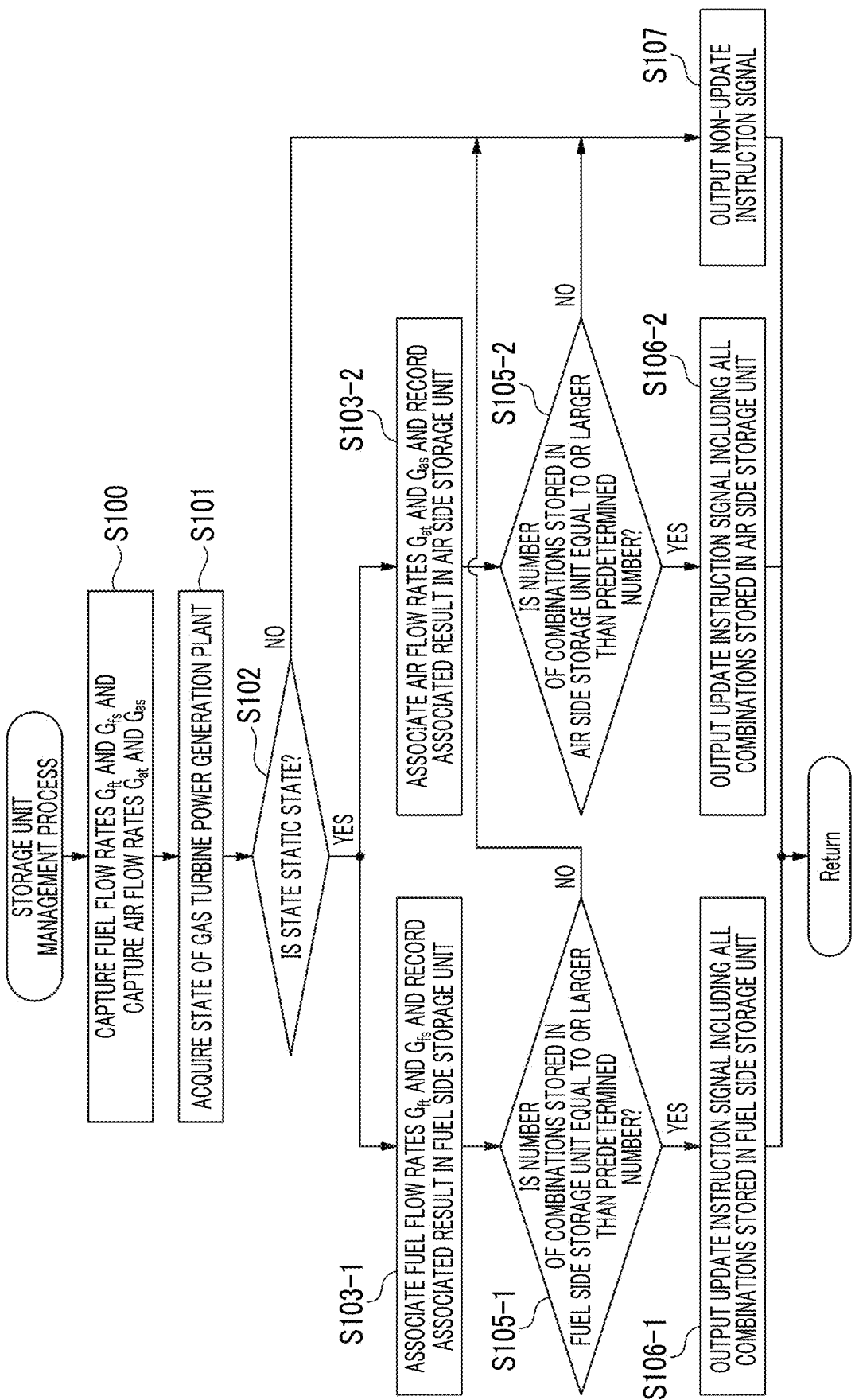
FIG. 6 is a flowchart (No. 1) illustrating an operation example of a gas turbine control device according to another configuration example of the first embodiment of the present disclosure.
Figure 7:
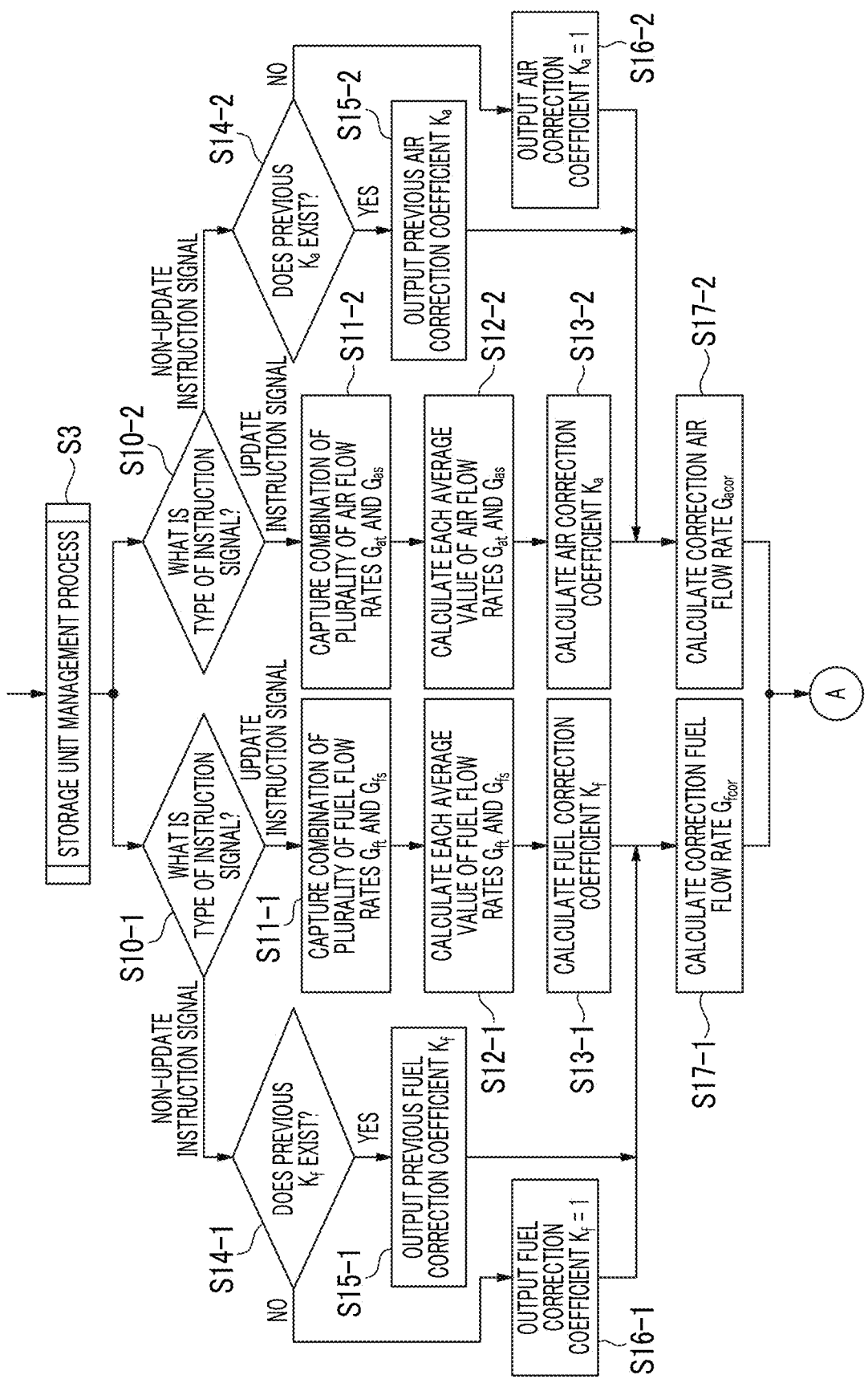
FIG. 7 is a flowchart (No. 2) illustrating an operation example of a gas turbine control device according to another configuration example of the first embodiment of the present disclosure.
Figure 8:
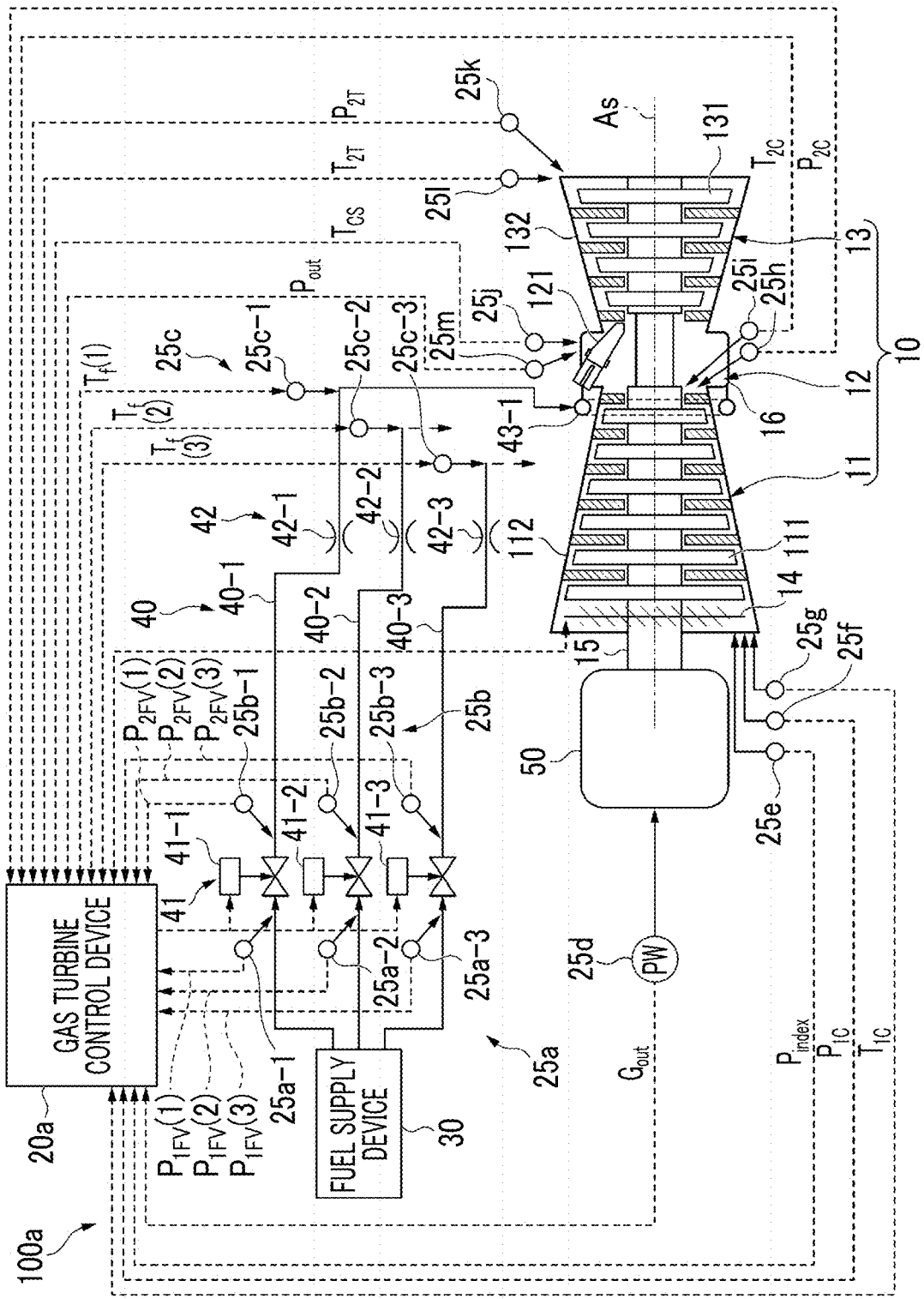
FIG. 8 is a schematic view illustrating configuration example of a gas turbine power generation plant according to a second embodiment of the present disclosure.
Figure 9:
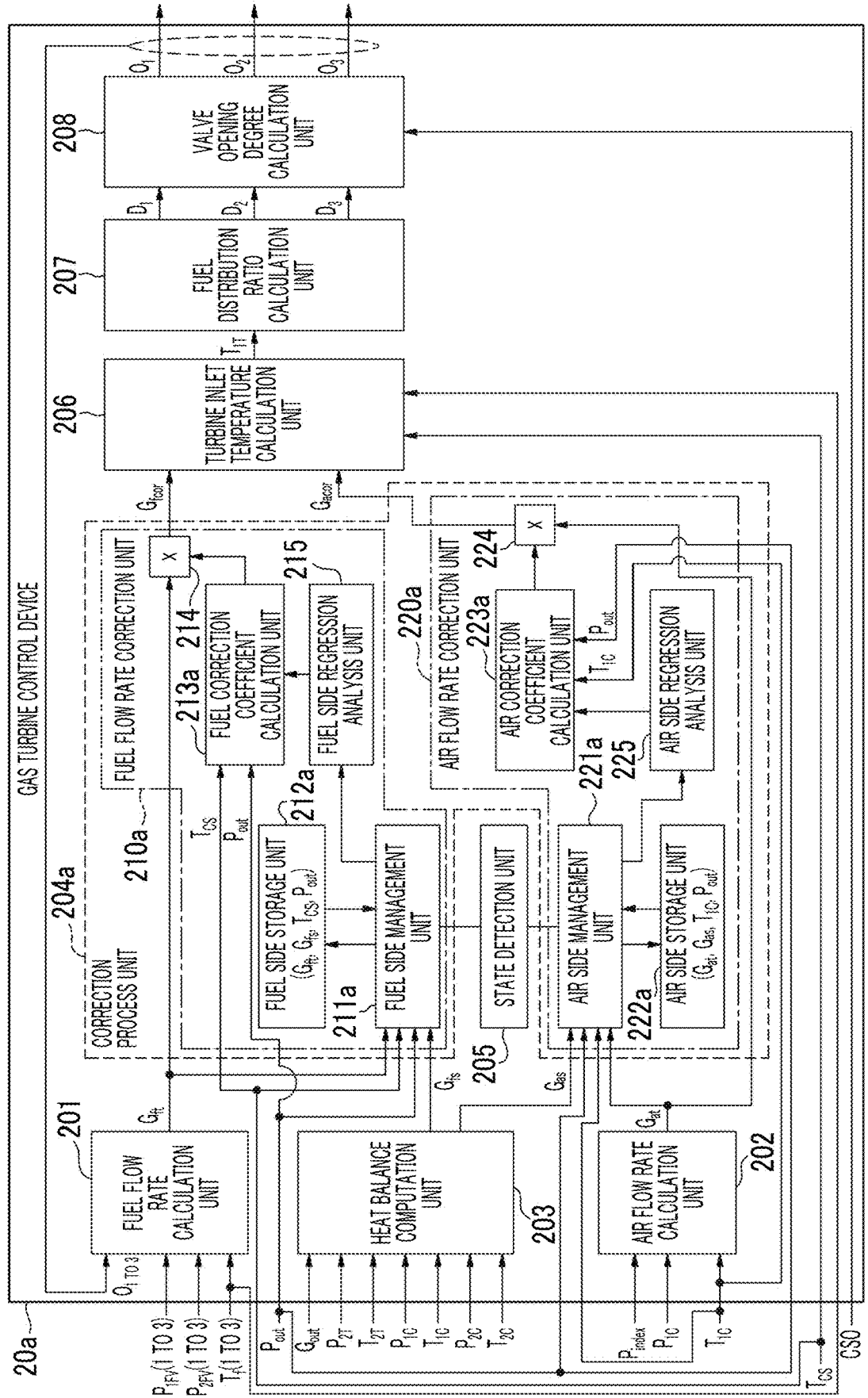
FIG. 9 is a block diagram illustrating a configuration example of a gas turbine control device according to the second embodiment of the present disclosure.
Figure 10:
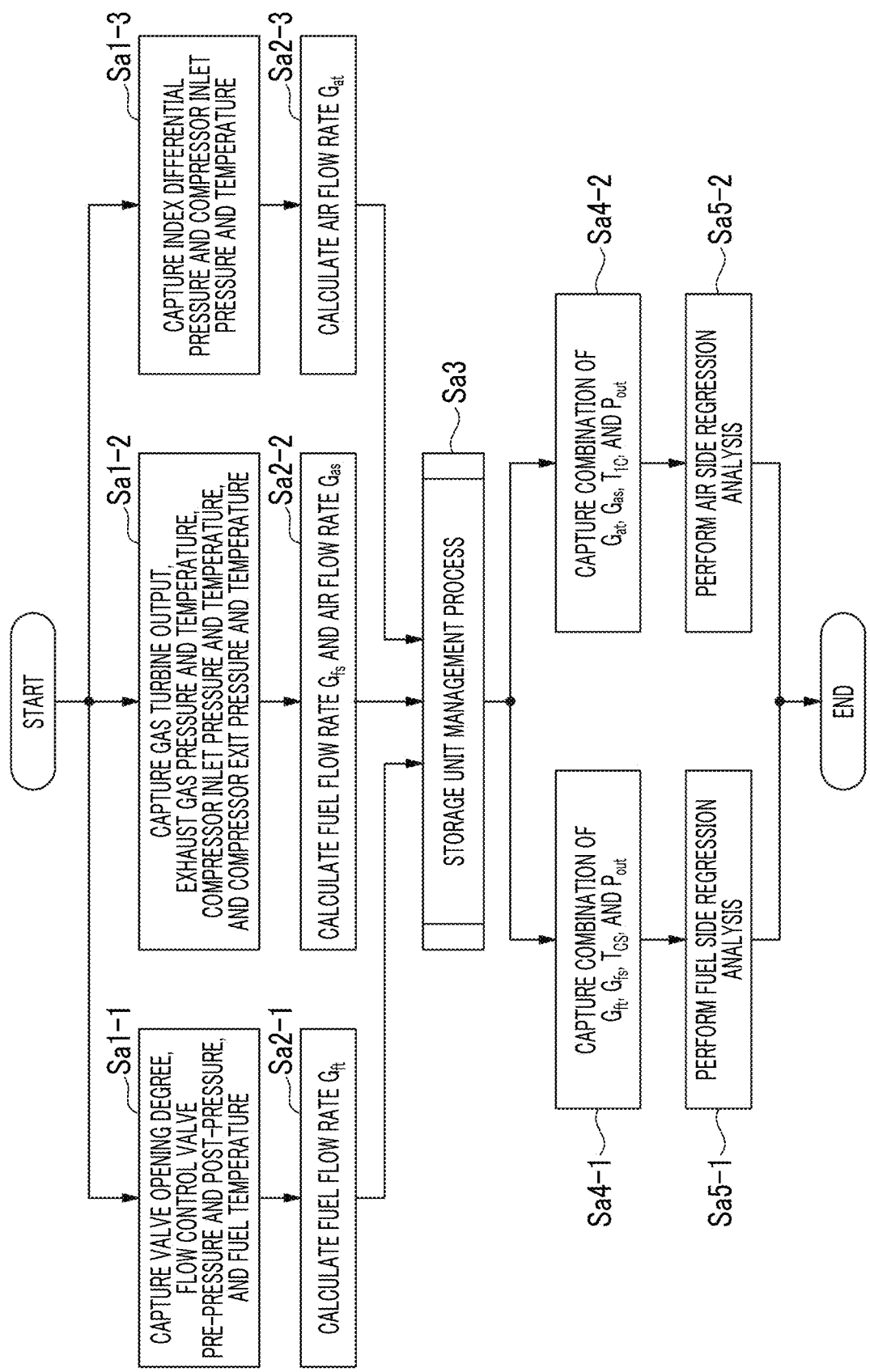
FIG. 10 is a flowchart (No. 1) illustrating an operation example of the gas turbine control device according to the second embodiment of the present disclosure.
Figure 11:
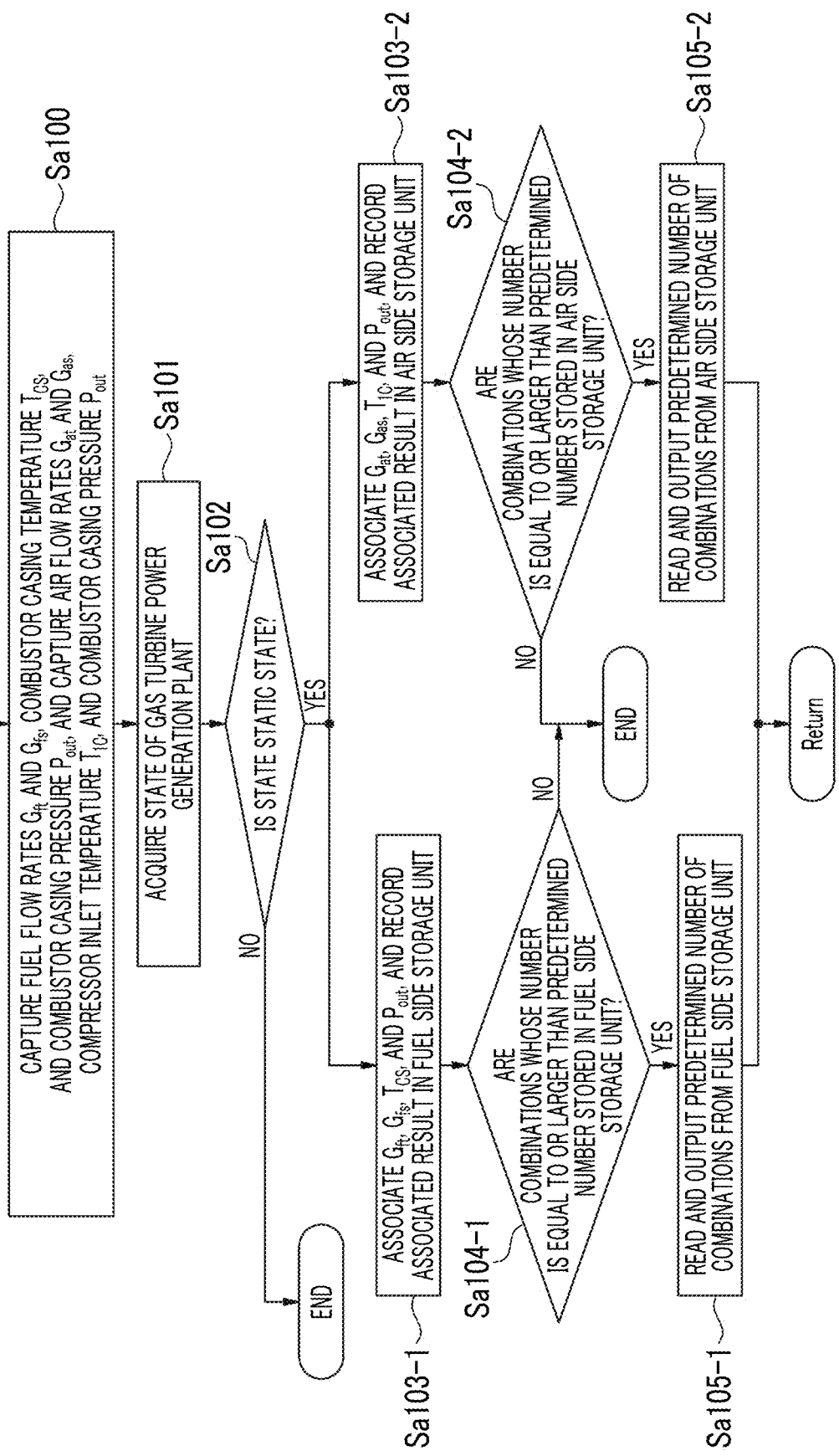
FIG. 11 is a flowchart (No. 2) illustrating an operation example of the gas turbine control device according to the second embodiment of the present disclosure.
Figure 12:
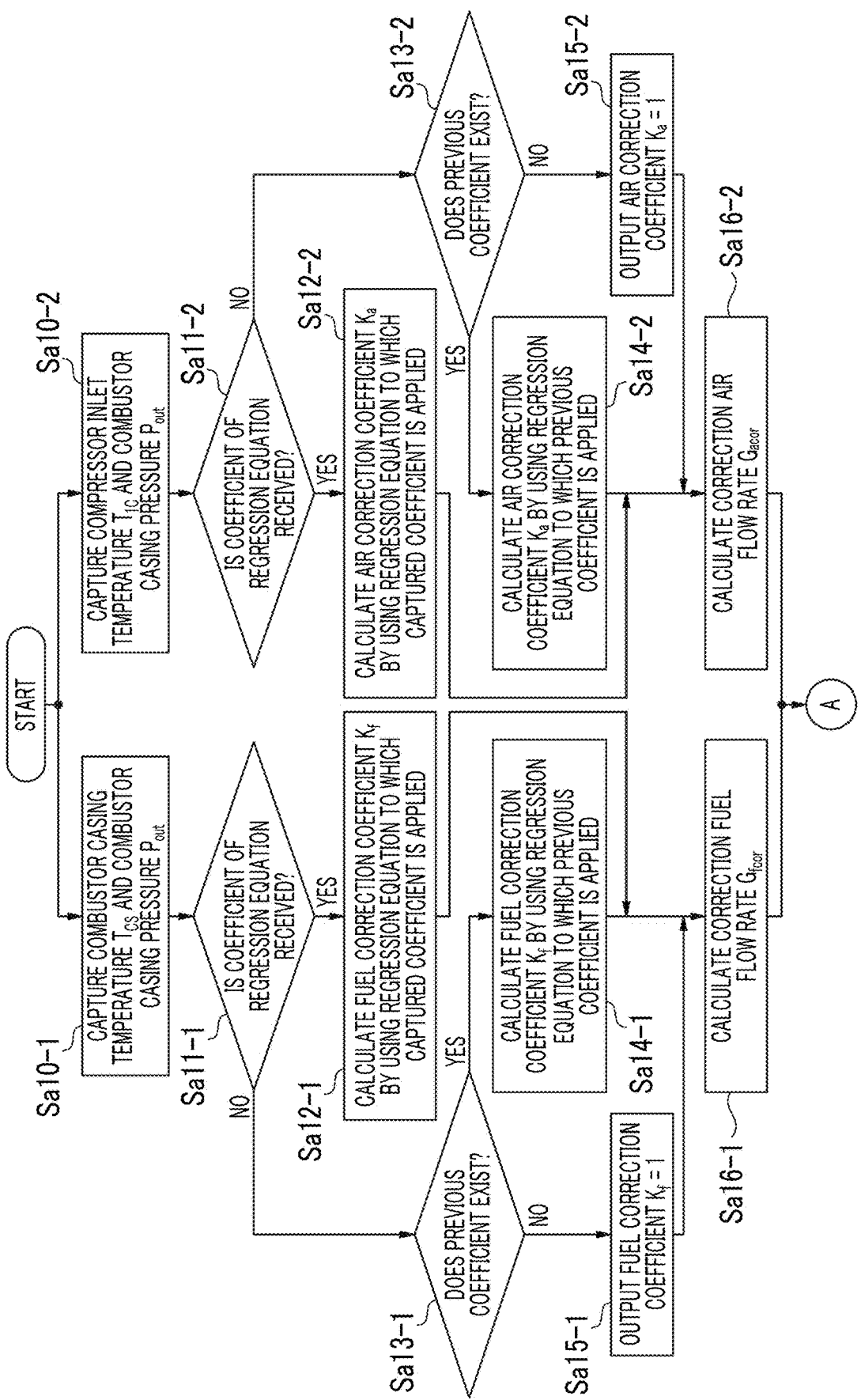
FIG. 12 is a flowchart (No. 3) illustrating an operation example of the gas turbine control device according to the second embodiment of the present disclosure.
Figure 13:
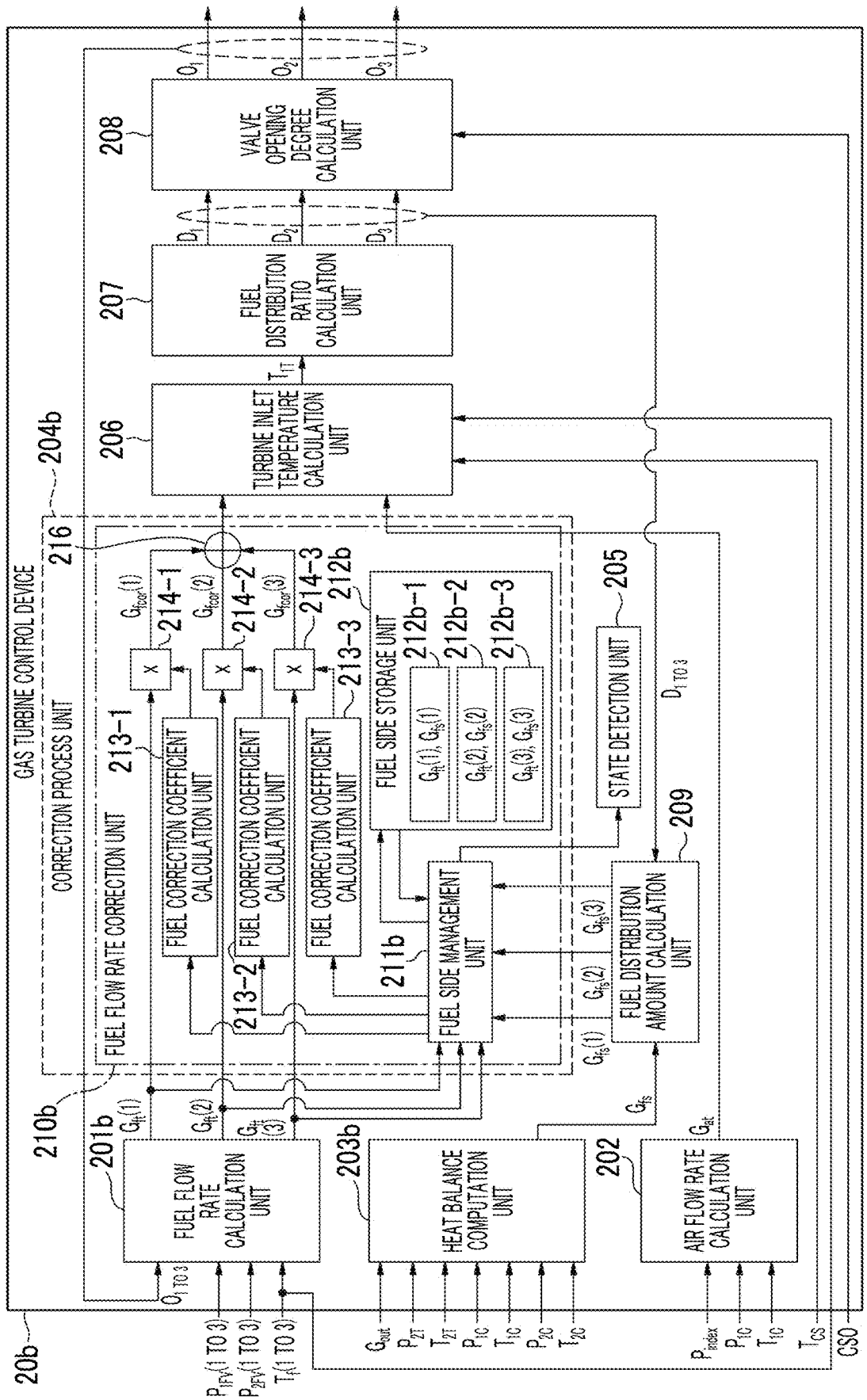
FIG. 13 is a block diagram illustrating a configuration example of a gas turbine control device according to a third embodiment of the present disclosure.
Figure 14:
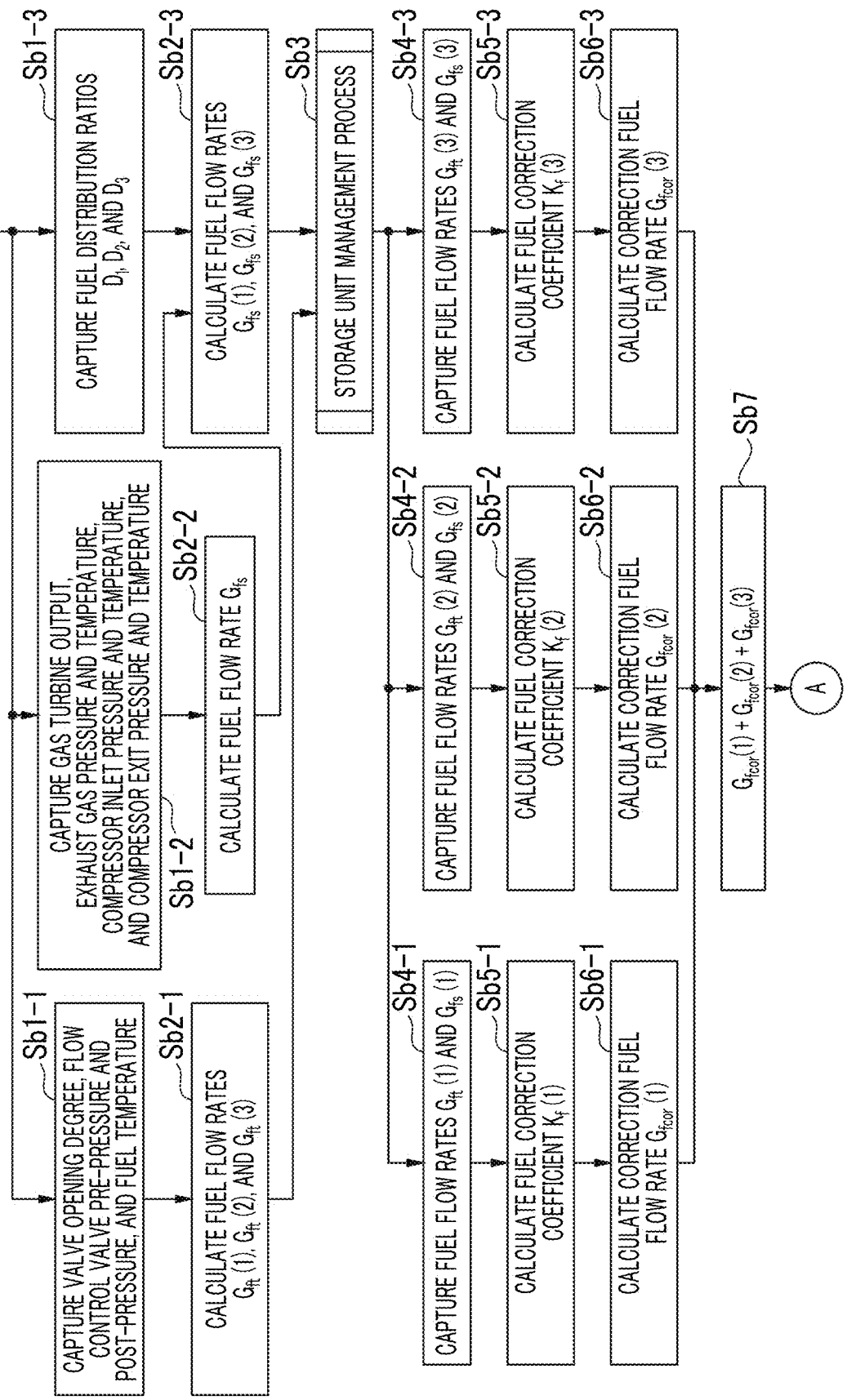
FIG. 14 is a flowchart (No. 1) illustrating an operation example of the gas turbine control device according to the third embodiment of the present disclosure.
Figure 15:
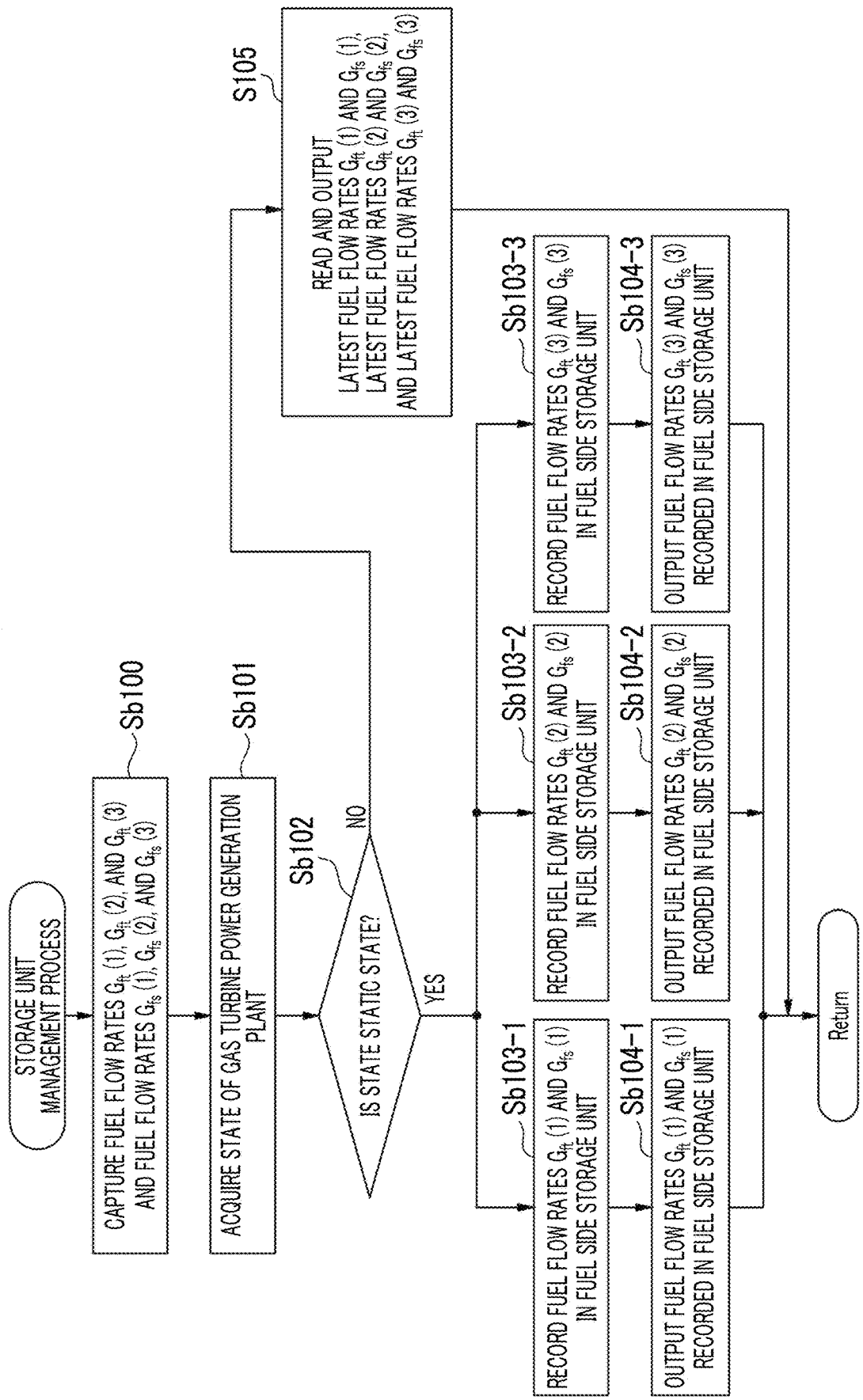
FIG. 15 is a flowchart (No. 2) illustrating an operation example of the gas turbine control device according to the third embodiment of the present disclosure.
Figure 16:
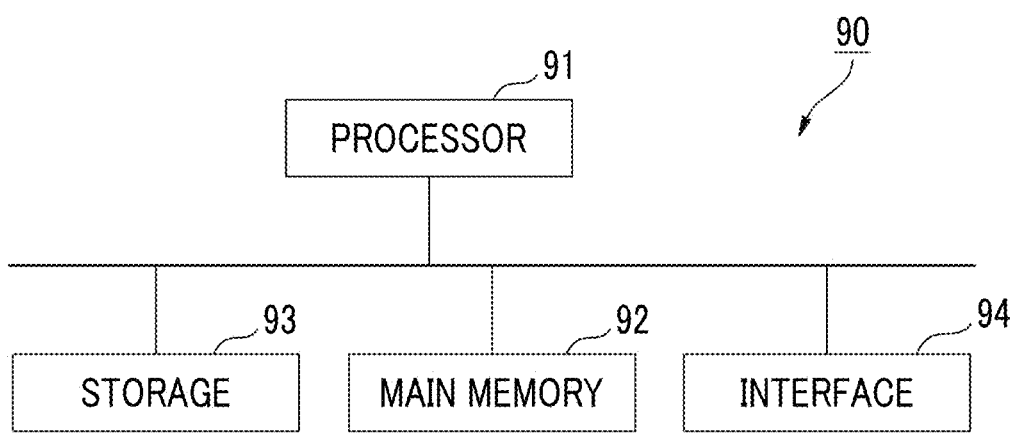
FIG. 16 is a schematic block diagram illustrating a configuration of a computer according to at least one embodiment.

Hereinafter, a gas turbine control device, a gas turbine control method, and a program according to embodiments of the present disclosure will be described with reference to FIGS. 1 to 16. FIG. 1 and FIG. 8 are schematic views illustrating configuration examples of gas turbine power generation plants 100 and 100a, respectively, according to first and second embodiments of the present disclosure. FIG. 2, FIG. 9, and FIG. 13 are block diagrams illustrating configuration examples of gas turbine control devices 20, 20a, and 20b, respectively, according to first to third embodiments of the present disclosure. FIGS. 3 to 5 are flowcharts illustrating an operation example of the gas turbine control device 20 according to the first embodiment of the present disclosure. FIGS. 6 and 7 are flowcharts illustrating an operation example of the gas turbine control device 20 according to another configuration example of the first embodiment of the present disclosure. FIGS. 10 to 12 are flowcharts illustrating an operation example of the gas turbine control device 20a according to the second embodiment of the present disclosure. FIGS. 14 and 15 are flowcharts illustrating an operation example of the gas turbine control device 20b according to the third embodiment of the present disclosure. FIG. 16 is a schematic block diagram illustrating a configuration of a computer according to at least one embodiment of the present disclosure. In each drawing, the same reference numerals will be assigned to the same or corresponding configurations, and description thereof will be omitted as appropriate.

In each embodiment according to the present disclosure, as illustrated in FIGS. 2 and 9, description will be made on an assumption that all computations are performed inside a single gas turbine control device. However, this assumption is merely an example of the configuration. That is, in another embodiment, for example, an aspect may be adopted as follows. A fuel flow rate and a turbine inlet temperature may be calculated by the gas turbine control device. Heat balance may be computed, and a correction coefficient may be calculated by a different computer. Alternatively, a combination of each computation process and hardware that executes the computation process can be changed as appropriate.

First Embodiment (Configuration Example of Gas Turbine Power Generation Plant of First Embodiment)

FIG. 1 is an overall configuration diagram of a gas turbine power generation plant 100 of the first embodiment. The gas turbine power generation plant 100 includes a gas turbine 10, a gas turbine control device 20 that controls the gas turbine 10, a fuel supply device 30 that supplies a fuel, a fuel supply system 40 that guides the fuel supplied by the fuel supply device 30 to the gas turbine 10, a generator 50 driven by power of the gas turbine 10 to generate power, and various sensors 25a to 25l that measure various state amounts and that transmit measurement data detected by the measurement to the gas turbine control device 20.

The gas turbine 10 includes a compressor 11, a combustor 12, and a turbine 13. The compressor 11 suctions air, and compresses the suctioned air to generate high-pressure compressed air. The compressed air generated by the compressor 11 is supplied to the combustor 12 and the turbine 13 on a downstream side. The compressor 11 includes a compressor rotor 111 that rotates around a main axis As serving as a central axis, a compressor casing 112 that covers the compressor rotor 111 from an outer peripheral side, and an inlet guide vane 14 (IGV) for adjusting an amount of air suctioned by the compressor 11. The inlet guide vane 14 is connected to the gas turbine control device 20 by a control line such as a communication line as indicated by a dotted line arrow, and the amount of the air suctioned by the compressor 11 is adjusted by the inlet guide vane 14 that receives a command value from the gas turbine control device 20.

The turbine 13 includes a turbine rotor 131 that rotates around the main axis As serving as the central axis, and a turbine casing 132 that covers the turbine rotor 131 from an outer peripheral side. The compressor rotor 111 and the turbine rotor 131 are connected to each other, and rotate integrally with the main axis As serving as the central axis. The combustor 12 generates a high-pressure and high-temperature combustion gas by injecting and combusting the fuel supplied from the fuel supply system 40 to the compressed air generated by the compressor 11. The combustor 12 includes a combustor inner cylinder 121 and a combustor casing 16 that covers the combustor inner cylinder 121. The combustor inner cylinder 121 injects and ignites the fuel supplied from the fuel supply system 40 to combust the fuel inside the combustor casing 16. The combustor casing 16 is connected to the compressor casing 112 and the turbine casing 132, and the combustion gas generated in the combustor casing 16 is supplied to the turbine casing 132 to rotate the turbine rotor 131. The compressor rotor 111 is integrally rotated by the rotation of the turbine rotor 131 to suction the air.

The fuel supply system 40 supplies the fuel supplied by the fuel supply device 30 to the combustor 12 at a predetermined pressure and flow rate through a fuel pipe. In FIG. 1, in addition to the fuel pipe connecting the fuel supply device 30 and the gas turbine 10 which is the fuel pipe indicated by a solid line arrow or a broken line arrow, the fuel supply system 40 includes a flow regulation valve (hereinafter, referred to as a flow control valve) 41 provided in the fuel pipe, a nozzle 42, and a manifold pipe 43.

The fuel supply system 40 includes three fuel supply systems of a fuel supply system 40-1, a fuel supply system 40-2, and a fuel supply system 40-3. The fuel supply device 30 branches the supplied fuel into three, and supplies each of the branched fuels to the fuel supply system 40-1, the fuel supply system 40-2, and the fuel supply system 40-3. For example, the fuel supply system 40-1 is a top hat fuel supply system for supplying the fuel to a top hat portion of the combustor 12. The fuel supply system 40-2 is a pilot fuel supply system for supplying the fuel to a central portion of the combustor inner cylinder 121. The fuel supply system 40-3 is a main fuel supply system for supplying the fuel to a portion surrounding the central portion of the combustor inner cylinder 121.

Since the fuel supply system 40 includes the three fuel supply systems 40-1 to 40-3, the flow control valve 41 has flow control valves 41-1, 41-2, and 41-3 corresponding to each of the fuel supply systems 40-1 to 40-3. Each of the flow control valves 41-1, 41-2, and 41-3 is connected to the gas turbine control device 20 by a control line such as a communication line as indicated by the dotted line arrow. When receiving a command value indicating a valve opening degree for each of the flow control valves 41-1, 41-2, and 41-3 from the gas turbine control device 20 through the control line, each of the flow control valves 41-1, 41-2, and 41-3 increases or decreases the valve opening degree at an opening degree according to the received command value.

As in the flow control valve 41, the nozzle 42 has nozzles 42-1, 42-2, and 42-3 corresponding to each of the fuel supply systems 40-1 to 40-3. With regard to the manifold pipe 43, only the manifold pipe 43 corresponding to the fuel supply system 40-1 is illustrated in FIG. 1 due to space limitations. However, in reality, the manifold pipes 43 are provided one by one for each of the fuel supply systems 40-1 to 40-3. Hereinafter, when it is necessary to individually describe the manifold pipes 43 corresponding to each of the fuel supply systems 40-1 to 40-3, all of these will be respectively referred to as the manifold pipes 43-1 to 43-3 by associating branch numbers of reference numerals. Each of the manifold pipes 43-1 to 43-3 is connected to the combustor 12. For example, the manifold pipe 43-1 supplies the fuel to the top hat portion of the combustor 12. The manifold pipe 43-2 supplies the fuel to the central portion of the combustor inner cylinder 121. The manifold pipe 43-3 supplies the fuel to the portion surrounding the central portion of the combustor inner cylinder 121.

A rotor 15 is connected to the compressor rotor 111, and integrally rotates around the main axis As serving as the central axis, together with the compressor rotor 111 and the turbine rotor 131. The generator 50 is connected to one end of the compressor rotor 111 via the rotor 15. The generator 50 is driven by the rotation of the rotor 15 to generate power.

Next, the various sensors $25a$ to $25l$ connected to the gas turbine control device 20 will be described. Each of the various sensors $25a$ to $25l$ is connected to the gas turbine control device 20 by a control line such as a communication line as indicated by a dotted line arrow, and measurement data detected through the measurement is transmitted to the gas turbine control device 20 through the control line.

A flow control valve pre-pressure sensor $25a$, a flow control valve post-pressure sensor $25b$, and a fuel temperature sensor $25c$ detect measurement data relating to the fuel supply system 40 as described below. The flow control valve pre-pressure sensor $25a$ has flow control valve pre-pressure sensors $25a$-1, $25a$-2, and $25a$-3 provided for each of the fuel supply systems 40-1, 40-2, and 40-3. The flow control valve pre-pressure sensors $25a$-1, $25a$-2, and $25a$-3 respectively detect flow control valve pre-pressures $P_{1FV}(1)$, $P_{1FV}(2)$, and $P_{1FV}(3)$ which are pressures of the fuel flowing into the respectively corresponding flow control valves 41-1, 41-2, and 41-3. The flow control valve post-pressure sensor $25b$ has flow control valve post-pressure sensors $25b$-1, $25b$-2, and $25b$-3 provided for each of the fuel supply systems 40-1, 40-2, and 40-3. The flow control valve post-pressure sensors $25b$-1, $25b$-2, and $25b$-3 respectively detect flow control valve post-pressures $P_{2FV}(1)$, $P_{2FV}(2)$, and $P_{2FV}(3)$ which are pressures of the fuel flowing out from each of the respectively corresponding flow control valves 41-1, 41-2, and 41-3.

The fuel temperature sensor $25c$ has fuel temperature sensors $25c$-1, $25c$-2, and $25c$-3 provided for each of the fuel supply systems 40-1, 40-2, and 40-3. The fuel temperature sensors $25c$-1, $25c$-2, and $25c$-3 respectively detect fuel temperatures $T_f(1)$, $T_f(2)$, and $T_f(3)$ which are temperatures of the fuel flowing through the fuel pipes of the respectively corresponding fuel supply systems 40-1, 40-2, and 40-3.

A power meter sensor $25d$, an index differential pressure sensor $25e$, a compressor inlet pressure sensor $25f$, a compressor inlet temperature sensor $25g$, a compressor exit pressure sensor $25h$, a compressor exit temperature sensor $25i$, a combustor casing temperature sensor $25j$, an exhaust gas pressure sensor 25k, and an exhaust gas temperature sensor 25l detect measurement data relating to the gas turbine as described below. The power meter sensor 25d detects the power generated by the generator 50, and detects the measured power as a gas turbine output $G_{out}$.

The index differential pressure sensor 25e detects a compressor index differential pressure $P_{index}$. Here, the compressor index differential pressure $P_{index}$ is a pressure difference between the pressure in a casing suction port of the compressor 11 and the pressure in the vicinity of a vane inside the compressor 11, and is a value serving as an index of the air flow rate suctioned by the compressor 11. The compressor inlet pressure sensor 25f detects a compressor inlet pressure $P_{1C}$ which is the pressure in the casing suction port of the compressor 11. The compressor inlet temperature sensor detects a 25g compressor inlet temperature $T_{1C}$ which is the temperature in the casing suction port of the compressor 11. The compressor exit pressure sensor 25h detects a compressor exit pressure $P_{2C}$ which is the pressure in an exit of the compressor 11. The compressor exit temperature sensor 25i detects a compressor exit temperature $T_{2C}$ which is the temperature in the exit of the compressor 11. The combustor casing temperature sensor 25j detects a combustor casing temperature $T_{CS}$ which is a combustion gas temperature, that is, the temperature of the air inside the combustor casing 16. The exhaust gas pressure sensor 25k detects an exhaust gas pressure $P_{2T}$ which is the pressure in an exit of the turbine 13. The exhaust gas temperature sensor 25l detects an exhaust gas temperature $T_{2T}$ which is the temperature in the exit of the turbine 13.

(Configuration Example of Gas Turbine Control Device of First Embodiment)

As illustrated in FIG. 2, the gas turbine control device 20 includes a fuel flow rate calculation unit 201, an air flow rate calculation unit 202, a heat balance computation unit 203, a correction process unit 204, a state detection unit 205, a turbine inlet temperature calculation unit 206, a fuel distribution ratio calculation unit 207, and a valve opening degree calculation unit 208.

In the gas turbine control device 20, the fuel flow rate calculation unit 201 calculates a fuel flow rate $G_{ft}$ indicating the amount of the fuel flowing into the combustor 12 of the gas turbine 10 per unit time by substituting each of data indicating valve opening degrees $O_1$, $O_2$, and $O_3$ provided as command values to the flow control valve 41 and the measurement data relating to each of the fuel supply systems 40-1, 40-2, and 40-3 into a predetermined fuel flow rate calculation function $f_1$ (•). Here, the measurement data relating to each of the fuel supply systems 40-1, 40-2, and 40-3 is data of the flow control valve pre-pressures $P_{1FV}$ (1), $P_{1FV}$ (2), and $P_{1FV}$ (3) detected by the flow control valve pre-pressure sensor 25a, the flow control valve post-pressures $P_{2FV}$ (1), $P_{2FV}$ (2), $P_{2FV}$ (3) detected by the flow control valve post-pressure sensor 25b, and the fuel temperatures $T_f$ (1), $T_f$ (2), and $T_f$ (3) detected by the fuel temperature sensor 25c. Based on the data, the fuel flow rate calculation unit 201 performs a computation using the fuel flow rate calculation function $f_1$ (•) for each of the fuel supply systems 40-1, 40-2, and 40-3 as represented in Equations (1), (2), and (3) below, and calculates a fuel flow rate $G_{ft}$ (1), a fuel flow rate $G_{ft}$ (2), and a fuel flow rate $G_{ft}$ (3) flowing into the combustor 12 through each of the fuel supply systems 40-1, 40-2, and 40-3 per unit time.

$$G_{ft}(1) = f_1(O_1, P_{1FV}(1), P_{2FV}(1), T_f(1)) \quad (1)$$

$$G_{ft}(2) = f_1(O_2, P_{1FV}(2), P_{2FV}(2), T_f(2)) \quad (2)$$

$$G_{ft}(3) = f_1(O_3, P_{1FV}(3), P_{2FV}(3), T_f(3)) \quad (3)$$

As represented in Equation (4) below, the fuel flow rate calculation unit 201 calculates a fuel flow rate $G_{ft}$ flowing into the combustor 12 through the fuel supply system 40 per unit time by summing up a fuel flow rate $G_{ft}$ (1) corresponding to the fuel supply system 40-1, a fuel flow rate $G_{ft}$ (2) corresponding to the fuel supply system 40-2, and a fuel flow rate $G_{ft}$ (3) corresponding to the fuel supply system 40-3.

$$G_{ft} = G_{ft}(1) + G_{ft}(2) + G_{ft}(3) \quad (4)$$

As represented in Equation (5) below, the air flow rate calculation unit 202 calculates an air flow rate $G_{at}$ indicating the amount of the air suctioned by the compressor 11 of the gas turbine 10 per unit time by substituting the measurement data relating to the compressor 11 of the gas turbine 10, that is, the compressor index differential pressure $P_{index}$ detected by the index differential pressure sensor 25e, the compressor inlet pressure Pic detected by the compressor inlet pressure sensor 25f, and the compressor inlet temperature $T_{1C}$ detected by the compressor inlet temperature sensor 25g, into a predetermined air flow rate calculation function $f_2$ (•).

$$G_{at} = f_2(P_{index}, P_{1C}, T_{1C}) \quad (5)$$

The heat balance computation unit 203 calculates a fuel flow rate $G_{fs}$ and an air flow rate $G_{as}$ when the measurement data is obtained, by applying the measured measurement data to overall energy balance of the gas turbine 10, that is, a computation equation indicating that work balance or heat balance matches thereinafter, referred to as a gas turbine heat balance computation equation). For example, the measurement data applied to the gas turbine heat balance computation equation by the heat balance computation unit 203 is the gas turbine output $G_{out}$ detected by the power meter sensor 25d, the exhaust gas pressure $P_{2T}$ detected by the exhaust gas pressure sensor 25k, the exhaust gas temperature $T_{2T}$ detected by the exhaust gas temperature sensor 25l, the compressor inlet pressure $P_{1C}$ detected by the compressor inlet pressure sensor 25f, the compressor inlet temperature $T_{1C}$ detected by the compressor inlet temperature sensor 25g, the compressor exit pressure $P_{2C}$ detected by the compressor exit pressure sensor 25h, and the compressor exit temperature $T_{2C}$ detected by the compressor exit temperature sensor 25i.

The state detection unit 205 detects whether a state of the gas turbine power generation plant 100 is a transient state or a static state, based on a temporal change amount of a state amount of the gas turbine power generation plant 100 represented by various measurement data detected by the various sensors 25a to 25l connected to the gas turbine control device 20 or on the power generated by the generator 50. For example, the state detection unit 205 detects the state of the gas turbine power generation plant 100 as the static state when the temporal change amount in the state amount is smaller than a predetermined threshold value. In contrast, the state detection unit 205 detects the state of the gas turbine power generation plant 100 as the transient state when the temporal change amount is equal to or greater than the threshold value.

The correction process unit 204 includes a fuel flow rate correction unit 210 and an air flow rate correction unit 220. The fuel flow rate correction unit 210 includes a fuel side management unit 211, a fuel side storage unit 212, a fuel correction coefficient calculation unit 213, and a fuel correction coefficient application unit 214. The fuel side management unit 211 associates the fuel flow rate $G_{ft}$ calculated by the fuel flow rate calculation unit 201 and the fuel flow rate $G_{fs}$ calculated by the heat balance computation unit 203 with each other in accordance with a state detected by the state detection unit 205, and writes and stores a result in the fuel side storage unit 212. The fuel side management unit 211 outputs a latest combination of the fuel flow rate $G_{ft}$ and the fuel flow rate $G_{fs}$ to the fuel correction coefficient calculation unit 213.

The fuel side storage unit 212 stores the combination of the fuel flow rate $G_{ft}$ and the fuel flow rate $G_{fs}$ in a time-series order. The fuel correction coefficient calculation unit 213 calculates a fuel correction coefficient $K_f (=G_{fs}/G_{ft})$ by dividing the latest fuel flow rate $G_{fe}$ by the latest fuel flow rate $G_{ft}$. For example, the fuel correction coefficient application unit 214 is a multiplier, corrects the fuel flow rate $G_{ft}$ by multiplying the fuel flow rate $G_{ft}$ calculated by the fuel flow rate calculation unit 201 by the fuel correction coefficient $K_f$ calculated by the fuel correction coefficient calculation unit 213, and outputs a correction fuel flow rate $G_{fcor}$ $(=G_{ft} \times K_f)$ which is the corrected fuel flow rate $G_{ft}$.

The air flow rate correction unit 220 includes an air side management unit 221, an air side storage unit 222, an air correction coefficient calculation unit 223, and an air correction coefficient application unit 224. The air side management unit 221 associates the air flow rate $G_{at}$ calculated by the air flow rate calculation unit 202 and the air flow rate $G_{as}$ calculated by the heat balance computation unit 203 with each other in accordance with a state detected by the state detection unit 205, and writes and stores the associated result in the air side storage unit 222. The air side management unit 221 outputs the latest combination of the air flow rate $G_{at}$ and the air flow rate $G_{as}$ to the air correction coefficient calculation unit 223.

The air side storage unit 222 stores the combination of the air flow rate $G_{at}$ and the air flow rate $G_{as}$ in a time-series order. The air correction coefficient calculation unit 223 divides the latest air flow rate $G_{as}$ by the latest air flow rate $G_{at}$ to calculate an air correction coefficient $K_a$ $(=G_{an}/G_{at})$. For example, the air correction coefficient application unit 224 is a multiplier, corrects the air flow rate $G_{at}$ by multiplying the air flow rate $G_{at}$ calculated by the air flow rate calculation unit 202 by the air correction coefficient $K_a$ calculated by the air correction coefficient calculation unit 223, and outputs a correction air flow rate $G_{acor}$ $(=G_{at} \times K_a)$ which is the corrected air flow rate $G_{at}$.

As represented in Equation (6) below, the turbine inlet temperature calculation unit 206 calculates the turbine inlet temperature $T_{1T}$ by substituting the correction fuel flow rate $G_{fcor}$, the correction air flow rate $G_{acor}$, the combustor casing temperature $T_{C3}$ detected by the combustor casing temperature sensor 25j, and the fuel temperature $T_f$ which is an average value of the fuel temperatures $T_f(1)$, $T_f(2)$, and $T_f(3)$ detected by the fuel temperature sensors 25c-1 to 25c-3 into an equation for solving the heat balance around the predetermined combustor 12; that is, a function $f_3$ (•) which is a physical model equation relating to the heat energy balance relating to the combustor 12.

$$T_{1T} = f_3(G_{fcor}, G_{acor}, T_{CS}, T_f) \quad (6)$$

Here, for example, the physical model equation relating to the heat energy balance represented by the function $f_3$ (•) of Equation (6) above is an equation obtained by modifying a non-stationary physical model. For example, the equation representing the non-stationary physical model is a model equation representing that the heat energy flowing into the combustor 12 and the heat energy flowing out from the combustor 12 are equal to each other. A physical model equation relating to the heat energy balance can be obtained by being transformed into an equation in which the turbine inlet temperature $T_{1T}$ included in the model equation is set to a left side and other elements are set to a right side. The heat energy flowing into the combustor 12 in the non-stationary physical model is represented by a total of the heat energy of the fuel, the heat energy of the air, and the heat generation energy of the combustion gas. The heat energy flowing out from the combustor 12 is represented by the heat energy in the inlet of the turbine 13.

Based on the turbine inlet temperature $T_{1T}$ calculated by the turbine inlet temperature calculation unit 206, the fuel distribution ratio calculation unit 207 calculates fuel distribution ratios $D_1$, $D_2$, and $D_3$ with respect to each of the fuel supply systems 40-1, 40-2, and 40-3 by using a relational equation between the predetermined turbine inlet temperature $T_{1T}$ and the fuel distribution ratio. The total of the three fuel distribution ratios $D_1$, $D_2$, and $D_3$ calculated by the fuel distribution ratio calculation unit 207 is 100%.

The valve opening degree calculation unit 208 calculates the valve opening degrees $O_1$, $O_2$, and $O_3$ for each of the flow control valves 41-1, 41-2, and 41-3 by using a predetermined valve opening degree calculation equation, based on the fuel distribution ratios $D_1$, $D_2$, and $D_3$ calculated by the fuel distribution ratio calculation unit 207 and on a fuel control signal command value (CSO: control signal output) provided from the outside. The fuel control signal command value (CSO) is a control output signal for controlling the fuel flow rate to be supplied to the combustor 12. The valve opening degree calculation unit 208 provides each of the calculated valve opening degrees $O_1$, $O_2$, and $O_3$ as command values for the respectively corresponding flow control valves 41-1, 41-2, and 41-3. In this manner, the opening degree of the flow control valve 41-1 is adjusted in accordance with the valve opening degree $O_1$. The opening degree of the flow control valve 41-2 is adjusted in accordance with the valve opening degree $O_3$. The opening degree of the flow control valve 41-3 is adjusted in accordance with the valve opening degree $O_3$. The valve opening degree calculation unit 208 feeds back the calculated valve opening degrees $O_1$, $O_2$, and $O_3$ to the fuel flow rate calculation unit 201.

(Operation Example of Gas Turbine Control Device of First Embodiment)

Processes performed by the gas turbine control device 20 will be described with reference to FIGS. 3 to 5. The flow control valve pre-pressure sensors 25a-3 to 25a-3, the flow control valve post-pressure sensors 25b-1 to 25b-3, and the fuel temperature sensors 25c-1 to 25c-3 perform the measurement at each detection cycle, and transmit the measurement data detected by performing the measurement to the gas turbine control device 20 through the control line.

The fuel flow rate calculation unit 201 receives and captures the flow control valve pre-pressures $P_{1FV}$ (1), $P_{1PV}$ (2), and $P_{1PV}$ (3) transmitted by the flow control valve pre-pressure sensors 25a-1 to 25a-3, the flow control valve post-pressures $P_{2PV}$ (1), $P_{2PV}$ (2), and $P_{2PV}$ (3) transmitted by the flow control valve post-pressure sensors 25b-1 to 25b-3, and the fuel temperatures $T_f$ (1), $T_f$ (2), and $T_f$ (3) transmitted by the fuel temperature sensors 25c-1 to 25c-3. The fuel flow rate calculation unit 201 captures the valve opening degrees $O_1$, $O_2$, and $O_3$ calculated and output by the valve opening degree calculation unit 208 in the previous detection cycle (S1-1).

The fuel flow rate calculation unit 201 substitutes the data captured in the process in Step S1-1 into Equations (1), (2), and (3) as described above, and calculates the fuel flow rates $G_{ft}$ (1), $G_{ft}$ (2), and $G_{ft}$ (3). As represented in Equation (4), the fuel flow rate calculation unit 201 sums up the fuel flow rates $G_{ft}$ (1), $G_{ft}$ (2), and $G_{ft}$ (3), and calculates the fuel flow rate $G_{ft}$ indicating the amount of the fuel flowing into the combustor 12 of the gas turbine 10 per unit time. The fuel flow rate calculation unit 201 outputs the calculated fuel flow rate $G_{ft}$ to the fuel side management unit 211 and the fuel correction coefficient application unit 214 (S2-1).

The power meter sensor 25d, the exhaust gas pressure sensor 25k, the exhaust gas temperature sensor 25l, the compressor inlet pressure sensor 25f, the compressor inlet temperature sensor 25g, the compressor exit pressure sensor 25h, and the compressor exit temperature sensor 25i transmit the measurement data detected by performing the measurement at each detection cycle to the gas turbine control device 20 through the control line.

The heat balance computation unit 203 receives and captures the gas turbine output $G_{out}$ transmitted by the power meter sensor 25d, the exhaust gas pressure $P_{2T}$ transmitted by the exhaust gas pressure sensor 25k, the exhaust gas temperature $T_{2T}$ transmitted by the exhaust gas temperature sensor 25l, the compressor inlet pressure $P_{1C}$ transmitted by the compressor inlet pressure sensor 25f, the compressor inlet temperature $T_{1C}$ transmitted by the compressor inlet temperature sensor 25g, the compressor exit pressure $P_{2C}$ transmitted by the compressor exit pressure sensor 25h, and the compressor exit temperature $T_{2C}$ transmitted by the compressor exit temperature sensor 25i (S1-2). The heat balance computation unit 203 calculates the fuel flow rate $G_{fs}$ and the air flow rate $G_{as}$, based on the data captured in the process in Step S1-2 and on the gas turbine heat balance computation equation. The heat balance computation unit 203 outputs the calculated fuel flow rate $G_{fs}$ to the fuel side management unit 211, and outputs the calculated air flow rate $G_{as}$ to the air side management unit 221 (S2-2).

The index differential pressure sensor 25e performs the measurement at each detection cycle, and transmits the data of the compressor index differential pressure $P_{index}$ which is the measurement data detected by performing the measurement to the gas turbine control device 20 through the control line. The air flow rate calculation unit 202 receives and captures the compressor index differential pressure $P_{index}$ transmitted by the index differential pressure sensor 25e, the compressor inlet pressure $P_{1C}$ transmitted by the compressor inlet pressure sensor 25f, and the compressor inlet temperature $T_{1C}$ transmitted by the compressor inlet temperature sensor 25g (S1-3). As described above, the air flow rate calculation unit 202 substitutes the data captured in the process in Step S1-3 into Equation (5), and calculates the air flow rate $G_{at}$ indicating the amount of the air auctioned by the compressor 11 of the gas turbine 10 per unit time. The air flow rate calculation unit 202 outputs the calculated air flow rate $G_{at}$ to the air side management unit 221 and the air correction coefficient application unit 224 (S2-3). In FIG. 3, a set of processes in Steps S1-1 and S2-1, a set of processes in Steps S1-2 and 32-2, and a set of processes in Steps S1-3 and S2-3 are performed in parallel.

When receiving the fuel flow rate $G_{ft}$, the fuel flow rate $G_{fs}$, the air flow rate $G_{at}$, and the air flow rate $G_{as}$, the correction process unit 204 starts a subroutine of a storage unit management process illustrated in FIG. 5 (S3).

In the fuel flow rate correction unit 210, the fuel side management unit 211 captures the fuel flow rate $G_{ft}$ output by the fuel flow rate calculation unit 201 and the fuel flow rate $G_{fs}$ output by the heat balance computation unit 203. In the air flow rate correction unit 220, the air side management unit 221 captures the air flow rate $G_{at}$ output by the air flow rate calculation unit 202 and the air flow rate $G_{as}$ output by the heat balance computation unit 203 (S100). Each of the fuel side management unit 211 and the air side management unit 221 acquires the data indicating a state of the gas turbine power generation plant 100 detected by the state detection unit 205 from the state detection unit 205 at a time at which the process in Step S100 performed by each of the fuel side management unit 211 and the air side management unit 221 is completed (S101). Each of the fuel side management unit 211 and the air side management unit 221 determines whether or not the acquired data indicating the state indicates a static state (S102).

When the fuel side management unit 211 determines in the process in Step S102 that the acquired data indicating the state indicates the static state (S102, Yes), the fuel side management unit 211 associates the fuel flow rate $G_{ft}$ and the fuel flow rate $G_{fe}$ which are captured in the process in Step S100 in the fuel side storage unit 212 with each other, and writes and stores the associated result in the fuel side storage unit 212. The fuel side management unit 211 writes a combination of the fuel flow rate $G_{ft}$ and the fuel flow rate $G_{ft}$ which are sequentially written in the fuel side storage unit 212 to be stored in the fuel side storage unit 212 in a time-series order, for example, so that a newly written combination is stored in the fuel side storage unit 212 at the beginning of the time-series order (S103-1). The fuel side management unit 211 outputs the combination of the fuel flow rate $G_{ft}$ and the fuel flow rate $G_{fe}$ written in the fuel side storage unit 212 to the fuel correction coefficient calculation unit 213 (S104-1).

On the other hand, when the fuel side management unit 211 determines in the process in Step S102 that the acquired data indicating the state does not indicate the static state (S102, No), the fuel side management unit 211 discards the fuel flow rate $G_{ft}$ and the fuel flow rate $G_{fe}$ which are captured in the process in Step S100, and reads the latest combination of the fuel flow rate $G_{ft}$ and the fuel flow rate $G_{ft}$ out of the combinations stored in the fuel side storage unit 212. As described above, when the fuel side storage unit 212 stores the latest combination to be the beginning of the time-series order, the fuel side management unit 211 reads the combination stored at the beginning of the fuel side storage unit 212 as the latest combination of the fuel flow rate $G_{ft}$ and the fuel flow rate $G_{fs}$. The fuel side management unit 211 outputs the read latest combination of the fuel flow rate $G_{ft}$ and the fuel flow rate $G_{fe}$ to the fuel correction coefficient calculation unit 213 (S105-1).

When the air side management unit 221 determines in the process in Step S102 that the acquired data indicating the state indicates the static state (S302, Yes), the processes in Steps S103-2 and S104-2 are performed. On the other hand, when the air side management unit 221 determines in the process in Step S102 that the acquired data indicating the state does not indicate the static state (S102, No), the process in Step S105-2 is performed. Here, each of the processes in Steps S103-2, S104-2, and S105-2 is the following process. In the processes in Steps S103-1, S104-1, and S105-1 in which the branch number of each step number is replaced with "-1", the fuel flow rate $G_{ft}$ is replaced with the air flow rate $G_{at}$, the fuel flow rate $G_{fe}$ is replaced with the air flow rate $G_{ss}$, the fuel side management unit 211 is replaced with the air side management unit 221, the fuel side storage unit 212 is replaced with the air side storage unit 222, and the fuel correction coefficient calculation unit 213 is replaced with the air correction coefficient calculation unit 223.

In this manner, when the state detected by the state detection unit 205 is the static state, the fuel side management unit 211 outputs the recently captured combination of the fuel flow rate $G_{ft}$ and the fuel flow rate $G_{fs}$ to the fuel correction coefficient calculation unit 213. When the state detected by the state detection unit 205 is not the static state, the fuel side management unit 211 outputs the latest combination of the fuel flow rate $G_{ft}$ and the fuel flow rate $G_{fs}$ stored in the fuel side storage unit 212 to the fuel correction coefficient calculation unit 213. In other words, regardless of the state detected by the state detection unit 205, the fuel side management unit 211 outputs the latest combination of the fuel flow rate $G_{ft}$ and the fuel flow rate $G_{fs}$ in the static state to the fuel correction coefficient calculation unit 213. Similarly, regardless of the state detected by the state detection unit 205, the air side management unit 221 outputs the latest combination of the air flow rate $G_{at}$ and the air flow rate $G_{as}$ in the static state to the air correction coefficient calculation unit 223. When the processes in Steps S104-1, S104-2, S105-1, and S105-2 are completed, a subroutine of the storage unit management process in FIG. 5 is completed, and the process returns to the process in FIG. 3. In FIG. 5, the process performed by the fuel side management unit 211 and the process performed by the air side management unit 221 are performed in parallel.

As illustrated in Step S4-1 in FIG. 3, the fuel correction coefficient calculation unit 213 captures the combination of the fuel flow rate $G_{ft}$ and the fuel flow rate $G_{fs}$ output by the fuel side management unit 211 (S4-1). The fuel correction coefficient calculation unit 213 calculates the fuel correction coefficient $K_f$ by dividing the fuel flow rate $G_{fs}$ by the fuel flow rate $G_{ft}$. The fuel correction coefficient calculation unit 213 outputs the calculated fuel correction coefficient $K_f$ to the fuel correction coefficient application unit 214 (S5-1). The fuel correction coefficient application unit 214 captures the fuel flow rate $G_{ft}$ output by the fuel flow rate calculation unit 201 and the fuel correction coefficient $K_f$ output by the fuel correction coefficient calculation unit 213. The fuel correction coefficient application unit 214 calculates the correction fuel flow rate $G_{fcor}$ by multiplying the fuel flow rate $G_{ft}$ by the fuel correction coefficient $K_f$. The fuel correction coefficient application unit 214 outputs the calculated correction fuel flow rate $G_{fcor}$ to the turbine inlet temperature calculation unit 206 (S6-1).

Processes in Steps S4-2, S5-2, and S6-2 in FIG. 3 are performed by the air flow rate correction unit 220. Here, each of the processes in Steps S4-2, S5-2, and S6-2 is the following process. In the processes in S4-1, S5-1, and S6-1 in which the branch number of each step number is replaced with "-1", the fuel flow rate $G_{ft}$ is replaced with the air flow rate $G_{st}$, the fuel flow rate $G_{fs}$ is replaced with the air flow rate $G_{sn}$, the fuel correction coefficient calculation unit 213 is replaced with the air correction coefficient calculation unit 223, the fuel correction coefficient application unit 214 is replaced with the air correction coefficient application unit 224, the fuel flow rate calculation unit 201 is replaced with the air flow rate calculation unit 202, the fuel correction coefficient $K_f$ is replaced with the air correction coefficient $K_s$, and the correction fuel flow rate $G_{fcor}$ is replaced with the correction air flow rate $G_{scor}$.

In FIG. 3, a set of processes in Steps S4-1, S5-1, and S6-1 and a set of processes in Steps S4-2, S5-2, and S6-2 are performed in parallel. A mark "A" illustrated in FIG. 3 is a mark indicating that the process is continuously performed, and as indicated by the mark "A", the process in FIG. 4 is performed thereafter.

As illustrated in FIG. 4, the turbine inlet temperature calculation unit 206 captures the correction fuel flow rate $G_{fcor}$ output by the fuel correction coefficient application unit 214 and the correction air flow rate $G_{scor}$ output by the air correction coefficient application unit 224. The turbine inlet temperature calculation unit 206 receives and captures the combustor casing temperature $T_{CB}$ transmitted by the combustor casing temperature sensor 25j and the fuel temperatures $T_f(1)$, $T_f(2)$, and $T_f(3)$ transmitted by the fuel temperature sensors 25c-3 to 25c-3. The combustor casing temperature sensor 253 performs the measurement at each detection cycle, and transmits the data of the combustor casing temperature $T_{CS}$ which is the measurement data detected by performing the measurement to the gas turbine control device 20 through the control line. The turbine inlet temperature calculation unit 206 calculates the fuel temperature $T_f$ which is an average value of the captured fuel temperatures $T_f(1)$, $T_f(2)$, and $T_f(3)$. As described above, the turbine inlet temperature calculation unit 206 substitutes the correction fuel flow rate $G_{fcor}$, the correction air flow rate $G_{acor}$, the combustor casing temperature $T_{CS}$, and the fuel temperature $T_f$ into equation (6), and calculates the turbine inlet temperature $T_{1T}$. The turbine inlet temperature calculation unit 206 outputs the calculated turbine inlet temperature $T_{1T}$ to the fuel distribution ratio calculation unit 207 (S20).

The fuel distribution ratio calculation unit 207 captures the turbine inlet temperature $T_{1T}$ output by the turbine inlet temperature calculation unit 206. Based on the captured turbine inlet temperature $T_{1T}$, the fuel distribution ratio calculation unit 207 calculates the fuel distribution ratios $D_1$, $D_2$, and $D_3$ for each of the fuel supply systems 40-1, 40-2, and 40-3 by using a relational equation of the turbine inlet temperature $T_{1T}$ and the fuel distribution ratio. The fuel distribution ratio calculation unit 207 outputs the calculated fuel distribution ratios $D_1$, $D_2$, and $D_3$ to the valve opening degree calculation unit 208 (S21).

The valve opening degree calculation unit 208 captures the fuel distribution ratios $D_1$, $D_2$, and $D_3$ output by the fuel distribution ratio calculation unit 207, and the fuel control signal command value (CSO) provided from the outside. Based on the captured fuel distribution ratios $D_1$, $D_2$, and $D_3$ and the fuel control signal command value (CSO), the valve opening degree calculation unit 209 calculates the valve opening degrees $O_1$, $O_2$, and $O_3$ for each of the flow control valves 41-1, 41-2, and 41-3 by using the valve opening degree calculation equation. The valve opening degree calculation unit 208 outputs each of the calculated valve opening degrees $O_1$, $O_2$, and $O_3$ to the respectively corresponding flow control valves 41-1, 41-2, and 41-3. The valve opening degree calculation unit 208 outputs the calculated valve opening degrees $O_1$, $O_2$, and $O_3$ to the fuel flow rate calculation unit 201 (S22), and completes the process.

A series of the above-described processes illustrated in FIGS. 3 and 4 are performed as a process in one detection cycle, and the series of processes illustrated in FIGS. 3 and 4 are performed for each cycle.

(Operational Effect in Configuration of First Embodiment)

As described above, the gas turbine control device 20 of the first embodiment calculates the fuel flow rates $G_{ft}$ and $G_{fs}$ in two ways. One fuel flow rate $G_{ft}$ is calculated by the fuel flow rate calculation unit 201 using parameters such as the valve opening degrees $O_1$, $O_2$, and $O_3$, the flow control valve pre-pressures $P_{1PV}$ (1), $P_{1FV}$ (2), and $P_{1FV}$ (3), the flow control valve post-pressures $P_{2PV}$(1), $P_{2PV}$(2), and $P_{2PV}$(3), and the fuel temperatures $T_f$(1), $T_f$(2), and $T_f$(3). Since the parameter used by the fuel flow rate calculation unit 201 has a quick response, even when the state of the gas turbine power generation plant 100 is the transient state, the fuel flow rate $G_{ft}$ can be calculated with constant accuracy, following drastic changes in the transient state. However, in the fuel flow rate calculation function $f_1$ (•) used to calculate the fuel flow rate $G_{ft}$ by the fuel flow rate calculation unit 201, there is a possibility that a Cv characteristic of the flow control valve 41 which is predetermined when constructing the function includes an absolute error such as an error caused by a deviation in specifications like a difference from the actual Cv characteristic of the flow control valve 41 and an error when modeling is performed to calculate the fuel flow rate. The Cv characteristic is a characteristic indicating how much the fuel can flow in the flow control valve 41. Since there is a possibility of including this absolute error, even when the accuracy of the parameter substituted into the fuel flow rate calculation function $f_1$ (•) is improved, there is a possibility that the fuel flow rate $G_{ft}$ obtained by using the function has low absolute accuracy.

In contrast, the other fuel flow rate $G_{fs}$ is calculated by the heat balance computation unit 203 using the parameters such as the gas turbine output $G_{out}$, the exhaust gas pressure $P_{2T}$, the exhaust gas temperature $T_{2T}$, the compressor inlet pressure $P_{1C}$, the compressor inlet temperature $T_{1C}$, the compressor exit pressure $P_{2C}$, and the compressor exit temperature $T_{2C}$. The gas turbine heat balance computation equation used to calculate the fuel flow rate $G_{fs}$ by the heat balance computation unit 203 is a computation equation indicating that the overall energy balance of the gas turbines 10 matches. Therefore, compared to the fuel flow rate calculation function $f_1$ (•) used by the fuel flow rate calculation unit 201, it is possible to calculate the fuel flow rate $G_{fs}$ having high absolute accuracy. However, in some cases of the parameters used by the heat balance computation unit 203, the measurement data of the temperature obtained from the gas turbine 10 such as the exhaust gas temperature $T_{2T}$ has a considerable response delay. In addition, in some cases, the gas turbine output $G_{out}$ indicating the power generated by the generator 50 may be affected by a disturbance such as an imbalance between supply and demand in a power system connected to the generator 50. Therefore, whereas the fuel flow rate $G_{fs}$ calculated by the heat balance computation unit 203 has higher accuracy than the fuel flow rate $G_{ft}$ when the state of the gas turbine power generation plant 100 is the static state, there is a possibility that the fuel flow rate $G_{fs}$ has lower accuracy than the fuel flow rate $G_{ft}$ when the state of the gas turbine power generation plant 100 is the transient state.

The fuel flow rate correction unit 210 of the correction process unit 204 uses the above-described two fuel flow rates $G_{ft}$ and $G_{fs}$ to perform the following process so that the accuracy of the fuel flow rate provided for the turbine inlet temperature calculation unit 206 is not lowered in both the static state and the transient state, due to the process described with reference to FIGS. 3 to 5. For example, at time t1, it is assumed that the heat balance computation unit 203 calculates the fuel flow rate $G_{fs}$, and the fuel flow rate calculation unit 201 calculates the fuel flow rate $G_{ft}$. Furthermore, when the fuel side management unit 211 captures the fuel flow rate $G_{fs}$ at time t1 output by the heat balance computation unit 203, it is assumed that the state of the gas turbine power generation plant 100 detected by the state detection unit 205 is the static state. In this case, the fuel side management unit 211 records the combination of the fuel flow rates $G_{fe}$ and $G_{ft}$ at time t1 in the fuel side storage unit 212, and outputs the combination of the fuel flow rates $G_{ft}$ and $G_{fs}$ at time t1 to the fuel correction coefficient calculation unit 213. Here, the fuel correction coefficient Kr calculated by the fuel correction coefficient calculation unit 213 is $K_f = G_{fs}/G_{ft}$. Therefore, the fuel correction coefficient application unit 214 performs the computation of $G_{ft} \times K_f = G_{fs}$, and the correction fuel flow rate $G_{fcor}$ calculated by the fuel correction coefficient application unit 214 becomes equal to the fuel flow rate $G_{fs}$ at time t1. Since the fuel flow rate $G_{fs}$ in this case is in the static state, the correction fuel flow rate $G_{fcor}$ has higher accuracy than the fuel flow rate $G_{ft}$.

On the other hand, when the fuel side management unit 211 captures the fuel flow rate $G_{fs}$ at time t1 output by the heat balance computation unit 203, in a case where the state of the gas turbine power generation plant 100 detected by the state detection unit 205 is not the static state, that is, in a case of the transient state, the combination of the fuel flow rates $G_{fs}$ and $G_{ft}$ at time t1 is not recorded in the fuel side storage unit 212. Instead of the combination of the fuel flow rates $G_{ft}$ and $G_{fs}$ at time t1, the fuel side management unit 211 outputs the latest combination of the fuel flow rates $G_{ft}$ and $G_{fs}$ written in the fuel side storage unit 212 to the fuel correction coefficient calculation unit 213. A time at which the latest combination of the fuel flow rates $G_{ft}$ and $G_{fs}$ is obtained is a time before time t1, and is a time of the recent static state at time t1. This time is defined as time t2. In this case, the fuel correction coefficient $K_f$ calculated by the fuel correction coefficient calculation unit 213 is $K_f = (G_{fs}$ at time t2$)/(G_{ft}$ at time t2$)$. Therefore, the fuel correction coefficient application unit 214 performs the computation of $(G_{ft}$ at time t1$) \times K_f = (G_{ft}$ at time t1$) \times (G_{fs}$ at time t2$)/(G_{ft}$ at time t2$)$. Here, the computation of $(G_{fs}$ at time t2$)/(G_{ft}$ at time t2$)$ for calculating the fuel correction coefficient $K_f$ is the computation using the combination of the fuel flow rates $G_{ft}$ and $G_{fs}$ at time t2 which is a time in the recently static state at time t1. Since the accuracy of the fuel flow rate $G_{ft}$ in the static state is high, the accuracy of the fuel correction coefficient $K_f$ is also high. Therefore, the fuel flow rate $G_{ft}$ at time t1 is multiplied by the highly accurate fuel correction coefficient $K_f$. In this manner, the correction fuel flow rate $G_{fcor}$ having the higher accuracy than the fuel flow rate $G_{ft}$ at time t1 can be obtained.

As described above, only in a case of the static state, the fuel side management unit 211 writes the fuel flow rates $G_{ft}$ and $G_{fs}$ in the fuel side storage unit 212 in association with each other. In this manner, even when shifted to the transient state, the fuel correction coefficient calculation unit 213 can calculate the highly accurate fuel correction coefficient $K_f$ by using the fuel flow rate $G_{ft}$ when the highly accurate fuel flow rate $G_{fs}$ obtained in the recent static state is obtained. In addition, as described above, the fuel correction coefficient calculation unit 213 can calculate the highly accurate fuel correction coefficient $K_f$ even in the static state. Therefore, the accuracy of the correction fuel flow rate $G_{fcor}$ calculated by the fuel correction coefficient application unit 214 is higher than the fuel flow rate $G_{ft}$ calculated by the fuel flow rate calculation unit 201 in both the static state and the transient state.

In the gas turbine control device 20, two types of air flow rates $G_{st}$ and $G_{ss}$ are calculated for the air flow rate. Since a relationship between the air flow rates $G_{st}$ and $G_{ss}$ can be the same as a relationship between the fuel flow rates $G_{ft}$ and $G_{fs}$, the accuracy of the correction air flow rate $G_{acor}$ calculated by the air correction coefficient application unit 224 is higher than the air flow rate $G_{st}$ calculated by the air flow rate calculation unit 202 in both the static state and the transient state. Therefore, in both the static state and the transient state, the turbine inlet temperature calculation unit 206 can calculate the highly accurate turbine inlet temperature $T_{1T}$ without using the turbine efficiency which is less likely to be uniquely determined.

Since the heat balance computation unit 203 uses the gas turbine heat balance computation equation, the heat balance computation unit 203 calculates the fuel flow rate $G_{fs}$ and the air flow rate $G_{as}$ which reflect the recent performance of the gas turbine 10. The fuel flow rate correction unit 210 corrects the fuel flow rate $G_{ft}$ calculated by the fuel flow rate calculation unit 201 by using the fuel flow rate $G_{fs}$ which reflects the recent performance of the gas turbine 10. Similarly, the air flow rate correction unit 220 corrects the air flow rate $G_{st}$ calculated by the air flow rate calculation unit 202 by using the air flow rate $G_{as}$ which reflects the recent performance of the gas turbine 10. Therefore, the turbine inlet temperature calculation unit 206 can calculate the turbine inlet temperature $T_{1T}$ which reflects the recent performance of the gas turbine 10. In this case, even when the performance of the gas turbine 10 is changed due to aged deterioration, the correction process unit 204 can perform the correction following the change in the performance on the fuel flow rate $G_{ft}$ and the air flow rate $G_{st}$. That is, through the correction performed by the correction process unit 204, it is possible to estimate the turbine inlet temperature $T_{1T}$ with high accuracy over a long period of time and with high robustness against aged deterioration.

(Method for Calculating Each Correction Coefficient from Each Average Value of Fuel Flow Rate and Air Flow Rate)

In the gas turbine control device 20 of the first embodiment described above, in the fuel flow rate correction unit 210, in the process in Step S104-1 in FIG. 5, the fuel side management unit 211 outputs a set of the fuel flow rate $G_{ft}$ and the fuel flow rate $G_{fs}$ captured in the preceding process in Step S100 to the fuel correction coefficient calculation unit 213, and in the process in Step S105-1, the fuel side management unit 211 outputs the latest set of fuel flow rate $G_{ft}$ and the fuel flow rate $G_{fs}$ stored in the fuel side storage unit 212 to the fuel correction coefficient calculation unit 213. Similarly, in the process in Steps S104-2 and S105-2, the air flow rate correction unit 220 outputs a set of the air flow rate $G_{at}$ and the air flow rate $G_{ss}$ to the air correction coefficient calculation unit 223. In contrast, for example, the following processes as illustrated in FIGS. 6 and 7 may be performed.

FIG. 6 is a flowchart of a subroutine of a storage unit management process performed instead of the subroutine of the storage unit management process illustrated in FIG. 5. FIG. 7 is a flowchart illustrating a process subsequent to Step S3 of the flowchart illustrated in FIG. 3, and illustrates a process performed instead of Steps S4-1 to S6-1 and Steps S4-2 to S6-2. In FIG. 3, after the processes up to Steps S2-1, S2-2, and S2-3 are performed, the subroutine of the storage unit management process illustrated in FIG. 6 is started as the process in Step S3, and the same process as that in FIG. 5 is performed up to the process in Step S102 in FIG. 6.

When the fuel side management unit 211 determines in the process in Step S102 that the acquired data indicating the state indicates the static state (S102, Yes), the fuel side management unit 211 performs the same process as that in Step S103-1 in FIG. 5, that is, a process of associating the fuel flow rate $G_{ft}$ and the fuel flow rate $G_{fs}$ which are captured in the process in Step S100 with each other and writing and storing the associated result in the fuel side storage unit 212 (S103-1). The fuel side management unit 211 determines whether or not the number of combinations of the fuel flow rate $G_{ft}$ and the fuel flow rate $G_{fs}$ stored in the fuel side storage unit 212 is equal to or larger than a predetermined number set in advance (S105-1). When the fuel side management unit 211 determines that the number of combinations of the fuel flow rate $G_{ft}$ and the fuel flow rate $G_{fs}$ stored in the fuel side storage unit 212 is equal to or larger than the predetermined number set in advance (S105-1, Yes), the fuel side management unit 211 reads all combinations of the fuel flow rate $G_{ft}$ and the fuel flow rate $G_{fs}$ stored in the fuel side storage unit 212, and outputs an update instruction signal including the read combinations of the fuel flow rate $G_{ft}$ and the fuel flow rate $G_{fs}$ to the fuel correction coefficient calculation unit 213 (S106-1). On the other hand, when the fuel side management unit 211 determines that the number of combinations of the fuel flow rate $G_{ft}$ and the fuel flow rate $G_{fs}$ stored in the fuel side storage unit 212 is not equal to or larger than the predetermined number set in advance (S105-1, No), the process proceeds to Step S107.

The air flow rate correction unit 220 performs the processes in Steps S103-2, S105-2, and S106-2 in FIG. 6. Here, each of the processes in Steps S103-2, S105-2, and S106-2 is the following process. In the processes in S103-1, S105-1, and S106-1 in which the branch number of each step number is replaced with "-1", the fuel flow rate $G_{ft}$ is replaced with the air flow rate $G_{at}$, the fuel flow rate $G_{fs}$ is replaced with the air flow rate $G_{ss}$, the fuel side management unit 211 is replaced with the air side management unit 221, the fuel side storage unit 212 is replaced with the air side storage unit 222, and the fuel correction coefficient calculation unit 213 is replaced with the air correction coefficient calculation unit 223.

When each of the fuel side management unit 211 and the air side management unit 221 determines in the process in Step S102 that the acquired data indicating the state does not indicate the static state (S102, No), each of the fuel side management unit 211 and the air side management unit 221 performs a process in Step S107. Here, when performed by the fuel side management unit 211, the process in Step S107 is a process in which the fuel side management unit 211 outputs a non-update instruction signal to the fuel correction coefficient calculation unit 213. When performed by the air side management unit 221, the process in Step S107 is a process in which the air side management unit 221 outputs the non-update instruction signal to the air correction coefficient calculation unit 223 (S107).

When the processes in Steps S106-1, S106-2, and S107 are completed, the subroutine of the storage unit management process is completed, and a process subsequent to Steps S10-1 and S10-2 illustrated in FIG. 7 is started. In FIG. 6, the process performed by the fuel side management unit 211 and the process performed by the air side management unit 221 are performed in parallel.

The fuel correction coefficient calculation unit 213 determines a type of the instruction signal output by the fuel side management unit 211 (S10-1). When the fuel correction coefficient calculation unit 213 determines that the instruction signal output by the fuel side management unit 211 is the update instruction signal (S10-1, update instruction signal), the fuel correction coefficient calculation unit 213 reads and captures a combination of a plurality of the fuel flow rates $G_{ft}$ and the fuel flow rates $G_{fs}$ included in the update instruction signal (S11-1). The fuel correction coefficient calculation unit 213 calculates an average value of the plurality of fuel flow rates $G_{ft}$ and an average value of the plurality of fuel flow rates $G_{ft}$ (S12-1). The fuel correction coefficient calculation unit 213 calculates the fuel correction coefficient $K_f$ by dividing the calculated average value of the fuel flow rates $G_{fs}$ by the calculated average value of the fuel flow rates $G_{ft}$. The fuel correction coefficient calculation unit 213 writes and stores the calculated fuel correction coefficient $K_f$ in an internal storage area, and outputs the calculated fuel correction coefficient $K_f$ to the fuel correction coefficient application unit 214 (S13-1). Thereafter, as the process in Step S17-1, the same process as the process in Step S6-1 in FIG. 3 is performed (S17-1).

On the other hand, when the fuel correction coefficient calculation unit 213 determines in the process in Step S10-1 that the instruction signal output by the fuel side management unit 211 is the non-update instruction signal (S10-1, non-update instruction signal), the fuel correction coefficient calculation unit 213 determines whether or not the previous fuel correction coefficient $K_f$ is stored in the internal storage area (S14-1). When the fuel correction coefficient calculation unit 213 determines that the previous fuel correction coefficient $K_f$ is stored in the internal storage area (S14-1, Yes), the fuel correction coefficient calculation unit 213 reads the previous fuel correction coefficient $K_f$ from the internal storage area, and outputs the read fuel correction coefficient $K_f$ to the fuel correction coefficient application unit 214 (S15-1). Thereafter, the process proceeds to Step S17-1. When the fuel correction coefficient calculation unit 213 determines that the previous fuel correction coefficient $K_f$ is not stored in the internal storage area (S14-1, No), the fuel correction coefficient calculation unit 213 outputs the fuel correction coefficient $K_f$ which is $K_f=1$ to the fuel correction coefficient application unit 214 (S16-1). Thereafter, the process proceeds to Step S17-1. In addition, when a value of the fuel correction coefficient $K_f$ is "1", in the process in Step S17-1, since the fuel correction coefficient application unit 214 multiplies the fuel flow rate $G_{ft}$ by "1", the correction is not substantially performed. The fuel correction coefficient application unit 214 outputs the fuel flow rate $G_{ft}$ output by the fuel flow rate calculation unit 201 to the turbine inlet temperature calculation unit 206 as the correction fuel flow rate $G_{fcor}$.

Processes in Steps S10-2 to S17-2 in FIG. 7 are performed by the air flow rate correction unit 220. Here, each of the processes of Steps S10-2 to 311-2 is the following process. In the processes in S10-1 to S17-1 in which the branch number of each step number is replaced with "-1", the fuel flow rate $G_{ft}$ is replaced with the air flow rate $G_{st}$, the fuel flow rate $G_{fs}$ is replaced with the air flow rate $G_{as}$, the fuel side management unit 211 is replaced with the air side management unit 221, the fuel correction coefficient calculation unit 213 is replaced with the air correction coefficient calculation unit 223, the fuel correction coefficient application unit 214 is replaced with the air correction coefficient application unit 224, the fuel flow rate calculation unit 201 is replaced with the air flow rate calculation unit 202, the fuel correction coefficient $K_f$ is replaced with the air correction coefficient $K_s$, and the correction fuel flow rate $G_{fcor}$ is replaced with the correction air flow rate $G_{acor}$.

In FIG. 7, a set of processes in Steps S10-1 to S17-1 and a set of processes in Steps S10-2 to S17-2 are performed in parallel. The mark "A" illustrated in FIG. 7 is a mark indicating that the process is continuously performed, and as indicated by the mark "A", the process in FIG. 4 is performed thereafter.

The fuel correction coefficient $K_f$ obtained by performing the above-described process in FIG. 7 is a value calculated by an average value of the plurality of fuel flow rates $G_{ft}$ and an average value of the plurality of fuel flow rates $G_{fs}$. Therefore, the fuel correction coefficient $K_f$ is a value reflecting a relationship between the fuel flow rates $G_{ft}$ and $G_{fs}$ in the past static state. The air correction coefficient $K_a$ is also a value reflecting a relationship between the air flow rates $G_{at}$ and $G_{as}$ in the past static state. Therefore, compared to a case of using one set of the fuel flow rates $G_{ft}$ and $G_{fs}$ and one set of the air flow rates $G_{st}$ and $G_{as}$ as in the gas turbine control device 20 of the first embodiment described above, it is possible to obtain the fuel correction coefficient $K_f$ and the air correction coefficient $K_a$ which are highly accurate in terms of reliability. Since the correction is performed by using the highly accurate fuel correction coefficient $K_f$ and the highly accurate air correction coefficient $K_a$, it is possible to improve the accuracy of the correction fuel flow rate $G_{fcor}$ and the correction air flow rate $G_{acor}$ which are obtained by the correction. Therefore, based on the highly accurate correction fuel flow rate $G_{fcor}$ and the highly accurate correction air flow rate $G_{acor}$, the accuracy of the turbine inlet temperature $T_{1T}$ calculated by the turbine inlet temperature calculation unit 206 is improved.

As a predetermined number used in the processes in Steps S105-3 and S105-2 in FIG. 6, a value indicating the number of combinations adopted to such an extent that the reliability is improved is set in advance. The processes in Steps S16-1 and S16-2 in FIG. 7, that is, an outputting process as the fuel correction coefficient $K_f=1$ and an outputting process as the air correction coefficient $K_s=1$, are processes performed while the number of combinations stored in the fuel side storage unit 212 and the air side storage unit 222 is smaller than a predetermined value. The processes are not intended to correct each of the fuel flow rate $G_{ft}$ and the air flow rate $G_{st}$ while each average value of the fuel flow rates $G_{ft}$ and $G_{fe}$ and the air flow rates $G_{st}$ and $G_{es}$ cannot be calculated. The processes in Steps S15-1 and S15-2 in FIG. 7, that is, a process of using the previous fuel correction coefficient $K_f$ for the correction and a process of using the previous air correction coefficient $K_a$ for the correction, are processes performed when the state detected by the state detection unit 205 is not the static state, that is, when the state is the transient state. The processes are not intended to update the fuel correction coefficient $K_f$ and the air correction coefficient $K_a$ when the state is the transient state.

As the processes in Steps S106-1 and S106-2 in FIG. 6, the following processes may be performed. In the process in Step S106-1 in FIG. 6, instead of reading all combinations of the fuel flow rates $G_{ft}$ and $G_{fs}$ stored in the fuel side storage unit 212 as described above, the fuel side management unit 211 may read a predetermined number of combinations so that a new combination is sequentially included in a time-series order in which the latest combination is set as the beginning. Similarly, in the process in Step S106-2 in FIG. 6, instead of reading all combinations of the air flow rates $G_{at}$ and $G_{ae}$ stored in the air side storage unit 222, the air side management unit 221 may read a predetermined number of combinations so that a new combination is sequentially included in a time-series order in which the latest combination is set as the beginning. In this way, the fuel correction coefficient $K_f$ and the air correction coefficient $K_a$ based on a movement average value can be obtained. Therefore, a computation amount can be reduced, compared to a case of using all combinations stored in the fuel side storage unit 212 and the air side storage unit 222. In addition, it is possible to obtain the highly accurate turbine inlet temperature $T_{1T}$ reflecting the most recent performance of the gas turbine 10.

In addition, at a stage where a predetermined number or more of combinations are stored in the fuel side storage unit 212 and the air side storage unit 222, it is assumed that a change in values included in individual combinations stored in a time-series order is reduced. On a premise of this assumption, in the process in Step S106-1 in FIG. 6, the fuel side management unit 211 may read the latest combination of one set of the fuel flow rates $G_{ft}$ and $G_{fs}$, and may skip the process in Step S12-1 in FIG. 7, and in the process in Step S13-1, the fuel correction coefficient calculation unit 213 may calculate the fuel correction coefficient $K_f (=G_{fs}/G_{ft})$ by dividing the latest fuel flow rate $G_{fs}$ by the latest fuel flow rate $G_{ft}$. Similarly, in the process in Step S106-2 in FIG. 6, the air side management unit 221 may read the latest combination of one set of the air flow rates $G_{at}$ and $G_{as}$, and may skip the process in Step S12-2 in FIG. 7. In the process in Step S13-2, the air correction coefficient calculation unit 223 may calculate the air correction coefficient $K_s (=G_{as}/G_{at})$ by dividing the latest air flow rate $G_{as}$ by the latest air flow rate $G_{at}$.

(Other Configuration Example in First Embodiment)

In the first embodiment described above, the correction process unit 204 includes the fuel flow rate correction unit 210 and the air flow rate correction unit 220. In contrast, the correction process unit 204 may include only the fuel flow rate correction unit 210. In this case, the heat balance computation unit 203 calculates only the fuel flow rate $G_{fs}$, and outputs the fuel flow rate $G_{fs}$ to the fuel side management unit 211. The air flow rate $G_{at}$ calculated by the air flow rate calculation unit 202 is directly provided for the turbine inlet temperature calculation unit 206. In addition, the correction process unit 204 may include only the air flow rate correction unit 220. In this case, the heat balance computation unit 203 calculates only the air flow rate $G_{as}$, and outputs the air flow rate $G_{ss}$ to the air side management unit 221. The fuel flow rate $G_{ft}$ calculated by the fuel flow rate calculation unit 201 is directly provided for the turbine inlet temperature calculation unit 206.

Second Embodiment

In the first embodiment, the fuel flow rate $G_{ft}$ calculated by the fuel flow rate calculation unit 201 and the air flow rate $G_{at}$ calculated by the air flow rate calculation unit 202 are corrected by using the fuel flow rate $G_{fs}$ and the air flow rate $G_{st}$ which are calculated by the heat balance computation unit 203. It is conceivable that the fuel correction coefficient $K_f$ and the air correction coefficient $K_s$ do not depend only on the measurement data referred to in the heat balance computation unit 203, and that both of these vary depending on various state amounts in the gas turbine power generation plant 100. As described below, a second embodiment includes a configuration in which the fuel correction coefficient $K_f$ and the air correction coefficient $K_s$ are variable in accordance with a change in this state amount.

(Configuration Example of Gas Turbine Power Generation Plant of Second Embodiment)

FIG. 8 is an overall configuration diagram of a gas turbine power generation plant 100a of the second embodiment. A difference between the gas turbine power generation plant 100 according to the first embodiment and the gas turbine power generation plant 100a according to the second embodiment is as follows. The gas turbine power generation plant 100a according to the second embodiment includes a gas turbine control device 20a instead of the gas turbine control device 20. Furthermore, a combustor casing pressure sensor 25m is provided. The combustor casing pressure sensor 25m is connected to the gas turbine control device 20a by a control line such as a communication line as indicated by a dotted line arrow, detects a combustor casing pressure $P_{out}$ which is a pressure inside the combustor casing 16 by performing measurement in each detection cycle, and transmits the detected combustor casing pressure $P_{out}$ to the gas turbine control device 20a through the control line.

(Configuration Example of Gas Turbine Control Device of Second Embodiment)

As illustrated in FIG. 9, the gas turbine control device 20a includes the fuel flow rate calculation unit 201, the air flow rate calculation unit 202, the heat balance computation unit 203, a correction process unit 204a, the state detection unit 205, the turbine inlet temperature calculation unit 206, the fuel distribution ratio calculation unit 207, and the valve opening degree calculation unit 208. The correction process unit 204a includes a fuel flow rate correction unit 210a and an air flow rate correction unit 220a. The fuel flow rate correction unit 210a includes a fuel side management unit 211a, a fuel side storage unit 212a, a fuel correction coefficient calculation unit 213a, a fuel correction coefficient application unit 214, and a fuel side regression analysis unit 215.

In the fuel flow rate correction unit 210a, in accordance with a state detected by the state detection unit 205, the fuel side management unit 211a associates the fuel flow rate $G_{ft}$ calculated by the fuel flow rate calculation unit 201, the fuel flow rate $G_{fs}$ calculated by the heat balance computation unit 203, the combustor casing temperature $T_{CS}$ detected by the combustor casing temperature sensor 25j, and the combustor casing pressure $P_{out}$ detected by the combustor casing pressure sensor 25m with each other, and writes and stores the associated result in the fuel side storage unit 212a. The fuel side management unit 211a outputs a predetermined number of combinations of the fuel flow rate $G_{ft}$, the fuel flow rate $G_{fs}$, the combustor casing temperature $T_{CS}$, and the combustor casing pressure $P_{out}$ which are set in advance to the fuel side regression analysis unit 215.

The fuel side storage unit 212a stores the combination of the fuel flow rate $G_{ft}$, the fuel flow rate $G_{fs}$, the combustor casing temperature $T_{CS}$, and the combustor casing pressure $P_{out}$ in a time-series order. Based on the predetermined number of combinations of the fuel flow rate $G_{ft}$, the fuel flow rate $G_{fs}$, the combustor casing temperature $T_{CS}$, and the combustor casing pressure $P_{out}$, the fuel side regression analysis unit 215 performs a predetermined regression analysis in which an explanatory variable is set to the combustor casing temperature $T_{CS}$ and the combustor casing pressure $P_{out}$ and an objective variable is set to the fuel correction coefficient $K_f (=$fuel flow rate $G_{fs}/$fuel flow rate $G_{ft})$, and calculates a coefficient of a regression equation corresponding to the predetermined regression analysis. The fuel correction coefficient calculation unit 213a calculates the fuel correction coefficient $K_f$ by substituting the combustor casing temperature $T_{CS}$ and the combustor casing pressure $P_{out}$ into the regression equation to which the coefficient of the regression equation calculated by the fuel side regression analysis unit 215 is applied.

The air flow rate correction unit 220a includes an air side management unit 221a, an air side storage unit 222a, an air correction coefficient calculation unit 223a, the air correction coefficient application unit 224, and an air side regression analysis unit 225. In accordance with a state detected by the state detection unit 205, the air side management unit 221a associates the air flow rate $G_{at}$ calculated by the air flow rate calculation unit 202, the air flow rate $G_{as}$ calculated by the heat balance computation unit 203, the compressor inlet temperature $T_{1C}$ detected by the compressor inlet temperature sensor 25g, and the combustor casing pressure $P_{out}$ detected by the combustor casing pressure sensor 25m with each other, and writes and stores the associated result in the air side storage unit 222a. The air side management unit 221a outputs a predetermined number of combinations of the air flow rate $G_{at}$, the air flow rate $G_{ss}$, the compressor inlet temperature $T_{1C}$, and the combustor casing pressure $P_{out}$ which are set in advance to the air side regression analysis unit 225.

The air side storage unit 222a stores the combination of the air flow rate $G_{at}$, the air flow rate $G_{ss}$, the compressor inlet temperature $T_{1C}$, and the combustor casing pressure $P_{out}$ in a time-series order. Based on the predetermined number of combinations of the air flow rate $G_{at}$, the air flow rate $G_{ss}$, the compressor inlet temperature $T_{1C}$, and the combustor casing pressure $P_{out}$, the air side regression analysis unit 225 performs a predetermined regression analysis in which the explanatory variable is set to the compressor inlet temperature $T_{1C}$ and the combustor casing pressure $P_{out}$, and the objective variable is set to the air correction coefficient $K_a$ (=air flow rate $G_{as}$/air flow rate $G_{at}$), and calculates a coefficient of a regression equation corresponding to the predetermined regression analysis. The air correction coefficient calculation unit 223a calculates the air correction coefficient $K_s$ by substituting the compressor inlet temperature $T_{1C}$ and the combustor casing pressure $P_{out}$ into the regression equation to which the coefficient of the regression equation calculated by the air side regression analysis unit 225 is applied.

Here, for example, the predetermined regression analysis performed by the fuel side regression analysis unit 215 and the air side regression analysis unit 225 is a linear multiple regression analysis. In addition, as the predetermined number, for example, a value indicating the number of combinations required for calculating an accurate coefficient in the predetermined regression analysis is set in advance.

(Operation Example of Gas Turbine Control Device of Second Embodiment)

A process performed by the gas turbine control device 20a will be described with reference to FIGS. 10 to 12. A process illustrated in FIG. 10 and a process illustrated in FIG. 11 and performed as the subroutine of the storage unit management process in the process illustrated in FIG. 10 are processes performed by the fuel side management unit 211a, the fuel side regression analysis unit 215, the air side management unit 221a, and the air side regression analysis unit 225, and will be referred to as a "regression analysis process" hereinafter. A process illustrated in FIG. 12 is a process performed by the fuel correction coefficient calculation unit 213a, the fuel correction coefficient application unit 214, the air correction coefficient calculation unit 223a, and the air correction coefficient application unit 224, and will be referred to as a "correction process" hereinafter.

(Regarding Regression Analysis Process)

In FIG. 10, in Steps Sa1-1 and Sa2-1, the same processes as those in Steps S1-1 and S2-1 in FIG. 3 are performed. In Steps Sa1-2 and Sa2-2, the same processes as those in Steps S1-2 and S2-2 in FIG. 3 are performed. In Steps Sa1-3 and Sa2-3, the same processes as those in Steps S1-3 and S2-3 in FIG. 3 are performed. A set of processes in Steps Sa1-1 and Sa2-1, a set of processes in Steps Sa1-2 and Sa2-2, and a set of processes in Steps Sa1-3 and Sa2-3 are performed in parallel. After the processes in Steps Sa2-1, Sa2-2, and Sa2-3, the subroutine of the storage unit management process illustrated in FIG. 11 is performed as the process in Step Sa3.

The fuel side management unit 211a receives and captures the combustor casing temperature $T_{CS}$ transmitted by the combustor casing temperature sensor 25j and the combustor casing pressure $P_{out}$ transmitted by the combustor casing pressure sensor 25m. The fuel side management unit 211a captures the fuel flow rate $G_{ft}$ output by the fuel flow rate calculation unit 201 and the fuel flow rate $G_{fs}$ output by the heat balance computation unit 203. The air side management unit 221a receives and captures the compressor inlet temperature $T_{1C}$ transmitted by the compressor inlet temperature sensor 25g and the combustor casing pressure $P_{out}$ transmitted by the combustor casing pressure sensor 25m. The air flow rate $G_{st}$ output by the air flow rate calculation unit 202 and the air flow rate $G_{as}$ output by the heat balance computation unit 203 are captured (Sa100).

Each of the fuel side management unit 211a and the air side management unit 221a acquires data indicating the state of the gas turbine power generation plant 100a detected by the state detection unit 205 at a time at which the process in Step Sa100 performed by each of the fuel side management unit 211a and the air side management unit 221a is completed, from the state detection unit 205 (Sa101). The fuel side management unit 211a and the air side management unit 221a determine whether or not the acquired data indicating the state indicates the static state (Sa102).

When the fuel side management unit 211a determines that the acquired data indicating the state indicates the static state (Sa102, Yes), the fuel side management unit 211a associates the fuel flow rate $G_{ft}$, the fuel flow rate $G_{fs}$, the combustor casing temperature $T_{C3}$, and the combustor casing pressure $P_{out}$ which are captured in the process in Step Sa100 with each other, and writes and stores the associated result in the fuel side storage unit 212a. The fuel side management unit 211a writes a combination of the fuel flow rate $G_{ft}$, the fuel flow rate $G_{fs}$, the combustor casing temperature $T_{CS}$, and the combustor casing pressure $P_{out}$ which are sequentially written in the fuel side storage unit 212a to be stored in the fuel side storage unit 212a in a time-series order, for example, so that a newly written combination is stored in the fuel side storage unit 212a at the beginning of the time-series order (Sa103-1).

The fuel side management unit 211a determines whether or not the number of combinations stored in the fuel side storage unit 212a is equal to or larger than a predetermined number (Sa104-1). It is assumed that the fuel side management unit 211a determines that the number of combinations stored in the fuel side storage unit 212a is not equal to or larger than the predetermined number (Sa104-1, No). In this case, the fuel side regression analysis unit 215 does not have sufficient data to perform the predetermined regression analysis, and cannot proceed to the process in Step Sa4-1 in FIG. 10. Therefore, the process is completed.

On the other hand, when the fuel side management unit 211a determines that the number of combinations stored in the fuel side storage unit 212a is equal to or larger than a predetermined number (Sa104-1, Yee), the fuel side management unit 211a reads a predetermined number of combinations of the fuel flow rate $G_{ft}$, the fuel flow rate $G_{fs}$, the combustor casing temperature $T_{C3}$, and the combustor casing pressure $P_{out}$ in a time-series order in which the latest combination is set as the beginning, outputs the read predetermined number of combinations to the fuel side regression analysis unit 215 (Sa105-1), and completes the process of the subroutine of the storage unit management process.

When the air side management unit 221 determines in the process in Step Sa102 that the acquired data indicating the state indicates the static state (Sa102, Yes), processes in Steps Sa103-2, Sa104-2, and Sa105-2 are performed. Here, each of the processes in Steps Sa103-2, Sa104-2, and Sa105-2 is the following process. In the process in Steps Sa103-1, Sa104-1, and Sa105-1 in which the branch number of each step number is replaced with "−1", the fuel flow rate $G_{ft}$ is replaced with the air flow rate $G_{st}$, the fuel flow rate $G_{fs}$ is replaced with the air flow rate $G_{as}$, the combustor casing temperature $T_{CS}$ is replaced with the compressor inlet temperature $T_{1C}$, the fuel side management unit 211a is replaced with the air side management unit 221a, the fuel side storage unit 212a is replaced with the air side storage unit 222a, and the fuel side regression analysis unit 215 is replaced with the air side regression analysis unit 225.

On the other hand, in the process in Step Sa102, it is assumed that the fuel side management unit 211a and the air side management unit 221a determine that the acquired data indicating the state does not indicate the static state (Sa102, No). In this case, in each of the fuel side management unit 211a and the air side management unit 221a, the data captured in the process in Step Sa100 is data obtained in the transient state. Therefore, the data does not need to be recorded in the respectively corresponding fuel side storage unit 212a and air side storage unit 222a. In addition, the data stored in the respectively corresponding fuel side storage unit 212a and air side storage unit 222a is not updated. Therefore, the coefficient of the regression equation does not need to be updated. Therefore, the process is completed.

When the processes in Steps Sa105-1 and Sa105-2 are completed, the subroutine of the storage unit management process is completed, and the process returns to the process in FIG. 10. In FIG. 11, the process performed by the fuel side management unit 211a and the process performed by the air side management unit 221a are performed in parallel.

With reference back to FIG. 10, the fuel side regression analysis unit 215 captures a predetermined number of combinations of the fuel flow rate $G_{ft}$, the fuel flow rate $G_{fs}$, the combustor casing temperature $T_{C3}$, and the combustor casing pressure $P_{out}$ which are output by the fuel side management unit 211a (Sa4-1). Based on the captured predetermined number of combinations of the fuel flow rate $G_{ft}$, the fuel flow rate $G_{fs}$, the combustor casing temperature $T_{CS}$, and the combustor casing pressure $P_{out}$, the fuel side regression analysis unit 215 performs the predetermined regression analysis, and calculates the coefficient of the regression equation corresponding to the predetermined regression analysis. The fuel side regression analysis unit 215 outputs the calculated coefficient to the fuel correction coefficient calculation unit 213a (Sa5-1), and completes the process.

Similarly, the air side regression analysis unit 225 performs the process in Steps Sa4-2 and Sa5-2. Here, each of the processes in Steps Sa4-2 and Sa5-2 is the following process. In the processes in Steps Sa4-1 and Sa5-1 in which the branch number of each step number is replaced with "−1", the fuel flow rate $G_{fs}$ is replaced with the air flow rate $G_{at}$, the fuel flow rate $G_{fs}$ is replaced with the air flow rate $G_{ss}$, the combustor casing temperature $T_{CS}$ is replaced with the compressor inlet temperature $T_{1C}$, the fuel side management unit 211a is replaced with the air side management unit 221a, the fuel side regression analysis unit 215 is replaced with the air side regression analysis unit 225, and the fuel correction coefficient calculation unit 213a is replaced with the air correction coefficient calculation unit 223a.

In FIG. 10, a set of processes in Steps Sa4-1 and Sa5-1 and a set of processes in Steps Sa4-2 and Sa5-2 are performed in parallel. The above-described process illustrated in FIG. 10 is performed as one detection cycle process, and the process illustrated in FIG. 10 is performed for each cycle.

(Regarding Correction Process)

As illustrated in FIG. 12, the fuel correction coefficient calculation unit 213a receives and captures the combustor casing temperature $T_{C3}$ a transmitted by the combustor casing temperature sensor 25j, and the combustor casing pressure $P_{out}$ transmitted by the combustor casing pressure sensor 25m (Sa10-1). The fuel correction coefficient calculation unit 213a determines whether or not the coefficient of the regression equation is received from the fuel side regression analysis unit 215 (Sa11-1). When the fuel correction coefficient calculation unit 213a determines that the coefficient of the regression equation is received (Sa11-1, Yes), the fuel correction coefficient calculation unit 213a captures the received coefficient, and writes and stores the received coefficient in an internal storage area. The fuel correction coefficient calculation unit 213a calculates the fuel correction coefficient $K_f$ by substituting the combustor casing temperature $T_{CS}$ and the combustor casing pressure $P_{out}$ into the regression equation to which the captured coefficient is applied (Sa12-1).

On the other hand, when the fuel correction coefficient calculation unit 213a determines in the process in Step Sa11-1 that the coefficient of the regression equation is not received (Sa11-1, No), the fuel correction coefficient calculation unit 213a determines whether or not the previous coefficient is stored in the internal storage area (Sa13-1). When the fuel correction coefficient calculation unit 213 determines that the previous coefficient is stored in the internal storage area (Sa13-1, Yes), the fuel correction coefficient calculation unit 213 reads the previous coefficient from the internal storage area, and calculates the fuel correction coefficient $K_f$ by substituting the combustor casing temperature $T_{CS}$ and the combustor casing pressure $P_{out}$ into the regression equation to which the read coefficient is applied (Sa14-1). When the fuel correction coefficient calculation unit 213 determines that the previous coefficient is not stored in the internal storage area (Sa13-1, No), the fuel correction coefficient calculation unit 213 outputs the fuel correction coefficient $K_f$ which is $K_f=1$ to the fuel correction coefficient application unit 214 (Sa15-1). After the processes in Steps Sa12-1, Sa14-1, and Sa15-1, the same process as the process in Step S6-1 in FIG. 3 is performed as the process in Step Sa16-1 (Sa16-1).

The air correction coefficient calculation unit 223a receives and captures the compressor inlet temperature $T_{1C}$ transmitted by the compressor inlet temperature sensor 25g, and the combustor casing pressure $P_{out}$ transmitted by the combustor casing pressure sensor 25m (Sa10-2). Thereafter, the processes in Steps Sa11-2 to Sa16-2 are performed by the air correction coefficient calculation unit 223a and the air correction coefficient application unit 224. Here, each of the processes in Steps Sa11-2 to Sa14-2 is the following process. In the processes in Steps Sa11-1 to Sa16-1 in which the branch number of each step number is replaced with "−1", the fuel flow rate $G_{ft}$ is replaced with the air flow rate $G_{st}$, the fuel flow rate $G_{fs}$ is replaced with the air flow rate $G_{as}$, the combustor casing temperature $T_{C3}$ is replaced with the compressor inlet temperature $T_{1C}$, the fuel correction coefficient calculation unit 213a is replaced with the air correction coefficient calculation unit 223a, the fuel correction coefficient application unit 214 is replaced with the air correction coefficient application unit 224, the fuel correction coefficient $K_f$ is replaced with the air correction coefficient $K_a$, the fuel flow rate calculation unit 201 is replaced with the air flow rate calculation unit 202, and the correction fuel flow rate $G_{fcor}$ is replaced with the correction air flow rate $G_{acor}$.

A set of processes in Steps Sa10-1 to Sa16-1 and a set of processes in Steps Sa10-2 to Sa16-2 are performed in parallel. The mark "A" illustrated in FIG. 12 is a mark indicating that the process is continuously performed, and as indicated by the mark "A", the same process as the process in FIG. 4 of the first embodiment is performed. A series of the above-described processes illustrated in FIGS. 12 and 4 are performed as the process of one detection cycle, and the series of processes illustrated in FIGS. 12 and 4 are performed for each cycle.

(Operational Effect in Configuration of Second Embodiment)

As described above, when the state detected by the state detection unit 205 is the static state, the fuel flow rate correction unit 210a of the second embodiment records the combination of the fuel flow rate $G_{ft}$, the fuel flow rate $G_{fs}$, the combustor casing temperature $T_{C3}$, and the combustor casing pressure $P_{out}$ in the fuel side storage unit 212a, and updates the fuel correction coefficient $K_f$ by using a predetermined number of combinations recorded in the fuel side storage unit 212a. On the other hand, when the state detected by the state detection unit 205 is not the static state, the fuel flow rate correction unit 210a does not record the combination in the fuel side storage unit 212a, and does not update the fuel correction coefficient $K_f$. Similarly, when the state detected by the state detection unit 205 is the static state, the air flow rate correction unit 220a records the combination of the air flow rate $G_{st}$ the air flow rate $G_{ss}$, the compressor inlet temperature $T_{1C}$, and the combustor casing pressure $P_{out}$ in the air side storage unit 222a, and updates the air correction coefficient $K_a$ by using a predetermined number of combinations recorded in the air side storage unit 222a. On the other hand, when the state detected by the state detection unit 205 is not the static state, the air flow rate correction unit 220a does not record the combination in the air side storage unit 222a, and does not update the air correction coefficient $K_a$. Therefore, in the configuration of the second embodiment, as in the configuration of the first embodiment, the accuracy of the fuel flow rate and the air flow rate provided for the turbine inlet temperature calculation unit 206 is not lowered in both the static state and the transient state. In this manner, the turbine inlet temperature calculation unit 206 can maintain the accuracy of the turbine inlet temperature $T_{1T}$ for a long period of time without using the turbine efficiency which is less likely to be uniquely determined.

Furthermore, in the second embodiment, in the fuel flow rate correction unit 210a, the predetermined number of combinations of the fuel flow rate $G_{ft}$, the fuel flow rate $G_{fs}$, the combustor casing temperature $T_{CS}$, and the combustor casing pressure $P_{out}$ are used to perform a predetermined regression analysis in which the explanatory variable is set to the combustor casing temperature $T_{C3}$ and the combustor casing pressure $P_{out}$ and the objective variable is set to the fuel correction coefficient $K_f$. Therefore, the fuel correction coefficient $K_f$ can be variable in accordance with the state amount indicating the state of the gas turbine power generation plant 100a, such as the combustor casing temperature $T_{C3}$ and the combustor casing pressure $P_{out}$. Similarly, in the air flow rate correction unit 220a, a predetermined number of combinations of the air flow rate $G_{at}$, the air flow rate $G_{as}$, the compressor inlet temperature $T_{1C}$, and the combustor casing pressure $P_{out}$ are used to perform a predetermined regression analysis in which the explanatory variable is set to the compressor inlet temperature $T_{1C}$ and the combustor casing pressure $P_{out}$ and the objective variable is set to the air correction coefficient $K_a$. Therefore, the air correction coefficient $K_a$ can be variable in accordance with the state amount indicating the state of the gas turbine power generation plant 100a, such as the compressor inlet temperature $T_{1C}$ and the combustor casing pressure $P_{out}$. In this manner, the fuel correction coefficient $K_f$ and the air correction coefficient $K_a$ which are highly accurate in terms of reliability in accordance with the state of the gas turbine power generation plant 100a can be obtained. Since the correction is performed by using the highly accurate fuel correction coefficient $K_f$ and the highly accurate air correction coefficient $K_a$, it is possible to improve the accuracy of the correction fuel flow rate $G_{fcor}$ and the correction air flow rate $G_{acor}$ which are obtained by the correction. Therefore, based on the highly accurate correction fuel flow rate $G_{fcor}$ and the highly accurate correction air flow rate $G_{acor}$, the accuracy of the turbine inlet temperature $T_{1T}$ calculated by the turbine inlet temperature calculation unit 206 is improved.

The processes in Steps Sa15-1 and Sa15-2 in FIG. 12, that is, the outputting process as the fuel correction coefficient $K_f=1$ and the outputting process as the air correction coefficient $K_a=1$, are processes performed while the number of combinations stored in the fuel side storage unit 212a and the air side storage unit 222a is smaller than a predetermined value. The processes are not intended to correct each of the fuel flow rate $G_{ft}$ and the air flow rate $G_{at}$ while the coefficient of the regression equation cannot be calculated. In addition, the processes in Steps Sa14-1 and Sa14-2, that is, the processes of applying the previous coefficient to the regression equation, are processes performed when the state detected by the state detection unit 205 is not the static state, that is, when the state is the transient state. When the state is the transient state, the processes are not intended to update the coefficient of the regression equation.

(Other Configuration Examples in Second Embodiment)

In the second embodiment described above, the linear multiple regression analysis is applied as the predetermined regression analysis. However, any desired regression analysis method other than the linear multiple regression analysis may be applied as the predetermined regression analysis. For example, a method for the regression analysis performed by machine learning such as Support Vector Regression (SVR) and random forest may be applied.

In the second embodiment described above, the fuel side regression analysis unit 215 performs a predetermined regression analysis by setting the explanatory variable to the combustor casing temperature $T_{C3}$ and the combustor casing pressure $P_{out}$. In addition, the air side regression analysis unit 225 performs a predetermined regression analysis by setting the explanatory variable to the compressor inlet temperature $T_{1C}$ and the combustor casing pressure $P_{out}$. However, the explanatory variables are described as examples. The fuel side regression analysis unit 215 may use any one of the combustor casing temperature $T_{CS}$ and the combustor casing pressure $P_{out}$ as the explanatory variable. The air side regression analysis unit 225 may use any one of the compressor inlet temperature $T_{1C}$ and the combustor casing pressure $P_{out}$ as the explanatory variable. Any one or a combination of a plurality of the measurement data measured by any desired sensors 25a to 25m provided in the gas turbine power generation plant 100a may be used as the explanatory variable. In addition, any desired command value output for controlling the gas turbine 10 by the gas turbine control device 20a, for example, the above-described fuel control signal command value (CSO), may be used as the explanatory variable, or a combination of the measurement data and the command value may be used as the explanatory variable.

In the second embodiment described above, in the process in Step Sa105-1 in FIG. 11, the fuel side management unit 211a reads a predetermined number of combinations of the fuel flow rate $G_{ft}$, the fuel flow rate $G_{fs}$, the combustor casing temperature $T_{C3}$, and the combustor casing pressure $P_{out}$ from the fuel side storage unit 212a, and outputs the combinations to the fuel side regression analysis unit 235. In contrast, in the process in Step Sa105-1, the fuel side management unit 211a may read all combinations stored in the fuel side storage unit 212a, and may output the combinations to the fuel side regression analysis unit 215. Similarly, in the process in Step Sa105-2 in FIG. 11, the air side management unit 221a reads a predetermined number of combinations of the air flow rates $G_{at}$, the air flow rate $G_{as}$, the compressor inlet temperature $T_{1C}$, and the combustor casing pressure $P_{out}$ from the air side storage unit 222a, and outputs the combinations to the air side regression analysis unit 225. In contrast, in the process in Step Sa105-2, the air side management unit 221a may read all combinations stored in the air side storage unit 222a, and may output the combinations to the air side regression analysis unit 225.

In the second embodiment described above, the correction process unit 204a includes the fuel flow rate correction unit 210a and the air flow rate correction unit 220a. In contrast, the correction process unit 204a may include only the fuel flow rate correction unit 210a. In this case, the heat balance computation unit 203 calculates and outputs only the fuel flow rate $G_{fs}$, and the air flow rate $G_{at}$ calculated by the air flow rate calculation unit 202 is provided for the turbine inlet temperature calculation unit 206. In addition, the correction process unit 204a may include only the air flow rate correction unit 220a. In this case, the heat balance computation unit 203 calculates and outputs only the air flow rate $G_{as}$, and the fuel flow rate $G_{ft}$ calculated by the fuel flow rate calculation unit 201 is provided for the turbine inlet temperature calculation unit 206. In addition, the correction process unit 204a may include the fuel flow rate correction unit 210a and the air flow rate correction unit 220 of the first embodiment, or may include the air flow rate correction unit 220a and the fuel flow rate correction unit 210 of the first embodiment.

Third Embodiment

In the first and second embodiments, the fuel flow rate $G_{ft}$ calculated by the fuel flow rate calculation unit 201 and the fuel flow rate $G_{fs}$ calculated by the heat balance computation unit 203 become a total value of the fuel flow rates supplied by the respective three fuel supply systems 40-1, 40-2, and 40-3. In contrast, the gas turbine power generation plants 100 and 100a of the first and second embodiments include the three fuel supply systems 40-1, 40-2, and 40-3. Therefore, it is conceivable that the more highly accurate turbine inlet temperature $T_{1T}$ can be obtained when each of the fuel flow rates $G_{ft}$ is individually corrected by calculating the fuel flow rate $G_{ft}$ and the fuel flow rate $G_{fs}$ for each of the fuel supply systems 40-1, 40-2, and 40-3. A gas turbine control device 20b of a third embodiment includes a configuration for performing this individual correction as described below. Hereinafter, for convenience of description, in the gas turbine power generation plant 100 of the first embodiment, a configuration in which the gas turbine control device 20 is replaced with the gas turbine control device 20b of the third embodiment will be referred to as a gas turbine power generation plant 100b.

(Configuration Example of Gas Turbine Control Device of Third Embodiment)

FIG. 13 is a block diagram illustrating a configuration of the gas turbine control device 20b according to the third embodiment. The gas turbine control device 20b includes a fuel flow rate calculation unit 201b, the air flow rate calculation unit 202, a heat balance computation unit 203b, a correction process unit 204b, the state detection unit 205, the turbine inlet temperature calculation unit 206, the fuel distribution ratio calculation unit 207, the valve opening degree calculation unit 208, and a fuel distribution amount calculation unit 209. The fuel flow rate calculation unit 201b has the same configuration as that of the fuel flow rate calculation unit 201 of the first embodiment except for the following point. The fuel flow rate calculation unit 201 of the first embodiment calculates the fuel flow rates $G_{ft}$ (1), $G_{ft}$ (2), and $G_{ft}$ (3), and calculates the fuel flow rate $G_{ft}$ by summing up the calculated fuel flow rates $G_{ft}$ (1), $G_{ft}$ (2), and $G_{ft}$ (3). In contrast, the fuel flow rate calculation unit 201b of the third embodiment outputs the calculated fuel flow rates $G_{ft}$ (1), $G_{ft}$ (2), and $G_{ft}$ (3) without summing up the fuel flow rates. The heat balance computation unit 203b has the same configuration as that of the heat balance computation unit 203 of the first embodiment except for the following point. The heat balance computation unit 203 of the first embodiment calculates and outputs the fuel flow rate $G_{fs}$ and the air flow rate $G_{ss}$. In contrast, the heat balance computation unit 203b of the third embodiment calculates and outputs only the fuel flow rate $G_{fs}$.

The fuel distribution amount calculation unit 209 calculates three fuel flow rates $G_{fs}$ (1), $G_{fs}$ (2), and $G_{fs}$ (3) so that the fuel flow rate $G_{fs}$ calculated by the heat balance computation unit 203b becomes each ratio of the fuel distribution ratios $D_1$, $D_2$, and $D_3$ calculated by the fuel distribution ratio calculation unit 207. The fuel distribution ratio $D_1$ corresponds to the fuel supply system 40-1. Therefore, the fuel flow rate $G_{fs}$ (1) calculated corresponding to the fuel distribution ratio $D_1$ corresponds to the fuel supply system 40-1. Similarly, the fuel supply system 40-2, the fuel distribution ratio $D_2$, and the fuel flow rate $G_{fs}$ (2) correspond to each other, and the fuel supply system 40-3, the fuel distribution ratio $D_3$, and the fuel flow rate $G_{fs}$ (3) correspond to each other.

The correction process unit 204b includes a fuel flow rate correction unit 210b. The fuel flow rate correction unit 210b includes a fuel side management unit 211b, a fuel side storage unit 212b, fuel correction coefficient calculation units 213-1, 213-2, and 213-3, fuel correction coefficient application units 214-1, 214-2, 214-3, and an adder 216. The fuel side storage unit 212b includes fuel side storage areas 212b-1, 212b-2, and 212b-3 which are storage areas provided in advance in the fuel side storage unit 212b.

The fuel side management unit 211b associates the fuel flow rate $G_{ft}$ (1) corresponding to the fuel supply system 40-1 with the fuel flow rate $G_{fs}$ (1). The fuel side management unit 211b associates the fuel flow rate $G_{ft}$ (2) corresponding to the fuel supply system 40-2 with the fuel flow rate $G_{fs}$ (2). The fuel side management unit 211b associates the fuel flow rate $G_{ft}$ (3) corresponding to the fuel supply system 40-3 with the fuel flow rate $G_{fs}$ (3). In accordance with the state detected by the state detection unit 205, the fuel side management unit 211b writes and stores the associated fuel flow rates $G_{ft}$ (1) and $G_{fs}$ (1), the associated fuel flow rates $G_{ft}$ (2) and $G_{fs}$ (2), and the associated fuel flow rates $G_{ft}$ (3) and $G_{fs}$ (3) in the respective fuel side storage areas 212b-1, 212b-2, and 212b-3. The fuel side management unit 211b outputs a latest combination of the fuel flow rates $G_{ft}$ (3) and $G_{fs}$ (3), a latest combination of the fuel flow rates $G_{ft}$ (2) and $G_{fs}$ (2), and a latest combination of the fuel flow rates $G_{ft}$ (3) and $G_{fs}$ (3) to the respective fuel correction coefficient calculation units 213-1, 213-2, and 213-3.

In the fuel side storage unit 212b, the fuel side storage area 212b-1 stores the combination of the fuel flow rates $G_{ft}$ (1) and $G_{fs}$ (1) in a time-series order. The fuel side storage area 212b-2 stores the combination of the fuel flow rates $G_{ft}$ (2) and $G_{fs}$ (2) in a time-series order. The fuel side storage area 212b-3 stores the combination of the fuel flow rates $G_{ft}$ (3) and $G_{fs}$ (3) in a time-series order. Each of the fuel correction coefficient calculation units 213-1, 213-2, and 213-3 has the same configuration as that of the fuel correction coefficient calculation unit 213 of the first embodiment. Each of the fuel correction coefficient application units 214-1, 214-2, and 214-3 has the same configuration as that of the fuel correction coefficient application unit 214 of the first embodiment. The adder 216 calculates the correction fuel flow rate $G_{fcor}$ by summing up the correction fuel flow rates $G_{fcor}$ (1), $G_{fcor}$ (2), and $G_{fcor}$ (3) calculated by each of the fuel correction coefficient application units 214-1, 214-2, and 234-3.

(Operation Example of Gas Turbine Control Device of Third Embodiment)

A process performed by the gas turbine control device 20b will be described with reference to FIGS. 14 and 15. In FIG. 14, as the process in Step Sb1-1, the same process as that in Step S1-1 in FIG. 3 is performed by the fuel flow rate calculation unit 201b. As the process in Step Sb1-2, the same process as that in Step S1-2 in FIG. 3 is performed by the heat balance computation unit 203b. The fuel distribution amount calculation unit 209 captures the fuel distribution ratios $D_1$, $D_2$, and $D_3$ calculated and output by the fuel distribution ratio calculation unit 207 in the previous detection cycle (Step Sb1-3).

The fuel flow rate calculation unit 201b calculates the fuel flow rates $G_{ft}$ (1), $G_{ft}$ (2), and $G_{ft}$ (3) by substituting the data captured in the process in Step Sb1-1 into Equations (1), (2), and (3). The fuel flow rate calculation unit 201b outputs the calculated fuel flow rates $G_{ft}$ (1), $G_{ft}$ (2), and $G_{ft}$ (3) to the fuel side management unit 211b. The fuel flow rate calculation unit 201b outputs the calculated fuel flow rate $G_{ft}$ (1) to the fuel correction coefficient application unit 214-1, outputs the fuel flow rate $G_{ft}$ (2) to the fuel correction coefficient application unit 214-2, and outputs the fuel flow rate $G_{ft}$ (3) to the fuel correction coefficient application unit 214-3 (Sb2-1).

The heat balance computation unit 203b calculates the fuel flow rate $G_{fs}$, based on the data captured in the process in Step Sb1-2 and on the gas turbine heat balance computation equation. The heat balance computation unit 203b outputs the calculated fuel flow rate $G_{fs}$ to the fuel distribution amount calculation unit 209 (Sb2-2).

The fuel distribution amount calculation unit 209 calculates three fuel flow rates $G_{fs}$ (1), $G_{fs}$ (2), and $G_{fs}$ (3) so that the fuel flow rate $G_{fs}$ calculated by the heat balance computation unit 203b becomes each ratio of the fuel distribution ratios $D_1$, $D_2$, and $D_3$ captured in the process in Step Sb1-3. For example, the fuel distribution amount calculation unit 209 calculates the fuel flow rates as $G_{fs}$ (1)=$G_{fs}$×$D_1$/($D_1$+$D_2$+$D_3$), $G_{fs}$(2)=$G_{fs}$×$D_2$/($D_1$+$D_2$+$D_3$), and $G_{fe}$ (3)=$G_{fs}$× $D_1$/($D_1$+$D_2$+$D_3$). The fuel distribution amount calculation unit 209 outputs the calculated fuel flow rates $G_{fs}$ (1), $G_{fs}$ (2), and $G_{fs}$ (3) to the fuel side management unit 211b (Sb2-3).

A set of processes in Steps Sb1-1 and Sb1-2, a set of processes in Steps Sb1-2 and Sb2-2, and a process in Step Sb1-3 are performed in parallel.

When receiving the fuel flow rates $G_{ft}$ (1), $G_{ft}$ (2), and $G_{ft}$ (3) and the fuel flow rates $G_{fs}$ (1), $G_{fs}$ (2), and $G_{fs}$ (3), the fuel flow rate correction unit 210b of the correction process unit 204b starts the subroutine of the storage unit management process illustrated in FIG. 15 (Sb3).

In the fuel flow rate correction unit 210b, the fuel side management unit 211b captures the fuel flow rates $G_{ft}$ (1), $G_{ft}$ (2), and $G_{ft}$ (3) output by the fuel flow rate calculation unit 201b, and the fuel flow rates $G_{fs}$ (1), $G_{fs}$ (2), and $G_{fs}$ (3) output by the fuel distribution amount calculation unit 209. The fuel flow rate correction unit 210b associates the captured fuel flow rate $G_{ft}$ (1) with the fuel flow rate $G_{fs}$ (1), associates the captured fuel flow rate $G_{ft}$ (2) with the fuel flow rate $G_{fs}$ (2), and associates the captured fuel flow rate $G_{ft}$ (3) with the fuel flow rate $G_{fs}$ (3) (Sb100). The fuel side management unit 211b acquires the data indicating the state of the gas turbine power generation plant 100b which is detected by the state detection unit 205 from the state detection unit 205, at a time when the process in Step Sb100 is completed (Sb101).

The fuel side management unit 211b determines whether or not the acquired data indicating the state indicates the static state (Sb102). When the fuel side management unit 211b determines that the acquired data indicating the state indicates the static state (Sb102, Yes), the fuel side management unit 211b performs the processes in Steps Sb103-1, Sb103-2, and Sb103-3, and thereafter, performs the processes in Steps Sb104-1, Sb104-2, and Sb104-3.

That is, the fuel side management unit 211b writes and stores the associated combination of the fuel flow rate $G_{ft}$ (1) and the fuel flow rate $G_{fs}$ (1) in the fuel side storage area 212b-1. The fuel side management unit 211b writes the combination of the fuel flow rates $G_{ft}$ (1) and $G_{fs}$ (1) to be sequentially written in the fuel side storage area 212b-1 to be stored in the fuel side storage area 212b-1 in a time-series order, for example, so that a newly written combination is stored in the fuel side storage area 212b-1 at the beginning of the time-series order (Sb103-1). The fuel side management unit 211b outputs the combination of the fuel flow rate $G_{ft}$ (1) and the fuel flow rate $G_{fs}$ (1) written in the fuel side storage area 212b-1 to the fuel correction coefficient calculation unit 213-1 (Sb104-1).

As the processes in Steps Sb103-2 and Sb104-2, the fuel side management unit 211b performs the following processes. In the processes in Steps Sb103-1 and Sb104-1, the fuel flow rate $G_{ft}$ (1) is replaced with the fuel flow rate $G_{ft}$ (2), the fuel flow rate $G_{fs}$ (1) is replaced with the fuel flow rate $G_{fs}$ (2), the fuel side storage area 212b-1 is replaced with the fuel side storage area 212b-2, and the fuel correction coefficient calculation unit 213-1 is replaced with the fuel correction coefficient calculation unit 213-2. Similarly, as the processes in Steps Sb103-3 and Sb104-3, the fuel side management unit 211b performs the following processes. In the processes in Steps Sb103-1 and Sb104-1, the fuel flow rate $G_{ft}$ (1) is replaced with the fuel flow rate $G_{ft}$ (3), the fuel flow rate $G_{fs}$ (1) is replaced with the fuel flow rate $G_{fs}$ (3), the fuel side storage area 212b-1 is replaced with the fuel side storage area 212b-3, and the fuel correction coefficient calculation unit 213-1 is replaced with the fuel correction coefficient calculation unit 213-3.

When the fuel side management unit 211b determines in the process in Step Sb102 that the acquired data indicating the state does not indicate the static state (Sb102, No), the fuel side management unit 211b discards the fuel flow rates $G_{ft}(1)$, $G_{ft}(2)$, and $G_{ft}(3)$, and the fuel flow rates $G_{fs}(3)$, $G_{fs}(2)$, and $G_{fs}(3)$ which are captured in the process in Step Sb100, and reads the latest combination out of the combinations stored in each of the fuel side storage areas 212b-1, 212b-2, and 212b-3. As described above, when the fuel side storage areas 212b-1, 212b-2, and 212b-3 store the latest combination to be the beginning in a time-series order, the fuel side management unit 211b reads the combination stored at the beginning of each of the fuel side storage areas 212b-1, 212b-2, and 212b-3 as the latest combination. The fuel side management unit 211b outputs the latest combination of the fuel flow rates $G_{ft}(1)$ and $G_{fs}(1)$ read from the fuel side storage area 212b-1 to the fuel correction coefficient calculation unit 213-1, outputs the latest combination of the fuel flow rates $G_{ft}(2)$ and $G_{fs}(2)$ read from the fuel side storage area 212b-2 to the fuel correction coefficient calculation unit 213-2, and outputs the latest combination of the fuel flow rates $G_{ft}(3)$ and $G_{fs}(3)$ read from the fuel side storage area 212b-3 to the fuel correction coefficient calculation unit 213-3 (Sb105).

In the process in FIG. 15, in the fuel side management unit 211b, a set of the processes in Steps Sb103-1 and Sb104-1, a set of the processes in Steps Sb103-2 and Sb104-2, and a set of the processes in Steps Sb103-3 and Sb104-3 may be performed in any order, or may be performed in parallel. In addition, in the process in Step Sb105, the fuel side management unit 211b may read the latest combination from each of the fuel side storage areas 212b-1, 212b-2, and 212b-3. The processes of outputting the read latest combination to the fuel correction coefficient calculation units 213-1, 213-2, and 213-3 may be performed in any order, or may be performed in parallel.

With reference back to FIG. 14, the fuel correction coefficient calculation unit 213-1 captures the combination of the fuel flow rates $G_{ft}(1)$ and $G_{fs}(1)$ output by the fuel side management unit 211b (Sb4-1). The fuel correction coefficient calculation unit 213-1 calculates the fuel correction coefficient $K_f(1)$ by dividing the fuel flow rate $G_{fs}(1)$ by the fuel flow rate $G_{ft}(1)$. The fuel correction coefficient calculation unit 213-1 outputs the calculated fuel correction coefficient $K_f(1)$ to the fuel correction coefficient application unit 214-1 (Sb5-1). The fuel correction coefficient application unit 214-1 captures the fuel flow rate $G_{ft}(1)$ output by the fuel flow rate calculation unit 201b and the fuel correction coefficient $K_f(1)$ output by the fuel correction coefficient calculation unit 213-1. The fuel correction coefficient application unit 214-1 calculates the correction fuel flow rate $G_{fcor}(1)$ by multiplying the fuel flow rate $G_{ft}(1)$ by the fuel correction coefficient $K_f(1)$. The fuel correction coefficient application unit 214-1 outputs the calculated correction fuel flow rate $G_{fcor}(1)$ to the adder 216 (Sb6-1).

Similarly, the processes in Steps Sb4-2, Sb5-2, and Sb6-2 and the processes in Steps Sb4-3, Sb5-3, and Sb6-3 are performed. Here, each of the processes of Steps Sb4-2, Sb5-2, and Sb6-2 is the following process. In the processes in Steps Sb4-1, Sb5-1, and Sb6-1 in which the branch number of each step number is replaced with "-1", the fuel flow rate $G_{ft}(1)$ is replaced with the fuel flow rate $G_{ft}(2)$, the fuel flow rate $G_{fs}(1)$ is replaced with the fuel flow rate $G_{fs}(2)$, the fuel correction coefficient calculation unit 213-1 is replaced with the fuel correction coefficient calculation unit 213-2, the fuel correction coefficient $K_f(1)$ is replaced with the fuel correction coefficient $K_f(2)$, the fuel correction coefficient application unit 214-1 is replaced with the fuel correction coefficient application unit 214-2, and the correction fuel flow rate $G_{fcor}(1)$ is replaced with the correction fuel flow rate $G_{fcor}(2)$. In addition, each of the processes in Steps Sb4-3, Sb5-3, and Sb6-3 is the following process. In the processes in Steps Sb4-1, Sb5-1, and Sb6-1 in which the branch number of each step number is replaced with "-1", the fuel flow rate $G_{ft}(1)$ is replaced with the fuel flow rate $G_{ft}(3)$, the fuel flow rate $G_{ft}(1)$ is replaced with the fuel flow rate $G_{fs}(3)$, the fuel correction coefficient calculation unit 213-1 is replaced with the fuel correction coefficient calculation unit 213-3, the fuel correction coefficient $K_f(1)$ is replaced with the fuel correction coefficient $K_f(3)$, the fuel correction coefficient application unit 214-1 is replaced with the fuel correction coefficient application unit 214-3, and the correction fuel flow rate $G_{fcor}(1)$ is replaced with the correction fuel flow rate $G_{fcor}(3)$.

The adder 216 captures the correction fuel flow rates $G_{fcor}(1)$, $G_{fcor}(2)$, and $G_{fcor}(3)$ output by each of the fuel correction coefficient application units 214-1, 214-2, and 214-3, and calculates the correction fuel flow rate $G_{fcor}$ by summing up the captured correction fuel flow rates $G_{fcor}(1)$, $G_{fcor}(2)$, and $G_{fcor}(3)$. The adder 216 outputs the calculated correction fuel flow rate $G_{fcor}$ to the turbine inlet temperature calculation unit 206 (Sb7). The mark "A" illustrated in FIG. 14 is a mark indicating that the process is continuously performed, and as indicated by the mark "A", the same process as the process in FIG. 4 of the first embodiment is performed thereafter. A series of the above-described processes illustrated in FIGS. 14 and 4 are performed as the process of one detection cycle, and the series of processes illustrated in FIGS. 14 and 4 are performed for each cycle.

(Operational Effect in Third Embodiment)

As described above, regardless of whether the state detected by the state detection unit 205 is the static state or the transient state, the fuel flow rate correction unit 210b of the third embodiment calculates the fuel correction coefficient $K_f$ by using the fuel flow rates $G_{ft}(1)$ and $G_{fs}(1)$, the fuel flow rates $G_{ft}(2)$ and $G_{fs}(2)$, and the fuel flow rates $G_{ft}(3)$ and $G_{fs}(3)$ in the recent static state. Therefore, in the configuration of the third embodiment, as in the configuration of the first embodiment, the accuracy of the fuel flow rate provided for the turbine inlet temperature calculation unit 206 is not lowered in both the static state and the transient state. In this manner, the turbine inlet temperature calculation unit 206 can maintain the accuracy of the turbine inlet temperature $T_{1T}$ for a long period of time without using the turbine efficiency which is less likely to be uniquely determined.

Furthermore, in the third embodiment, the fuel distribution amount calculation unit 209 calculates the fuel flow rates $G_{fs}(1)$, $G_{fs}(2)$, and $G_{fs}(3)$ in which the fuel flow rate $G_{fs}$ calculated by the heat balance computation unit 203b is distributed in accordance the fuel distribution ratios $D_1$, $D_2$, and $D_3$. Each of the fuel correction coefficient calculation units 213-1, 213-2, and 213-3 calculates the fuel correction coefficients $K_f(1)$, $K_f(2)$, and $K_f(3)$, based on the respectively corresponding fuel flow rates $G_{fs}(1)$, $G_{fs}(2)$, and $G_{fs}(3)$. Each of the fuel correction coefficient application units 214-1 to 214-3 corrects each of the fuel flow rates $G_{ft}(1)$, $G_{ft}(2)$, and $G_{ft}(3)$ for each of the fuel supply systems 40-1, 40-2, and 40-3 by using the respectively corresponding fuel correction coefficients $K_f(1)$, $K_f(2)$, and $K_f(3)$. Therefore, in the third embodiment, an inherent error existing in each of the fuel supply systems 40-1, 40-2, and 40-3, that is, an error of the fuel flow rate $G_{fs}$ (1) and the fuel flow rate $G_{ft}$ (1), an error of the fuel flow rate $G_{fs}$ (2) and the fuel flow rate $G_{ft}$ (2), and an error of the fuel flow rate $G_{fs}$ (3) and the fuel flow rate $G_{ft}$ (3) which are recorded in the static state can be individually corrected. Therefore, in the third embodiment, the fuel flow rate $G_{ft}$ can be highly accurately corrected, compared to the configuration in which the correction process unit 204 includes only the fuel flow rate correction unit 210 in the configuration of the first embodiment. Accordingly, it is possible to further improve the accuracy of the turbine inlet temperature $T_{1T}$ calculated by the turbine inlet temperature calculation unit 206.

(Other Configuration Examples in Third Embodiment)

In the third embodiment described above, the fuel distribution amount calculation unit 209 uses the fuel distribution ratios $D_1$, $D_2$, and $D_3$ calculated by the fuel distribution ratio calculation unit 207 to calculate the fuel flow rates $G_{fs}$ (1), $G_{fs}$ (2), and $G_{fs}$ (3) from the fuel flow rate $G_{fs}$ calculated by the heat balance computation unit 203b. In contrast, the fuel distribution amount calculation unit 209 may use the valve opening degrees $O_1$, $O_2$, and $O_3$ calculated by the valve opening degree calculation unit 208 to calculate the fuel flow rates $G_{fs}$ (1), $G_{fs}$ (2), and $G_{fs}$ (3) from the fuel flow rate $G_{fs}$.

In addition, each of the fuel supply systems 40-1, 40-2, and 40-3 may include a sensor for measuring the flow rate of the fuel flowing through each of the fuel supply systems 40-1, 40-2, and 40-3, and may use each fuel flow rate of the fuel supply systems 40-1, 40-2, and 40-3 which is obtained from the sensor, and may calculate the fuel flow rates $G_{fs}$ (1), $G_{fs}$ (2), and $G_{fs}$ (3) from the fuel flow rate $G_{fs}$. However, the data of the fuel flow rate obtained by the sensor measuring the flow rate of the fuel flowing through each of the fuel supply systems 40-1, 40-2, and 40-3 is the data which is sufficiently accurate to determine an approximate ratio of the fuel flowing through each of the fuel supply systems 40-1, 40-2, and 40-3. However, the data includes an absolute error in the measurement. Therefore, the data has a value different from the fuel flow rates $G_{ft}$ (1), $G_{ft}$ (2), and $G_{ft}$ (3) calculated by the fuel flow rate calculation unit 201b. In addition, even when a total value of the data is provided for the turbine inlet temperature calculation unit 206, the data cannot obtain the accurate turbine inlet temperature $T_{1T}$.

In the third embodiment described above, the "method for calculating each correction coefficient from the average value of each of the fuel flow rate and the air flow rate" described in the first embodiment may be applied to the fuel flow rate correction unit 210b. In addition, the configuration of the second embodiment may be applied to the fuel flow rate correction unit 210b. In addition, in the third embodiment, the heat balance computation unit 203b may be replaced with the heat balance computation unit 203 of the first embodiment, and thereafter, the correction process unit 204b may include the air flow rate correction unit 220 of the first embodiment. The correction process unit 204b may include the air flow rate correction unit 220a of the second embodiment.

(Other Configuration Examples in First to Third Embodiments)

In the first to third embodiments described above, the gas turbine power generation plants 100, 100a, and 100b include the fuel temperature sensors 25c-1, 25c-2, and 25c-3 respectively corresponding to the fuel supply systems 40-1, 40-2, and 40-3. For example, when there is no significant difference in the temperatures of the fuels respectively flowing through the fuel supply systems 40-1, 40-2, and 40-3, any one of the fuel temperature sensors 25c-1, 25c-2, and 25c-3 may be provided. A sensor for measuring the temperature of the fuel before the fuel is branched into three may be provided in the fuel supply device 30. For example, when only the fuel temperature sensor 25c-1 is provided, each of the fuel temperatures $T_f(2)$ and $T_f(3)$ is regarded to have the same value as the fuel temperature $T_f(1)$, and the processes according to the first to third embodiments described above are performed. As an example, only the fuel temperature $T_f(1)$ is provided for the fuel flow rate calculation units 201 and 201b and the turbine inlet temperature calculation unit 205. When the computation of Equation (2) and Equation (3) is performed, the fuel flow rate calculation units 201 and 201b substitute the fuel temperature $T_f(1)$ instead of the fuel temperatures $T_f(2)$ and $T_f(3)$. In addition, when the turbine inlet temperature calculation unit 206 substitutes the fuel temperature $T_f$ into Equation (6), the turbine inlet temperature calculation unit 206 does not need to calculate the average value of the fuel temperatures $T_f(1)$, $T_f(2)$, and $T_f(3)$, and substitutes the fuel temperature $T_f(1)$ into Equation (6) as the fuel temperature $T_f$.

In the first to third embodiments described above, the fuel flow rate calculation units 201 and 201b adopt a method for calculating the fuel flow rates $G_{ft}$ (1), $G_{ft}$ (2), and $G_{ft}$ (3), based on the flow control valve pre-pressures $P_{1FV}(1)$, $P_{1FV}(2)$, and $P_{1FV}(3)$ detected by each of the flow control valve pre-pressure sensors 25a-1 to 25a-3, and on the flow control valve post-pressures $P_{2FV}(1)$, $P_{2FV}(2)$, and $P_{2FV}(3)$ detected by each of the flow control valve post-pressure sensors 25b-1 to 25b-3. However, the method is an example, and the fuel flow rate calculation units 201 and 201b can calculate the fuel flow rates $G_{ft}$ (1), $G_{ft}$ (2), and $G_{ft}$ (3) by using the fuel flow rate calculation function $f_1(\bullet)$ modified so that the measurement data can be applied, as long as the measurement data relating to the fuel supply systems 40-1, 40-2, and 40-3, more specifically, the measurement data relating to the pressure which can be measured at two locations of each of the fuel supply systems 40-1, 40-2, and 40-3, can be applied. For example, nozzle pre-pressure sensors for measuring the pressure of the fuel flowing into the nozzles 42-1, 42-2, and 42-3 may be provided instead of the flow control valve pre-pressure sensors 25a-1 to 25a-3, and nozzle post-pressure sensors for measuring the pressure of the fuel flowing out from the nozzles 42-1, 42-2, and 42-3 may be provided instead of the flow control valve post-pressure sensors 25b-1 to 25b-3. In this case, the fuel flow rate calculation units 201 and 201b capture the pressure measured by the nozzle pre-pressure sensor and the pressure measured by the nozzle post-pressure sensor, and calculate the fuel flow rates $G_{ft}(1)$, $G_{ft}(2)$, and $G_{ft}(3)$ by using the fuel flow rate calculation function $f_1(\bullet)$ modified so that the two pressures can be applied, the valve opening degrees $O_1$ to $O_3$, the two pressures, and the fuel temperatures $T_f(1)$ to $T_f(3)$. In addition, for example, a first sensor for measuring the pressure of the fuel inside the manifold pipes 43-1, 43-2, and 43-3 corresponding to each of the fuel supply systems 40-1, 40-2, and 40-3 may be provided instead of the flow control valve pre-pressure sensors 25a-1 to 25a-3, and a second sensor for measuring the pressure of the fuel flowing out from each of the manifold pipes 43-1, 43-2, and 43-3, that is, an exit pressure of a combustion nozzle, may be provided instead of in the flow control valve post-pressure sensors 25b-1 to 25b-3. An example of the second sensor is the combustor casing pressure sensor 25m for measuring the combustor casing pressure $P_{out}$ described in the second embodiment.

In the first to third embodiments described above, the valve opening degree calculation unit 208 included in the gas turbine control devices 20, 20a, and 20b calculates the valve opening degrees $O_1$, $O_2$, and $O_3$ corresponding to each of the flow control valves 41-1, 41-2, and 41-3. In contrast, the valve opening degree calculation unit 208 may calculate three Cv values corresponding to each of the flow control valves 41-1, 41-2, and 41-3. In this case, the fuel flow rate calculation units 201 and 201b capture the three Cv values calculated by the valve opening degree calculation unit 208, and calculate fuel flow rates $G_{ft}$ (1), $G_{ft}$ (2), and $G_{ft}$ (3) by substituting the three Cv values instead of the valve opening degrees $O_1$ to $O_3$ into the fuel flow rate calculation function $f_1$ (•) modified so that the Cv values can be applied.

In the first to third embodiments described above, the heat balance computation units 203 and 203b capture the gas turbine output $G_{out}$, the exhaust gas pressure $P_{2T}$, the exhaust gas temperature $T_{2T}$, the compressor inlet pressure $P_{1C}$, the compressor inlet temperature $T_{1C}$, the compressor exit pressure $P_{2C}$, and the compressor exit temperature $T_{2C}$, but may capture the measurement data other than these.

In the first to third embodiments described above, as an example, a case where the fuel supply system 40 includes the three fuel supply systems 40-1 to 40-3 has been described. However, a configuration including two fuel supply systems 40-1 and 40-2, or a configuration including four or more fuel supply systems 40-1, 40-2, 40-3, and so forth may be adopted. In addition, in FIGS. 1 and 8, as an example, a case where the gas turbine 10 includes one combustor 12 has been described. However, a configuration may be adopted as follows. The gas turbine 10 includes a plurality of the combustors 12. Each of the combustors 12 is connected to the compressor 11 and the turbine 13, and includes a plurality of the combustor inner cylinders 121 corresponding to each of the plurality of combustors 12, and the fuel supply systems 40-1, 40-2, 40-3, and so forth. In addition, a configuration may be adopted as follows. A plurality of combustor inner cylinders 121 are provided in one combustor 12, and the fuel supply systems 40-1, 40-2, 40-3, and so forth corresponding to each of the plurality of combustor inner cylinders 121 are provided. In this way, when the configuration is changed to change the number of the fuel supply systems 40-1, 40-2, and 40-3, the number of the combustors 12, and the number of the combustor inner cylinders 121 described in the first to third embodiments, the number of components such as the flow control valve 41 provided in the gas turbine power generation plants 100, 100a, and 100b is changed in accordance with the configuration change, and a configuration of a functional unit included in the gas turbine control devices 20, 20a, and 20b is also changed.

In the first to third embodiments described above, the gas turbine control devices 20, 20a, and 20b include a configuration for calculating the command value for adjusting the amount of the air provided for the inlet guide vane 14 and suctioned by the inlet guide vane 14, in addition to the configurations illustrated in FIGS. 2, 9, and 13.

In the first to third embodiments described above, the gas turbine power generation plants 100, 100a, and 100b include the flow control valves 41-1, 41-2, and 41-3. However, a pressure regulation valve may be applied instead of the flow regulation valve.

In the first to third embodiments described above, the gas turbine power generation plants 100, 100a, and 100b may further include a steam turbine, and may be configured as a gas turbine combined cycle power generation plant (GTCC) in which the steam turbine is connected to the rotor 15.

In the first to third embodiments described above, the function $f_3$ (•) used by the turbine inlet temperature calculation unit 206 is a function constructed based on the non-stationary physical model. As described above, the heat energy flowing into the combustor 12 in the non-stationary physical model is represented by the total of the heat energy of the fuel, the heat energy of the air, and the heat generation energy of the combustion gas. The heat energy of the air varies depending on a specific enthalpy set in view of influence of humidity generated by steam vapor contained in the air flowing into the combustor casing 16. Therefore, instead of calculating the heat energy of the air by using the parameter substituted into the function $f_3$ (•), that is, any one of the correction fuel flow rate $G_{fcor}$, the correction air flow rate $G_{acor}$, the combustor casing temperature $T_{CS}$, and the fuel temperature $T_f$ which is the average value of the fuel temperatures $T_f$ (1), $T_f$ (2), and $T_f$ (3), the turbine inlet temperature calculation unit 206 may calculate the heat energy of the air as follows. That is, a sensor for measuring the humidity of the air flowing into the combustor casing 16 may be newly provided. The turbine inlet temperature calculation unit 206 may calculate the specific enthalpy, based on the humidity of the air flowing into the combustor casing 16 which is measured by the sensor, and may calculate the heat energy of the air by using the calculated specific enthalpy.

In addition, in the configuration of the first to third embodiments described above, the state detection unit 205 performs a determination process using an unequal sign provided with an equal sign in the process of detecting the state of the gas turbine power generation plant 100, the processes in Steps S105-1 and 8105-2 in FIG. 6, and the processes in Steps Sa104-1 and Sa104-2 in FIG. 11. However, the present disclosure is not limited to the embodiment, and the determination process of "whether an object is equal to or greater than a threshold value" is merely an example. Depending on a setting method for the threshold value, each process may be replaced with the determination process of "whether or not the object exceeds the threshold value".

Hitherto, the embodiments of the present disclosure have been described in detail with reference to the drawings. However, the specific configuration is not limited to the embodiments, and the present disclosure includes design within the scope not departing from the concept of the present disclosure.

<Computer Configuration>

In the first to third embodiments described above, for example, the gas turbine control devices 20, 20a, and 20b are configured to include a central processing unit (CPU), a random access memory (RAM), a read only memory (ROM), and a computer-readable storage medium. As an example, a series of processes for realizing various functions included in the gas turbine control devices 20, 20a, and 20b are stored in a storage medium in a form of a program, and various functions are realized in such a manner that the CPU reads the program from the RAM and executes information processing and computation processing. The program may adopt a form in which the program is installed in advance in the ROM or another storage medium, a form in which the program is provided in a stored state in the computer-readable storage medium, or a form in which the program is distributed via wired or wireless communication means. The computer-readable storage medium is a magnetic disc, a magneto-optical disc, a CD-ROM, a DVD-ROM, or a semi-conductor memory.

More specifically, each of the gas turbine control devices 20, 20a, and 20b according to the first to third embodiments described above is realized by a configuration of a computer illustrated in FIG. 16. A computer 90 includes a processor 91, a main memory 92, a storage 93, and an interface 94. Functional units of the fuel flow rate calculation units 201 and 201b, the heat balance computation units 203 and 203b, the air flow rate calculation unit 202, the correction process units 204, 204a, and 204b, the state detection unit 205, the turbine inlet temperature calculation unit 206, the fuel distribution ratio calculation unit 207, the valve opening degree calculation unit 208, and the fuel distribution amount calculation unit 209 which are included in the gas turbine control devices 20, 20a, and 20b are installed in the computer 90. Operations of the functional units are stored in the storage 93 in a form of a program. The processor 91 reads the program from the storage 93, deploys the program into the main memory 92, and performs the processes described in the first to third embodiments in accordance with the program deployed in the main memory 92. In addition, for example, in accordance with the program, the processor 91 secures areas of the fuel side storage units 212, 212a, and 212b and the air side storage units 222 and 222a in the main memory 92. In addition, in accordance with the program, the processor 91 allocates the interface 94 for transmitting and receiving data among various sensors 25a to 20m, the inlet guide vane 14, and the flow control valve 41 to the functional units included in the gas turbine control devices 20, 20a, and 20b.

The program may partially realize functions fulfilled by the computer 90. For example, the program may cause the functions to be fulfilled in combination with another program previously stored in the storage 93 or in combination with another program installed in another device. In another embodiment, in addition to the above-described configuration or instead of the above-described configuration, the computer may include a custom large scale integrated circuit (LSI) such as a programmable logic device (PLD). Examples of the PLD include a programmable array logic (PAL), a generic array logic (GAL), a complex programmable logic device (CPLD), and a field programmable gate array (FPGA). In this case, the functions realized by the processor may be partially or entirely realized by the integrated circuit.

Examples of the storage 93 include a hard disk drive (HDD), a solid state drive (SSD), a magnetic disc, a magneto-optical disc, a compact disc read only memory (CD-ROM), a digital versatile disc read only memory (DVD-ROM), and a semiconductor memory. The storage 93 may be internal media directly connected to a bus of the computer 90, or external media connected to the computer 90 via the interface 94 or a communication line. In addition, when this program is distributed to the computer 90 via the communication line, the computer 90 receiving the distribution may deploy the program in the main memory 92, and may perform the above-described process. In addition, the storage 93 is a tangible storage medium that is not temporary.

Each of the gas turbine control devices 20, 20a, and 20b according to the first to third embodiments described above is not limited to being realized as an integrated computer. For example, in the first and third embodiments, configurations of the fuel flow rate calculation units 201 and 201b, the air flow rate calculation unit 202, the fuel correction coefficient application units 214 and 214-1 to 234-3, the air correction coefficient application unit 224, the turbine inlet temperature calculation unit 206, the fuel distribution ratio calculation unit 207, and the valve opening degree calculation unit 208 and a configuration including the functional unit which is not included in the configuration may be provided in respectively different computers, and two computers may transmit and receive the data through a communication line. In addition, in the second embodiment, configurations of the fuel flow rate calculation unit 201, the air flow rate calculation unit 202, the fuel correction coefficient calculation unit 213a, the fuel correction coefficient application unit 214, the air correction coefficient calculation unit 223a, the air correction coefficient application unit 224, the turbine inlet temperature calculation unit 206, the fuel distribution ratio calculation unit 207, and the valve opening degree calculation unit 208 and a configuration including the functional unit which is not included in the configuration may be provided in respectively different computers, and two computers may transmit and receive the data through the communication line.

Additional Notes

The gas turbine control device (for example, the gas turbine control devices 20, 20a, 20b) described in each embodiment is understood as follows, for example.

(1) According to a first aspect, there is provided the gas turbine control device including the fuel flow rate calculation unit (for example, fuel flow rate calculation units 201 and 201b) that calculates the fuel flow rate $G_{ft}$ indicating the amount of the fuel flowing into the combustor 12 of the gas turbine 10, based on the measurement data (for example, valve opening degrees $O_1$, $O_2$, and $O_3$, flow control valve pre-pressures $P_{1FV}(1)$, $P_{1FV}(2)$, and $P_{1FV}(3)$, flow control valve post-pressures $P_{2FV}(1)$, $P_{2FV}(2)$, and $P_{2FV}(3)$, and fuel temperatures $T_f(1)$, $T_f(2)$, and $T_f(3)$) relating to a fuel supply system 40 for supplying the fuel to the combustor; the air flow rate calculation unit 202 that calculates the air flow rate $G_{st}$ indicating the amount of the air suctioned by the compressor 11 of the gas turbine, based on the measurement data (for example, compressor index differential pressure $P_{index}$, compressor inlet pressure $P_{1C}$, and compressor inlet temperature $T_{1C}$) relating to the compressor; the turbine inlet temperature calculation unit 206 that calculates the turbine inlet temperature $T_{1T}$, based on the fuel flow rate $G_{ft}$, the air flow rate $G_{at}$, and the physical model equation (for example, fuel flow rate calculation function $f_1(\bullet)$) relating to the heat energy balance relating to the combustor; the heat balance computation unit (for example, heat balance computation units 203 and 203b) that performs the computation for satisfying the heat balance of the gas turbine, based on the measurement data (for example, gas turbine output $G_{out}$, exhaust gas pressure $P_{2T}$, exhaust gas temperature $T_{2T}$, compressor inlet pressure $P_{1C}$, compressor inlet temperature $T_{1C}$, compressor exit pressure $P_{2C}$, and compressor exit temperature $T_{2C}$) relating to the energy balance of the gas turbine, and outputs the computation result; the state detection unit 205 that detects the state of the gas turbine; and the correction process unit (for example, correction process units 204, 204a, and 204b) that corrects any one or both of the fuel flow rate and the air flow rate, based on the computation result output by the heat balance computation unit when the state of the gas turbine which is detected by the state detection unit is the static state, and provides the corrected flow rate to the turbine inlet temperature calculation unit. According to the first aspect and each of the following aspects, the fuel flow rate $G_{ft}$ and the air flow rate $G_{at}$ can be corrected, based on the computation result of the heat balance computation unit. Therefore, correction can be performed without using the turbine efficiency which is less likely to be uniquely determined. Furthermore, the heat balance computation unit performs the computation, based on the measurement data obtained through repeated measurement. Therefore, the accuracy of the turbine inlet temperature $T_{1T}$ can be maintained for a long period of time.

(2) As the gas turbine control device according to a second aspect, in the gas turbine control device of (1), the fuel flow rate calculated by the fuel flow rate calculation unit is defined as the first fuel flow rate $G_{ft}$, and the air flow rate calculated by the air flow rate calculation unit is defined as the first air flow rate $G_{at}$. The correction process unit includes any one correction unit or both correction units of the fuel flow rate correction unit (for example, fuel flow rate correction units 210, 210a, and 210b) that acquires the second fuel flow rate $G_{fs}$ included in the computation result output by the heat balance computation unit when the state of the gas turbine which is detected by the state detection unit is the static state, that corrects the first fuel flow rate calculated by the fuel flow rate calculation unit, based on the acquired second fuel flow rate and the first fuel flow rate when the second fuel flow rate is acquired, and that provides the corrected first fuel flow rate to the turbine inlet temperature calculation unit, and the air flow rate correction unit (for example, air flow rate correction units 220 and 220a) that acquires the second air flow rate $G_{as}$ included in the computation result output by the heat balance computation unit when the state of the gas turbine which is detected by the state detection unit is the static state, that corrects the first air flow rate calculated by the air flow rate calculation unit, based on the acquired second air flow rate and the first air flow rate when the second air flow rate is acquired, and that provides the corrected first air flow rate to the turbine inlet temperature calculation unit. According to the second aspect, the first fuel flow rate $G_{ft}$ can be corrected by the highly accurate second fuel flow rate $G_{fs}$ included in the computation result of the heat balance computation unit, and the first air flow rate $G_{st}$ can be corrected by the highly accurate second air flow rate $G_{as}$ included in the computation result. Therefore, the highly accurate turbine inlet temperature $T_{1T}$ can be calculated.

(3) As the gas turbine control device according to a third aspect, in the gas turbine control device of (2), the fuel flow rate correction unit includes the fuel correction coefficient calculation unit (for example, fuel correction coefficient calculation units 213 and 213-1 to 213-3) that calculates the fuel correction coefficient, based on a latest second fuel flow rate in the second fuel flow rates acquired when the state of the gas turbine which is detected by the state detection unit is the static state, and on the first fuel flow rate when the latest second fuel flow rate is acquired, and the fuel correction coefficient application unit (for example, fuel correction coefficient application units 214 and 214-1 to 214-3) that corrects the first fuel flow rate calculated by the fuel flow rate calculation unit by using the fuel correction coefficient calculated by the fuel correction coefficient calculation unit. According to the third aspect, the fuel correction coefficient $K_f$ is calculated by using the latest second fuel flow rate $G_{fs}$ and the first fuel flow rate $G_{ft}$ when the latest second fuel flow rate $G_{fs}$ is acquired, and the first fuel flow rate $G_{ft}$ is corrected by using the calculated fuel correction coefficient $K_f$. Therefore, the highly accurate turbine inlet temperature $T_{1T}$ can be calculated, and the accuracy of the turbine inlet temperature $T_{1T}$ can be maintained for a long period of time.

(4) As the gas turbine control device according to a fourth aspect, in the gas turbine control device of (2), the fuel flow rate correction unit includes the fuel correction coefficient calculation unit (for example, fuel correction coefficient calculation units 213 and 213-1 to 213-3) that calculates the fuel correction coefficient, based on the plurality of second fuel flow rates acquired when the state of the gas turbine which is detected by the state detection unit is the static state, and on the first fuel flow rate when each of the plurality of second fuel flow rates is acquired, and the fuel correction coefficient application unit (for example, fuel correction coefficient application units 214 and 214-1 to 214-3) that corrects the first fuel flow rate calculated by the fuel flow rate calculation unit by using the fuel correction coefficient calculated by the fuel correction coefficient calculation unit. According to the fourth aspect, the fuel correction coefficient $K_f$ is calculated, based on the plurality of second fuel flow rates $G_{fs}$ and the plurality of first fuel flow rates $G_{ft}$, and the first fuel flow rate $G_{ft}$ is corrected by using the calculated fuel correction coefficient $K_f$. Therefore, the fuel correction coefficient $K_f$ which is highly accurate in terms of reliability can be obtained.

(5) As the gas turbine control device according to a fifth aspect, in the gas turbine control device according to any one of (2) to (4), the air flow rate correction unit includes the air correction coefficient calculation unit 223 that calculates the air correction coefficient, based on a latest second air flow rate in the second air flow rates acquired when the state of the gas turbine which is detected by the state detection unit is the static state, and on the first air flow rate when the latest second air flow rate is acquired, and the air correction coefficient application unit 224 that corrects the first air flow rate calculated by the air flow rate calculation unit by using the air correction coefficient calculated by the air correction coefficient calculation unit. According to the fifth aspect, the air correction coefficient $K_a$ is calculated by using the latest second air flow rate $G_{as}$ and the first air flow rate $G_{at}$ when the latest second air flow rate $G_{as}$ is acquired, and the first air flow rate $G_{st}$ is corrected by using the calculated air correction coefficient $K_a$. Therefore, the highly accurate turbine inlet temperature $T_{1T}$ can be calculated, and the accuracy of the turbine inlet temperature $T_{1T}$ can be maintained for a long period of time.

(6) As the gas turbine control device according to a sixth aspect, in the gas turbine control device according to any one of (2) to (4), the air flow rate correction unit includes the air correction coefficient calculation unit 223 that calculates the air correction coefficient, based on the plurality of second air flow rates acquired when the state of the gas turbine which is detected by the state detection unit is the static state, and on the first air flow rate when each of the plurality of second air flow rates is acquired, and the air correction coefficient application unit 224 that corrects the first air flow rate calculated by the air flow rate calculation unit by using the air correction coefficient calculated by the air correction coefficient calculation unit. According to the sixth aspect, the air correction coefficient $K_a$ is calculated, based on the plurality of second air flow rates $G_{as}$ and the plurality of first air flow rates $G_{as}$, and the first air flow rate $G_{at}$ is corrected by using the calculated air correction coefficient $K_a$. Therefore, the air correction coefficient $K_a$ which is highly accurate in terms of reliability can be obtained.

(7) As the gas turbine control device according to a seventh aspect, in the gas turbine control device according to any one of (2), (5), and (6), the fuel flow rate correction unit includes the fuel side regression analysis unit 215 that performs the predetermined regression analysis (for example, linear multiple regression analysis), based on the second fuel flow rate acquired when the state of the gas turbine which is detected by the state detection unit is the static state, the first fuel flow rate when the second fuel flow rate is acquired, and data (for example, combustor casing temperature $T_{CS}$ and the combustor casing pressure $P_{out}$) of the explanatory variable, and that calculates the coefficient of the regression equation corresponding to the predetermined regression analysis, the fuel correction coefficient calculation unit (for example, fuel correction coefficient calculation units 213a and 213-1 to 213-3) that calculates the fuel correction coefficient by substituting the data of the explanatory variable when the fuel flow rate calculation unit calculates the first fuel flow rate, into the regression equation to which the coefficient calculated by the fuel side regression analysis unit is applied, and the fuel correction coefficient application unit (for example, fuel correction coefficient application units 214 and 214-1 to 214-3) that corrects the first fuel flow rate corresponding to the data of the explanatory variable substituted into the regression equation by using the fuel correction coefficient calculated by the fuel correction coefficient calculation unit. According to the seventh aspect, the fuel correction coefficient $K_f$ which is highly accurate in terms of reliability can be obtained by using the regression analysis.

(8) As the gas turbine control device according to an eighth aspect, in the gas turbine control device according to any one of (2), (3), (4), and (7), the air flow rate correction unit includes the air side regression analysis unit 225 that performs the predetermined regression analysis, based on the second air flow rate acquired when the state of the gas turbine which is detected by the state detection unit is the static state, the first air flow rate when the second air flow rate is acquired, and data of the explanatory variable, and that calculates the coefficient of the regression equation corresponding to the predetermined regression analysis, the air correction coefficient calculation unit 223a that calculates the air correction coefficient by substituting the data of the explanatory variable when the air flow rate calculation unit calculates the first air flow rate, into the regression equation to which the coefficient calculated by the air side regression analysis unit is applied, and the air correction coefficient application unit 224 that corrects the first air flow rate corresponding to the data of the explanatory variable substituted into the regression equation by using the air correction coefficient calculated by the air correction coefficient calculation unit. According to the eighth aspect, the air correction coefficient $K_a$ which is highly accurate in terms of reliability can be obtained by using the regression analysis.

(9) As the gas turbine control device according to a ninth aspect, in the gas turbine control device according to (7) or (8), the data of the explanatory variable is data in which the measurement data and data of the command value for controlling the gas turbine are combined in any desired way. According to the ninth aspect, the fuel correction coefficient $K_f$ or the air correction coefficient $K_a$ reflecting the measurement data acquired by the measurement and the data of the command value provided for the gas turbine 10 can be obtained.

(10) As the gas turbine control device according to a tenth aspect, in the gas turbine control device according to any one of (2) to (9), when the correction process unit includes the fuel flow rate correction unit, and there exist the plurality of fuel supply systems, the correction process unit includes the fuel distribution amount calculation unit 209 that calculates the second fuel flow rate for each of the plurality of fuel supply systems from the second fuel flow rates included in the computation result output by the heat balance computation unit, based on the fuel distribution ratio (for example, fuel distribution ratios $D_1$, $D_2$, and $D_3$) for each of the plurality of fuel supply systems. The fuel flow rate calculation unit 201b calculates the first fuel flow rate (for example, fuel flow rates $G_{ft}$ (1), $G_{ft}$ (2), $G_{ft}$ (3)) for each of the fuel supply systems. Instead of the second fuel flow rate included in the computation result output by the heat balance computation unit 203b when the state of the gas turbine which is detected by the state detection unit is the static state, the fuel flow rate correction unit 210b acquires the second fuel flow rate (for example, fuel flow rates $G_{fs}$ (1), $G_{fs}$ (2), $G_{fs}$ (3)) for each of the fuel supply systems calculated by the fuel distribution amount calculation unit, corrects the first fuel flow rate for each of the fuel supply systems calculated by the fuel flow rate calculation unit, based on each of the acquired second fuel flow rates and each of the first fuel flow rates for each of the fuel supply systems when each of the second fuel flow rates is acquired, and provides the total value of the corrected first fuel flow rate for each of the fuel supply systems to the turbine inlet temperature calculation unit. According to the tenth aspect, the fuel flow rates $G_{ft}$ (1), $G_{ft}$ (2), and $G_{ft}$ (3) for each of the fuel supply systems 40-1, 40-2, and 40-3 can be individually corrected.

INDUSTRIAL APPLICABILITY

According to the above-described aspects, the accuracy of the turbine inlet temperature is maintained for a long period of time without using the turbine efficiency.

REFERENCE SIGNS LIST

20: Gas turbine control device
201: Fuel flow rate calculation unit
202: Air flow rate calculation unit
203: Heat balance computation unit
204: Correction process unit
205: State detection unit
206: Turbine inlet temperature calculation unit
207: Fuel distribution ratio calculation unit
208: Valve opening degree calculation unit
210: Fuel flow rate correction unit
211: Fuel side management unit
212: Fuel side storage unit
213: Fuel correction coefficient calculation unit
214: Fuel correction coefficient application unit
220: Air flow rate correction unit
221: Air side management unit
222: Air side storage unit
223: Air correction coefficient calculation unit
224: Air correction coefficient application unit

The invention claimed is:
1. A gas turbine control device comprising:
a fuel flow rate calculation unit that calculates a fuel flow rate indicating the amount of a fuel flowing into a combustor of a gas turbine, based on measurement data relating to a fuel supply system for supplying the fuel to the combustor;
an air flow rate calculation unit that calculates an air flow rate indicating the amount of air suctioned by a compressor of the gas turbine, based on measurement data relating to the compressor;
a turbine inlet temperature calculation unit that calculates a turbine inlet temperature, based on the fuel flow rate, the air flow rate, and a physical model equation relating to heat energy balance relating to the combustor;
a heat balance computation unit that performs a computation for satisfying heat balance of the gas turbine, based on measurement data relating to energy balance of the gas turbine, and outputs a computation result;
a state detection unit that detects a state of the gas turbine; and a correction process unit that corrects any one or both of the fuel flow rate and the air flow rate, based on the computation result output by the heat balance computation unit when the state of the gas turbine which is detected by the state detection unit is a static state, and provides the corrected flow rate to the turbine inlet temperature calculation unit, wherein the gas turbine control device controls a flow control valve of the fuel supply system based on the turbine inlet temperature calculated by the turbine inlet temperature calculation unit.

2. The gas turbine control device according to claim 1,
wherein the fuel flow rate calculated by the fuel flow rate calculation unit is defined as a first fuel flow rate,
the air flow rate calculated by the air flow rate calculation unit is defined as a first air flow rate, and
the correction process unit includes any one correction unit or both correction units of
  a fuel flow rate correction unit that acquires a second fuel flow rate included in the computation result output by the heat balance computation unit when the state of the gas turbine which is detected by the state detection unit is the static state, that corrects the first fuel flow rate calculated by the fuel flow rate calculation unit, based on the acquired second fuel flow rate and the first fuel flow rate when the second fuel flow rate is acquired, and that provides the corrected first fuel flow rate to the turbine inlet temperature calculation unit, and
  an air flow rate correction unit that acquires a second air flow rate included in the computation result output by the heat balance computation unit when the state of the gas turbine which is detected by the state detection unit is the static state, that corrects the first air flow rate calculated by the air flow rate calculation unit, based on the acquired second air flow rate and the first air flow rate when the second air flow rate is acquired, and that provides the corrected first air flow rate to the turbine inlet temperature calculation unit.

3. The gas turbine control device according to claim 2,
wherein the fuel flow rate correction unit includes
  a fuel correction coefficient calculation unit that calculates a fuel correction coefficient, based on a latest second fuel flow rate in the second fuel flow rates acquired when the state of the gas turbine which is detected by the state detection unit is the static state, and on the first fuel flow rate when the latest second fuel flow rate is acquired, and
  a fuel correction coefficient application unit that corrects the first fuel flow rate calculated by the fuel flow rate calculation unit by using the fuel correction coefficient calculated by the fuel correction coefficient calculation unit.

4. The gas turbine control device according to claim 2,
wherein the fuel flow rate correction unit includes
  a fuel correction coefficient calculation unit that calculates a fuel correction coefficient, based on a plurality of the second fuel flow rates acquired when the state of the gas turbine which is detected by the state detection unit is the static state, and on the first fuel flow rate when each of the plurality of second fuel flow rates is acquired, and
  a fuel correction coefficient application unit that corrects the first fuel flow rate calculated by the fuel flow rate calculation unit by using the fuel correction coefficient calculated by the fuel correction coefficient calculation unit.

5. The gas turbine control device according to claim 2,
wherein the air flow rate correction unit includes
  an air correction coefficient calculation unit that calculates an air correction coefficient, based on a latest second air flow rate in the second air flow rates acquired when the state of the gas turbine which is detected by the state detection unit is the static state, and on the first air flow rate when the latest second air flow rate is acquired, and
  an air correction coefficient application unit that corrects the first air flow rate calculated by the air flow rate calculation unit by using the air correction coefficient calculated by the air correction coefficient calculation unit.

6. The gas turbine control device according to claim 2,
wherein the air flow rate correction unit includes
  an air correction coefficient calculation unit that calculates an air correction coefficient, based on a plurality of the second air flow rates acquired when the state of the gas turbine which is detected by the state detection unit is the static state, and on the first air flow rate when each of the plurality of second air flow rates is acquired, and
  an air correction coefficient application unit that corrects the first air flow rate calculated by the air flow rate calculation unit by using the air correction coefficient calculated by the air correction coefficient calculation unit.

7. The gas turbine control device according to claim 2,
wherein the fuel flow rate correction unit includes
  a fuel side regression analysis unit that performs a predetermined regression analysis, based on the second fuel flow rate acquired when the state of the gas turbine which is detected by the state detection unit is the static state, the first fuel flow rate when the second fuel flow rate is acquired, and data of an explanatory variable, and that calculates a coefficient of a regression equation corresponding to the predetermined regression analysis,
  a fuel correction coefficient calculation unit that calculates a fuel correction coefficient by substituting the data of the explanatory variable when the fuel flow rate calculation unit calculates the first fuel flow rate, into the regression equation to which the coefficient calculated by the fuel side regression analysis unit is applied, and
  a fuel correction coefficient application unit that corrects the first fuel flow rate corresponding to the data of the explanatory variable substituted into the regression equation by using the fuel correction coefficient calculated by the fuel correction coefficient calculation unit.

8. The gas turbine control device according to claim 7,
wherein the data of the explanatory variable is data in which the measurement data and data of a command value for controlling the gas turbine are combined in any desired way.

9. The gas turbine control device according to claim 2,
wherein the air flow rate correction unit includes
  an air side regression analysis unit that performs a predetermined regression analysis, based on the second air flow rate acquired when the state of the gas turbine which is detected by the state detection unit is the static state, the first air flow rate when the second air flow rate is acquired, and data of an explanatory variable, and that calculates a coefficient of a regression equation corresponding to the predetermined regression analysis, an air correction coefficient calculation unit that calculates an air correction coefficient by substituting the data of the explanatory variable when the air flow rate calculation unit calculates the first air flow rate, into the regression equation to which the coefficient calculated by the air side regression analysis unit is applied, and an air correction coefficient application unit that corrects the first air flow rate corresponding to the data of the explanatory variable substituted into the regression equation by using the air correction coefficient calculated by the air correction coefficient calculation unit.

10. The gas turbine control device according to claim 2, wherein when the correction process unit includes the fuel flow rate correction unit, and there exist a plurality of the fuel supply systems, the correction process unit includes a fuel distribution amount calculation unit that calculates the second fuel flow rate for each of the plurality of fuel supply systems from the second fuel flow rates included in the computation result output by the heat balance computation unit, based on a fuel distribution ratio for each of the fuel supply systems, the fuel flow rate calculation unit calculates the first fuel flow rate for each of the fuel supply systems, and instead of the second fuel flow rate included in the computation result output by the heat balance computation unit when the state of the gas turbine which is detected by the state detection unit is the static state, the fuel flow rate correction unit acquires the second fuel flow rate for each of the fuel supply systems calculated by the fuel distribution amount calculation unit, corrects the first fuel flow rate for each of the fuel supply systems calculated by the fuel flow rate calculation unit, based on each of the acquired second fuel flow rates and each of the first fuel flow rates for each of the fuel supply systems when each of the second fuel flow rates is acquired, and provides a total value of the corrected first fuel flow rate for each of the fuel supply systems to the turbine inlet temperature calculation unit.

11. A gas turbine control method comprising:

a step of calculating a fuel flow rate indicating the amount of a fuel flowing into a combustor of a gas turbine, based on measurement data relating to a fuel supply system for supplying the fuel to the combustor;

a step of calculating an air flow rate indicating the amount of air suctioned by a compressor of the gas turbine, based on measurement data relating to the compressor;

a step of calculating a turbine inlet temperature, based on the fuel flow rate, the air flow rate, and a physical model equation relating to heat energy balance relating to the combustor;

a step of performing a computation for satisfying heat balance of the gas turbine, based on measurement data relating to energy balance of the gas turbine, and outputting a computation result;

a step of detecting a state of the gas turbine;

a step of correcting any one or both of the fuel flow rate and the air flow rate, based on the computation result output in the step of performing the computation for satisfying the heat balance when the state of the gas turbine which is detected in the step of detecting the state is a static state, and providing the corrected flow rate to the step of calculating the turbine inlet temperature; and a step of controlling a flow control valve of the fuel supply system based on the turbine inlet temperature calculated in the step of calculating a turbine inlet temperature.

12. A non-transitory computer-readable recording medium storing a program that causes a computer to function as:

fuel flow rate calculation means for calculating a fuel flow rate indicating the amount of a fuel flowing into a combustor of a gas turbine, based on measurement data relating to a fuel supply system for supplying the fuel to the combustor;

air flow rate calculation means for calculating an air flow rate indicating the amount of air suctioned by a compressor of the gas turbine, based on measurement data relating to the compressor;

turbine inlet temperature calculation means for calculating a turbine inlet temperature, based on the fuel flow rate, the air flow rate, and a physical model equation relating to heat energy balance relating to the combustor;

heat balance computation means for performing a computation for satisfying heat balance of the gas turbine, based on measurement data relating to energy balance of the gas turbine, and outputting a computation result;

state detection means for detecting a state of the gas turbine;

correction process means for correcting any one or both of the fuel flow rate and the air flow rate, based on the computation result output by the heat balance computation means when the state of the gas turbine which is detected by the state detection means is a static state, and providing the corrected flow rate to the turbine inlet temperature calculation means; and control means for controlling a flow control valve of the fuel supply system based on the turbine inlet temperature calculated by the turbine inlet temperature calculation means.

* * * * *